(12) United States Patent
Shirakura et al.

(10) Patent No.: US 8,976,432 B2
(45) Date of Patent: Mar. 10, 2015

(54) HOLOGRAM-INCLUDING MEDIUM, HOLOGRAM-INCLUDING MEDIUM PRODUCING APPARATUS, AND INFORMATION AUTHENTICATION METHOD

(75) Inventors: Akira Shirakura, Tokyo (JP); Takashi Matsubara, Shizuoka (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 12/929,005

(22) Filed: Dec. 22, 2010

(65) Prior Publication Data

US 2011/0188102 A1    Aug. 4, 2011

(30) Foreign Application Priority Data

Feb. 2, 2010   (JP) ................................ 2010-021674

(51) Int. Cl.
| | |
|---|---|
| G03H 1/00 | (2006.01) |
| G06K 19/077 | (2006.01) |
| G06K 19/14 | (2006.01) |
| G06K 19/16 | (2006.01) |

(52) U.S. Cl.
CPC ........ *G03H 1/0011* (2013.01); *G06K 19/07749* (2013.01); *G06K 19/14* (2013.01); *G06K 19/16* (2013.01)
USPC .................................................. 359/2; 359/3

(58) Field of Classification Search
USPC ....................................................... 359/2, 25
See application file for complete search history.

(56) References Cited

U.S. PATENT DOCUMENTS

| | | | |
|---|---|---|---|
| 4,269,473 A | 5/1981 | Flothmann et al. | |
| 6,527,173 B1 | 3/2003 | Narusawa et al. | |
| 2001/0021474 A1* | 9/2001 | Hamada | 430/1 |
| 2003/0016408 A1* | 1/2003 | Kashiwagi et al. | 359/2 |
| 2003/0058491 A1* | 3/2003 | Holmes et al. | 359/2 |
| 2006/0215243 A1 | 9/2006 | Haga et al. | |
| 2007/0206248 A1* | 9/2007 | Winterbottom et al. | 359/2 |
| 2009/0116087 A1* | 5/2009 | Shirakura et al. | 359/23 |
| 2009/0200790 A1* | 8/2009 | Kanno et al. | 283/67 |
| 2009/0207465 A1* | 8/2009 | Riddle et al. | 359/2 |
| 2010/0066489 A1* | 3/2010 | Fein et al. | 340/5.8 |

FOREIGN PATENT DOCUMENTS

| | | |
|---|---|---|
| CN | 1309376 A | 8/2001 |
| JP | 2005-535469 | 11/2005 |
| WO | WO-93/15914 A1 | 8/1993 |
| WO | WO-2009/105040 A1 | 8/2009 |

OTHER PUBLICATIONS

Extended European Search Report issued Jul. 4, 2011 for corresponding European Application No. 10 19 5359.
European Patent Office Communication Pursuant to Article 94(3) EPC issued Feb. 12, 2014 for corresponding European Application No. 10 195 359.4.
Chinese Office Action issued Feb. 8, 2014 for corresponding Chinese Application No. 201110029153.5.

\* cited by examiner

*Primary Examiner* — Thomas K Pham
*Assistant Examiner* — Marin Pichler
(74) *Attorney, Agent, or Firm* — Rader, Fishman & Grauer PLLC

(57) ABSTRACT

A hologram-including medium is disclosed, which is an integrated medium on which at least two items of identification information are recorded, wherein one of the two items of identification information is holographic identification information which can be observed within a predetermined angle range when illuminated from a predetermined angle.

15 Claims, 40 Drawing Sheets

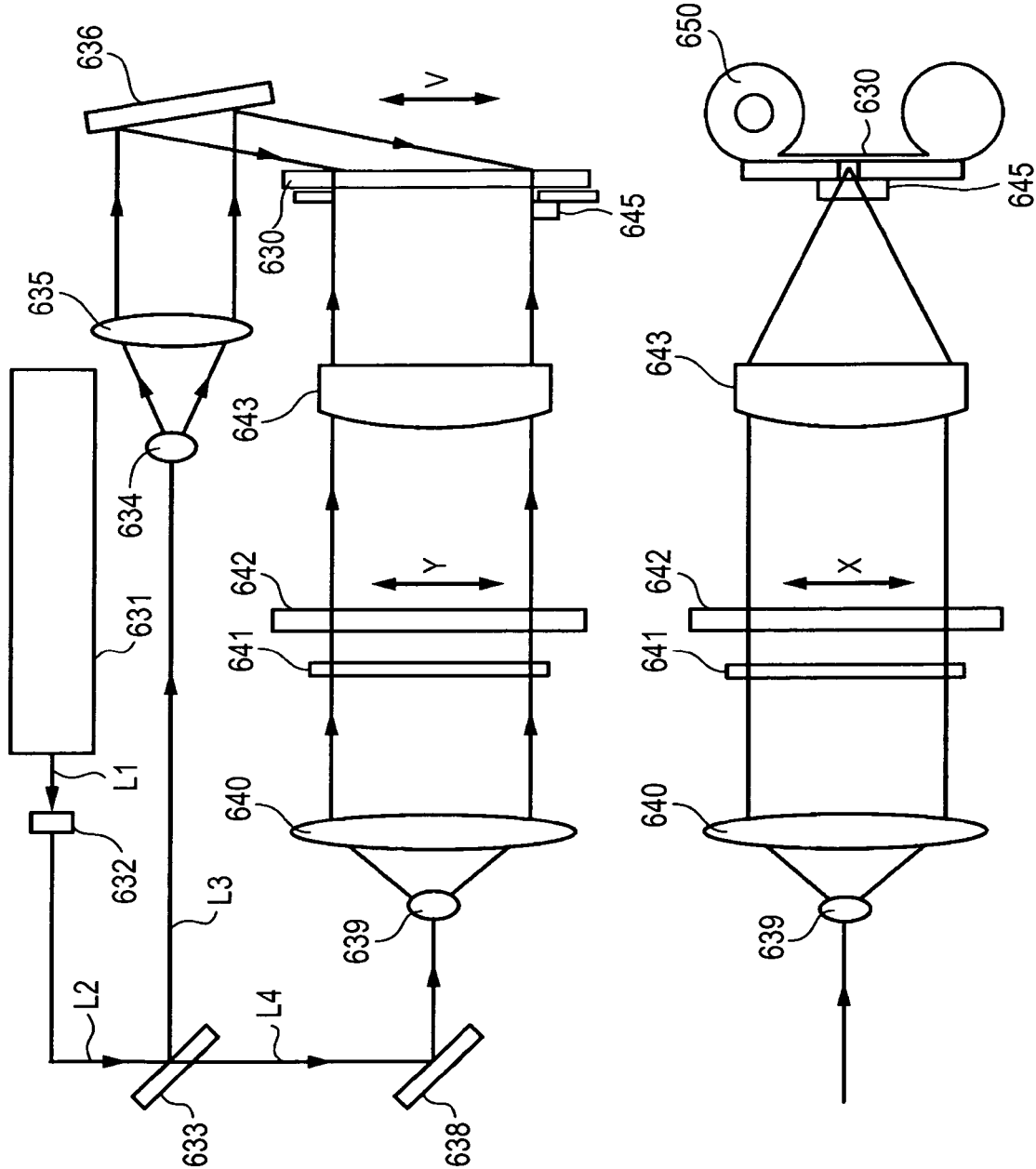

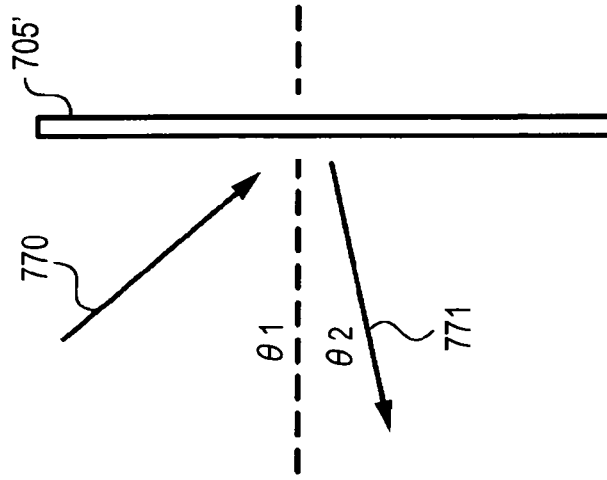
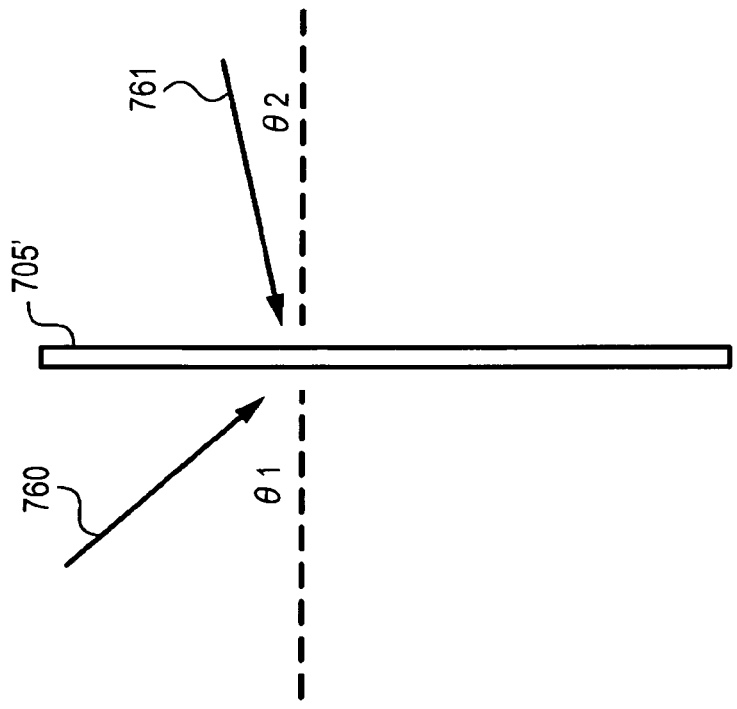
FIG.24A
FIG.24B

US 8,976,432 B2

HOLOGRAM-INCLUDING MEDIUM, HOLOGRAM-INCLUDING MEDIUM PRODUCING APPARATUS, AND INFORMATION AUTHENTICATION METHOD

BACKGROUND OF THE INVENTION

1. Field of the Invention

The present invention relates to a hologram-including medium which is a medium on which at least two items of identification information are recorded, and in which one of the two items of identification information is holographic identification information, and relates to a hologram-including medium producing apparatus and an information determination method.

2. Description of the Related Art

Holograms capable of presenting stereoscopic images are used for authentication of credit cards, identification cards, and the like. At present, embossed holograms which record information using surface unevenness of an interference film are widely used. However, the embossed holograms have a problem in that they are easy to counterfeit. In contrast, volume holograms which record information using differences in the refractive indices in an interference film are very difficult to counterfeit. This is because a sophisticated technique is used to produce a recording image, and also such a recording material is difficult to obtain.

There are two production methods for a volume hologram, namely, a real-scene hologram and a holographic stereogram. To produce a real-scene hologram, a laser is irradiated onto an object. In contrast, a holographic stereogram is recorded based on parallax images from a number of viewpoints. The production process of a volume holographic stereogram generally includes a content production step which includes an image acquisition step, an image editing step, and other processing of the acquired images, a hologram master producing step, and a replication (mass production) step. The images are acquired by image capturing or computer graphics. Each of a plurality of images acquired in the image editing step is converted to a strip-shaped image, for example, by a cylindrical lens. The master is produced by sequentially recording interference fringes between the object beam and the reference beam of the image on a hologram recording medium as strip-shaped elementary holograms. The hologram is replicated (mass-produced) by contact printing using the master. That is, the hologram recording medium is brought into contact with the master, followed by irradiation of a laser beam, whereby the hologram is replicated.

As described above, a volume hologram itself can be replicated by bringing an unexposed hologram recording material into close contact with the hologram and irradiating a laser having a wavelength close to the recording wavelength to the recording medium. In many cases, for mass production of holograms, the same holograms are used for a number of products.

Therefore, it is desirable to provide a higher level of authentication features and anti-counterfeiting features to the hologram itself so that individual holograms themselves can be differentiated from each other. In this case, it is desirable that the identification information assigned to the holograms in order to make the individual holograms distinguishable is readable with a machine or the naked eye. Moreover, considering the use of holograms, it is desirable to provide a higher level of authentication features and anti-counterfeiting features to hologram products coupled with the hologram, thus further improving security.

JP-T-2005-535469 discloses a technique that makes counterfeiting of hologram products more difficult. According to this technique, codes are recorded or printed on a volume hologram and a document to be protected, and the hologram is attached to a document on which the same code as that recorded on the hologram is printed. In this way, a document which is reliably protected by the hologram is produced.

SUMMARY OF THE INVENTION

However, in the technique disclosed in JP-T-2005-535469, the respective holograms and the corresponding documents are integrated with each other on condition that the codes assigned thereto are cross-checked. Moreover, in addition to the fact that the holograms and the documents are integrated with each other on condition that the code recorded on the hologram corresponds to the code printed on the document, the processes of producing the holograms, printing the holograms on the documents, cross-checking the codes, and integrating the document and the hologram with each other are performed in an in-line manner.

Therefore, if the code assigned to the hologram as the additional information is unique identification information such as a consecutive serial number, when a problem occurs during printing of the hologram, a missing number may occur in the serial number. When the hologram is produced again in order to fill in the missing number, there is a problem in that the additional production results in management errors or additional cost. Moreover, when the replication apparatus is configured in an in-line manner, a problem may occur if the time to complete the hologram is different from the time to complete the document. That is, the process management is complicated since the time to complete the hologram product is governed by the process which takes the longest time.

It is therefore desirable to provide a hologram-including medium, a hologram-including medium producing apparatus, and an information determination method capable of providing anti-counterfeiting features and convenience by recording identification information recorded on a hologram and identification information recorded in a form different from the identification information in an integrated medium on which at least two items of identification information are recorded in a correlated manner.

According to an embodiment of the present invention, there is provided a hologram-including medium which is an integrated medium on which at least two items of identification information are recorded, wherein one of the two items of identification information is holographic identification information which can be observed within a predetermined angle range when illuminated from a predetermined angle.

According to another embodiment of the present invention, there is provided a hologram-including medium producing apparatus including: a light source that irradiates a reproduction illumination light from a predetermined angle onto a hologram on which holographic identification information is recorded; an imaging element that captures an image reproduced from the hologram from a predetermined direction; a recognition section that performs character recognition or image recognition on the image captured by the imaging element; an information acquisition section that reads information from a medium on which identification information is recorded; a data registration section that generates information correlated with items of identification information which are obtained from the recognition section and the information acquisition section; a database in which the information generated by the data registration section is registered; and an attaching section that integrates the hologram and the medium on which the identification information is recorded with each other.

The holographic identification information which can be observed within a predetermined angle range when illuminated from a predetermined angle is read by a predetermined reproduction illumination light. The information correlated with the read identification information is recorded on the hologram-including medium in which the hologram is integrated with a medium on which the identification information is recorded. An observer of the hologram-including medium determines whether or not at least a part of the holographic identification information is identical to at least a part of identification information different from the holographic identification information.

According to the embodiments of the present invention, it is possible to provide a higher level of authentication features than existing hologram products to a hologram-including medium. In addition, it is possible to provide a hologram-including medium having a higher level of authentication features than a single hologram and a sophisticated encrypted authentication system which are capable of authenticating the hologram-including medium the first time that a plurality of kinds of information recorded on the hologram-including medium is verified.

BRIEF DESCRIPTION OF THE DRAWINGS

FIGS. 17A and 17B are schematic diagrams showing an example of an optical system of a holographic stereogram printer.

FIGS. 24A and 24B are schematic diagrams used for general description of a viewing angle.

DESCRIPTION OF THE PREFERRED EMBODIMENTS

Hereinafter, modes for implementing the present invention (hereinafter referred to as embodiments) will be described. The embodiments will be described in the following order.
1. First Embodiment
2. Second Embodiment
3. Third Embodiment
4. Fourth Embodiment
5. Fifth Embodiment
6. Modification
7. Hologram with Additional Information Although the embodiments described below are specific examples suitable to the present invention, and technically preferable various limitations are given, the scope of the invention is not limited to the embodiments unless a statement that limits the present invention is provided in the following description.

<1. First Embodiment>

Next, a first embodiment of a hologram-including medium and a hologram-including medium producing apparatus according to the present invention will be described. In the first embodiment, identification information recorded on a hologram is read by predetermined reproduction illumination light, the hologram is integrated with a label to produce a hologram-including medium, and information correlated with the read identification information is printed on the label. An observer of the hologram-including medium is able to determine whether or not at least a part of the identification information recorded on the hologram is identical to at least one of the items of information printed on the label. Therefore, according to the first embodiment of the present invention, it is possible to provide a higher level of authentication features to the hologram-including medium. In the following description, printing is used to include recording of information other than characters.

Figure 1:
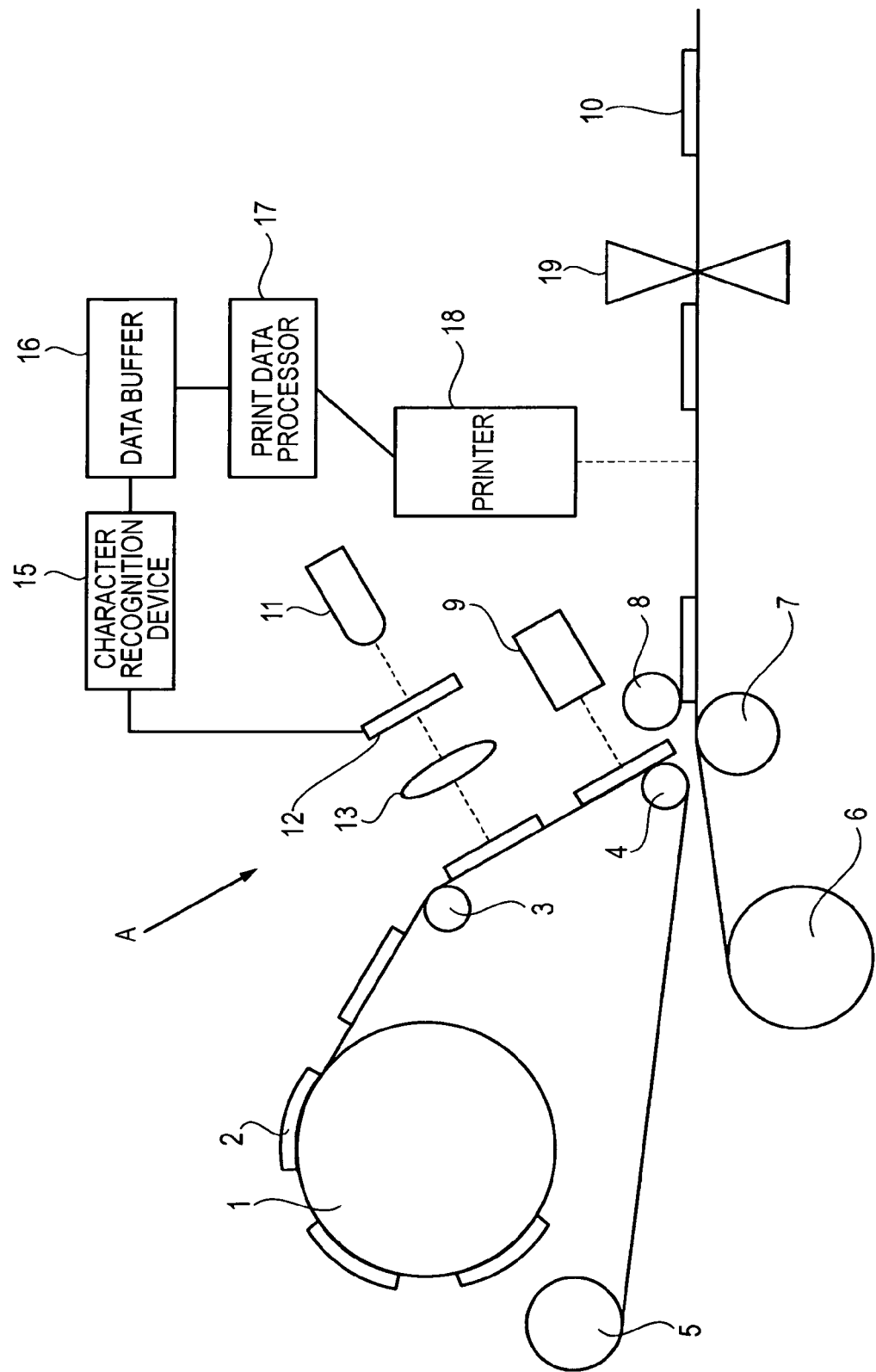
FIG. 1 is a schematic diagram showing a configuration example of a hologram-including medium producing apparatus according to a first embodiment of the present invention.

FIG. 1 is a schematic diagram showing a configuration example of a hologram-including medium producing apparatus according to the first embodiment of the present invention. As shown in FIG. 1, the hologram-including medium producing apparatus according to the first embodiment of the present invention includes a special illumination LED light source 11 (LED: Light Emitting Diode), an imaging element 12, a character recognition device 15 (OCR: Optical Character Recognition), a data buffer 16, a print data processor 17, and a printer 18. A reel-shaped hologram supply roll 1 is one in which adhesive-attached holograms 2 are formed on a lengthy separator sheet. Each of the holograms 2 has identification information recorded thereon so that the respective holograms can be identified. A reel-shaped carrier supply roll 6 is one in which a label board sheet serving as a carrier of the holograms 2 is rolled in a reel form. Hereinafter, one which is to be combined with the holograms themselves will be appropriately referred to as a carrier.

A hologram which is applied to the embodiment of the present invention is preferably a hologram in which additional information different from a hologram recorded on a hologram master is further recorded when it is replicated from the hologram master, and the additional information is identification information such as unique information (for example, a serial number). More preferably, the hologram which is applied to the embodiment of the present invention is an image recording medium in which additional information can be observed within a predetermined range of viewing angles when illuminated from a predetermined angle. The image recording medium is realized by an image recording medium which was previously proposed by the present inventors, and the details of the image recording medium will be described later. In the description of the embodiment of the present invention given below, the image recording medium is used as the hologram.

A hologram-including medium producing method according to the first embodiment of the present invention includes a step of reading identification information recorded on a hologram, a step of attaching the hologram and a label to be integrated with each other to produce a hologram-including medium, a step of generating information correlated with the identification information read from the hologram, and a step of printing information correlated with the read identification information.

Next, the operation of the hologram-including medium producing apparatus according to the first embodiment of the present invention will be described with reference to FIG. 1. The holograms 2 are continuously supplied from the hologram supply roll 1, and a separator sheet passes through a positioning roll 3 and a separation platen roller 4 to be wound around a winding roll 5. The separation platen roller 4 has a small curvature sufficient to separate the holograms 2 from the separator sheet, whereby the holograms 2 move away from the separator sheet towards a label board sheet which is continuously supplied from the carrier supply roll 6. At that time, a feeding amount sensor 9 detects the ends of the holograms 2 so that the holograms 2 can be attached at a predetermined position of the label supplied from the carrier supply roll 6. The holograms 2 separated from the separator sheet are pressure-bonded by a label bonding platen 7 and a pressure-bonding pinch roller 8 so as to be tightly attached to the label. After the holograms 2 are attached to the label, the printer 18 prints information correlated with the identification information recorded on the hologram 2 on the label. In this way, a hologram-including medium in which holograms and the label used as a carrier are integrated with each other, and information correlated with the identification information recorded on the hologram 2 is printed on the label is obtained. The hologram-including medium is cut into desired dimensions by a cutter 19.

Prior to the attaching step wherein the holograms and the label are integrated with each other, the special illumination LED light source 11 irradiates the hologram 2 via a collimator lens 14 (not shown) with reproduction illumination light 31 having a predetermined wavelength, incidence angle, and beam divergence angle. A reproduction beam 32 from the hologram 2 passes through an imaging lens 13 and is subjected to photoelectric conversion the imaging element 12. An image obtained by the photoelectric conversion is converted into text data by the character recognition device 15 and stored in the data butter 16. At that time, the positioning roll 3 and the separation platen roller 4 maintain the same positional relationship regardless of the residual amount of the hologram supply roll 1.

Figure 2:
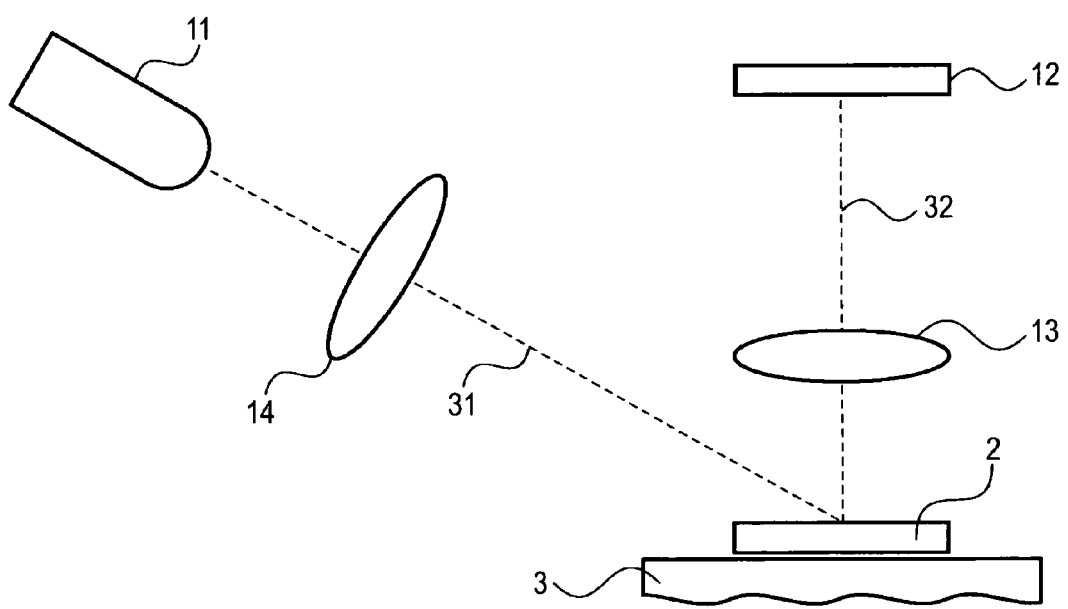
FIG. 2 is a view taken along the direction of an arrow A in FIG. 1.

FIG. 2 is a view taken along the direction of an arrow A in FIG. 1. As shown in FIG. 2, the reproduction illumination light 31 irradiated via the collimator 14 from the special illumination LED light source 11 is irradiated towards the hologram 2 from a direction in which the identification information recorded on the hologram 2 is properly reproduced. That is, the special illumination LED light source 11, the collimator lens 14, the hologram 2, the imaging lens 13, and the imaging element 12 are arranged such that the reproduction illumination light 31 is irradiated from a direction in which the brightness of the identification information which is a reproduction image becomes highest, and the identification information is imaged from a direction suitable for observation.

Figure 3:
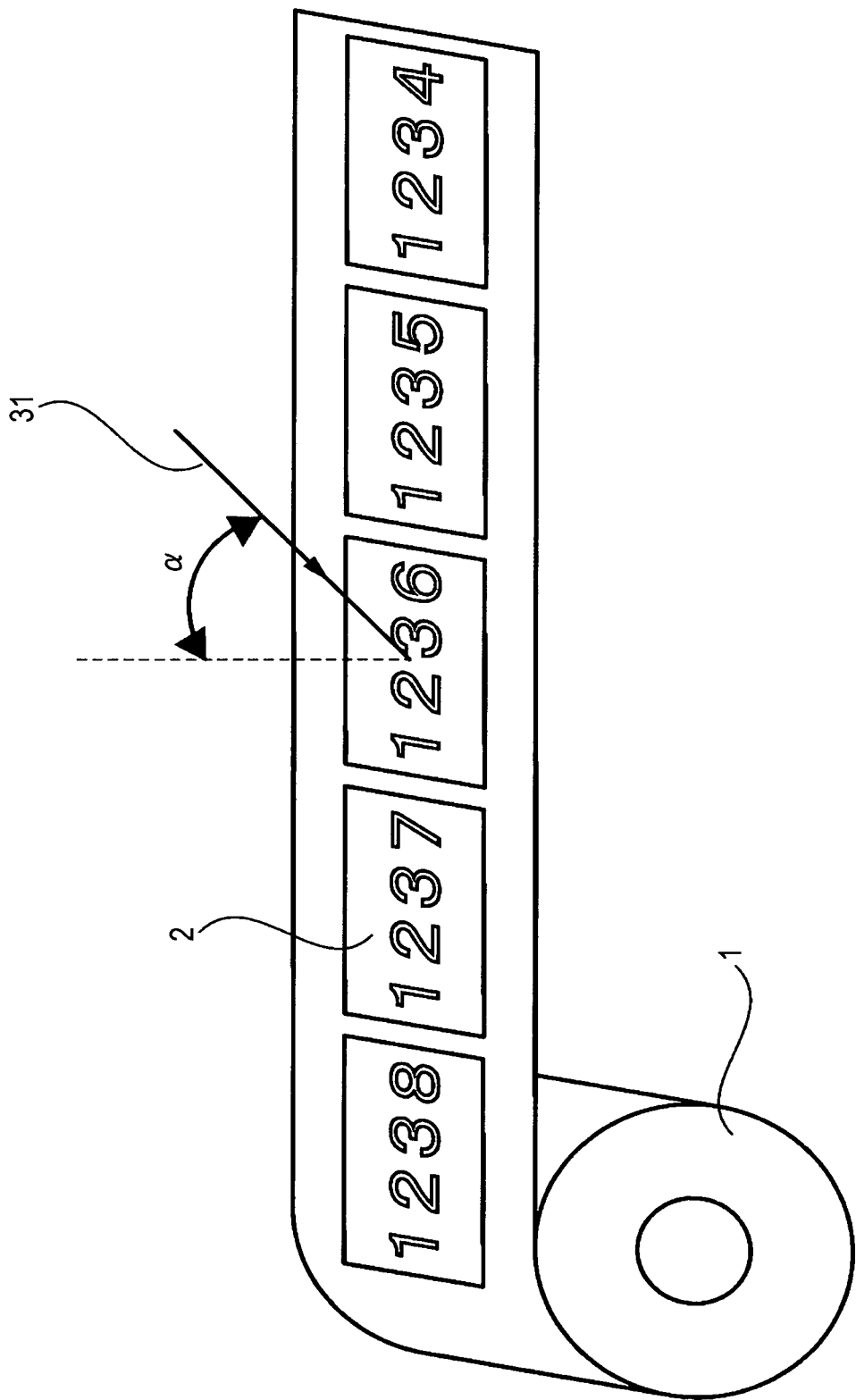
FIG. 3 is a perspective view showing a configuration example of a hologram supply roll.
Figure 4:
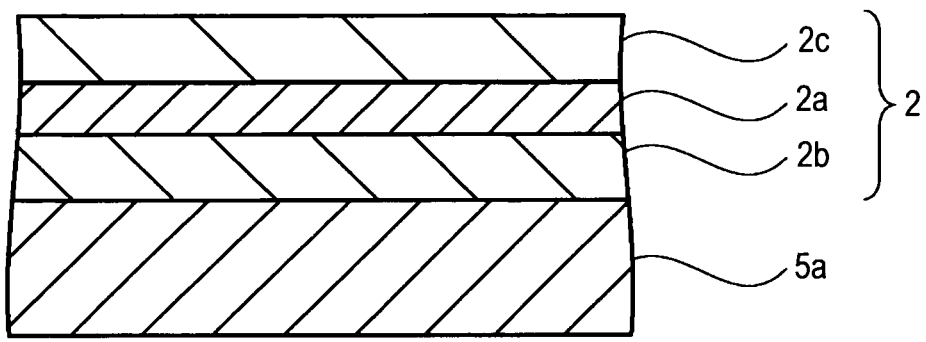
FIG. 4 is a schematic sectional view showing an example of a layer structure of a hologram formed on the hologram supply roll.

FIG. 3 is a perspective view showing a configuration example of the hologram supply roll 1. FIG. 4 is a schematic sectional view showing an example of a layer structure of the hologram 2 formed on the hologram supply roll 1. As shown in FIG. 4, the hologram 2 is formed as a laminated structure in which an adhesive 2b, a hologram recording layer 2a, and a protective layer 2c are laminated in that order on a separator sheet 5a, for example.

As described above, the adhesive-attached hologram 2 is formed on the lengthy separator sheet. In this hologram 2, identification information is recorded as additional information. FIG. 3 shows an example in which an array of 4-digit numbers is recorded as the identification information recorded on the hologram 2. As described above, the reproduction illumination light 31 is irradiated from a direction in which the brightness of a reproduction image becomes highest. FIG. 3 shows a state where the reproduction illumination light 31 is irradiated with an angle of a with respect to the normal line of the hologram. Since a sophisticated technique is used to record identification information using a holographic means, in many cases, individual items of identification information are recorded in a batch by a special apparatus in order to reduce production costs. Although a case where holograms having identification information recorded thereon are supplied in a state of being wound around a reel is shown in FIG. 3, other forms or methods may be used as long as the holograms can be supplied continuously.

After the holograms 2 are attached to the label, the printer 18 prints the information that is correlated with the information stored in the data buffer 16 on the label. For example, when a serial number is recorded on the hologram, the whole serial number itself may be printed, lengthier number data including the serial number in a part thereof may be printed, or only a part of the serial number may be printed. That is, after holograms and labels which are created individually are integrated with each other, printing is performed therein so that they are correlated with each other. In this way, a hologram-including medium 10 according to the first embodiment of the present invention is obtained. The hologram-including medium 10 can be used by attaching it to credit cards, identification cards, and the like using an adhesive or the like, for example.

Figure 5:
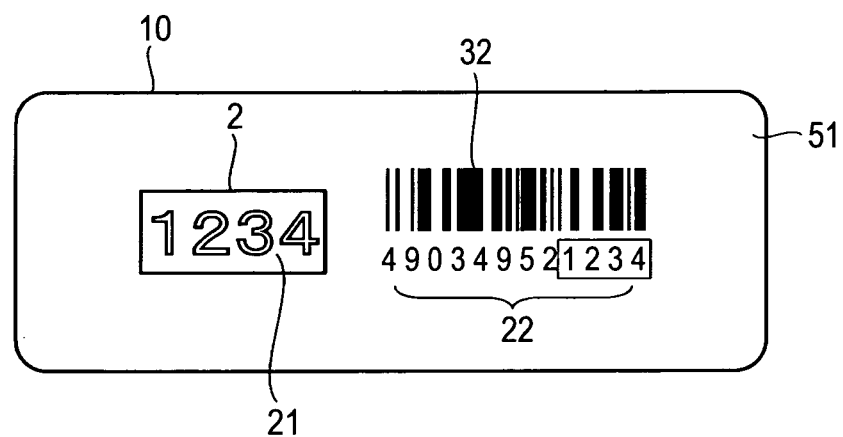
FIG. 5 shows an example of a hologram-including medium in which lengthy number data including a hologram identification information in the last four digits and the corresponding barcode thereof are printed.

FIG. 5 shows an example of the hologram-including medium 10 in which lengthy number data 22 including a hologram identification information 21 in the last four digits and the corresponding barcode 32 thereof are printed on a label 51. In FIG. 5, the last four-digit numbers identical to the hologram identification information 21 are shown in a boxed form. Since a hologram generally has a small area, the amount of information that can be printed on the hologram is small. Therefore, by increasing the amount of data printed on the label and printing the data to be printed on the label using a barcode, a two-dimensional barcode, or the like so as to be readable by a machine, the convenience of easy readability can be improved. According to the configuration example of the first embodiment of the present invention, it is possible to produce a hologram-including medium which answers to both the anti-counterfeiting features provided by the holograms, which have identification information recorded thereon and which are more difficult to produce than general mass-production holograms, and the convenience provided by machine-readable data printed on the label. In addition, by allowing users to see that at least a part of the identification information is identical to the data printed on the label, it is possible to provide a higher level of authentication features to the hologram-including medium.

<Modification of First Embodiment>

The first embodiment of the present invention is not limited to the example described above but can be modified in various ways. For example, the hologram supply and the label serving as a carrier are not limited to a roll form, but they may be supplied in a cut sheet form. The label 51 may have a sticker form in which an adhesive, a separator sheet, and the like are formed on the rear surface. Besides this, the carrier of the holograms 2 is not limited to the label but may be a document. In this case, holograms and documents which were created at different places may be correlated with each other in the future.

The material of the carrier of the holograms 2 is not limited to paper. Resin, metal, glass, or fabric may be used. When resin, metal, or glass is used, embossing or grooving may be used as a form of printing.

The identification information 21 recorded on the hologram 2 may be read after the hologram 2 and the label 51 are integrated with each other.

In the example described above, after the identification information recorded on the hologram 2 is read, the information correlated with the information stored in the data buffer 16 is printed on the carrier. However, the order of reading and printing may be reversed. That is, after identification information printed on the carrier is read, information correlated with the read identification information may be generated, and the generated information may be recorded on the hologram.

In this case, a hologram-including medium producing method includes a step of preparing a carrier having identification information printed thereon, a step of reading the identification information printed on the carrier, a step of generating information correlated with the identification information read from the carrier, a step of recording the information correlated with the read identification information on the hologram, and a step of attaching the hologram and the carrier to be integrated with each other to produce a hologram-including medium.

A hologram-including medium produced through these steps is the same as the hologram-including medium shown in FIG. 5 and is able to provide the same advantages as the hologram-including medium 10 of the first embodiment described above. The step of attaching the holograms and the carrier to be integrated with each other to obtain the hologram-including medium may appear to be similar to that disclosed in JP-T-2005-535469. However, the steps of the method according to the modification described above are not necessary to be performed in an in-line manner. Thus, the management of the steps is not complicated.

The information printed on the label 51 may appear to have no relation to the additional information reproduced from the hologram 2. That is, the information that is to be stored in the data buffer 16 and the information that is to be printed on the label 51 may only be necessary to be correlated with each other on the producing and supply side of the hologram-including medium 10, and they may not be in a one-to-one correspondence. The identification information read from the hologram 2 and the information that is to be printed on the label 51 may be held in a memory or the like in a table form or the like, or a database thereof may be constructed. By doing so, encrypted information can be used for one or both of the items of information, and the anti-counterfeiting features can be improved further. Alternatively, new encryption codes may be generated from the identification information read from the hologram 2 and the information that is to be printed on the label 51 and stored in a database. By doing so, it becomes difficult to guess, from the hologram-including medium, the encryption information stored at a location distant from the hologram-including medium, and the anti-counterfeiting features can be improved further. For example, by allowing a user to read information from a hologram-including medium using a predetermined device and refer to a database via a network such as the Internet or the like, the user is able to determine whether or not the hologram-including medium is authentic using information that does not appear on the hologram-including medium. Various methods can be used as the encryption method.

As for the printer that prints information on the label 51, various printers, in addition to an inkjet printer, such as a printer that prints information using heat-sensitive paper, a printer that prints information by transferring heat from a heat-sensitive ribbon, a printer that prints information by transferring sublimation heat, or a printer that prints information by forming laser marks can be used. The label itself may be a medium on which information can be rewritten. For example, a heat-sensitive rewritable medium may be used, and in this case, a whole or a part of the identification information recorded on the hologram 2 can be heat-sensitively written in a part of the medium.

Figure 6:
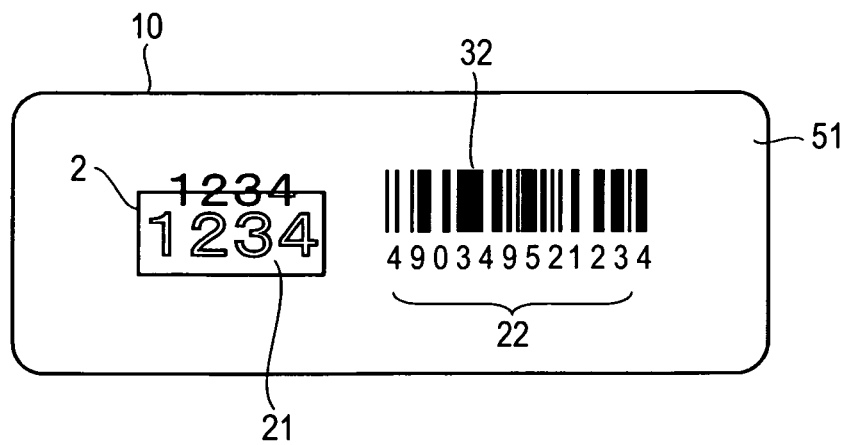
FIG. 6 shows another example of a hologram-including medium on which information is printed on a label and a hologram in a superimposed manner.

Furthermore, as shown in FIG. 6, information may be printed on the label 51 and the hologram 2 in a superimposed manner. By doing so, the effect of joint sealing is obtained, thus preventing illegal attempts to peel the hologram 2 off the label 51 to attach it to another label. Moreover, instead of printing data on the label board sheet which is the carrier, data may be printed on the hologram-including medium itself, namely on a hologram layer that forms the hologram 2, or on a layer closer to the observer than the hologram layer or a layer opposite the observer-side layer. When printing is performed by forming laser marks, the laser marks may be formed inside the hologram-including medium as well as on the surface thereof.

<2. Second Embodiment>

Next, a second embodiment of the hologram-including medium and the hologram-including medium producing apparatus according to the present invention will be described. In the second embodiment, identification information recorded on a hologram is read by predetermined reproduction illumination light, and the hologram is integrated with an RF (Radio Frequency) tag to produce a hologram-including medium, and information correlated with the read identification information is written into the RF tag. An observer of the hologram-including medium is able to authenticate the hologram-including medium using an RFID (Radio Frequency IDentification) which is already stored in the RF tag. Therefore, according to the second embodiment of the present invention, it is possible to authenticate the hologram-including medium the first time that it is read by an RFID reader and provide a sophisticated encrypted authentication system.

Figure 7:
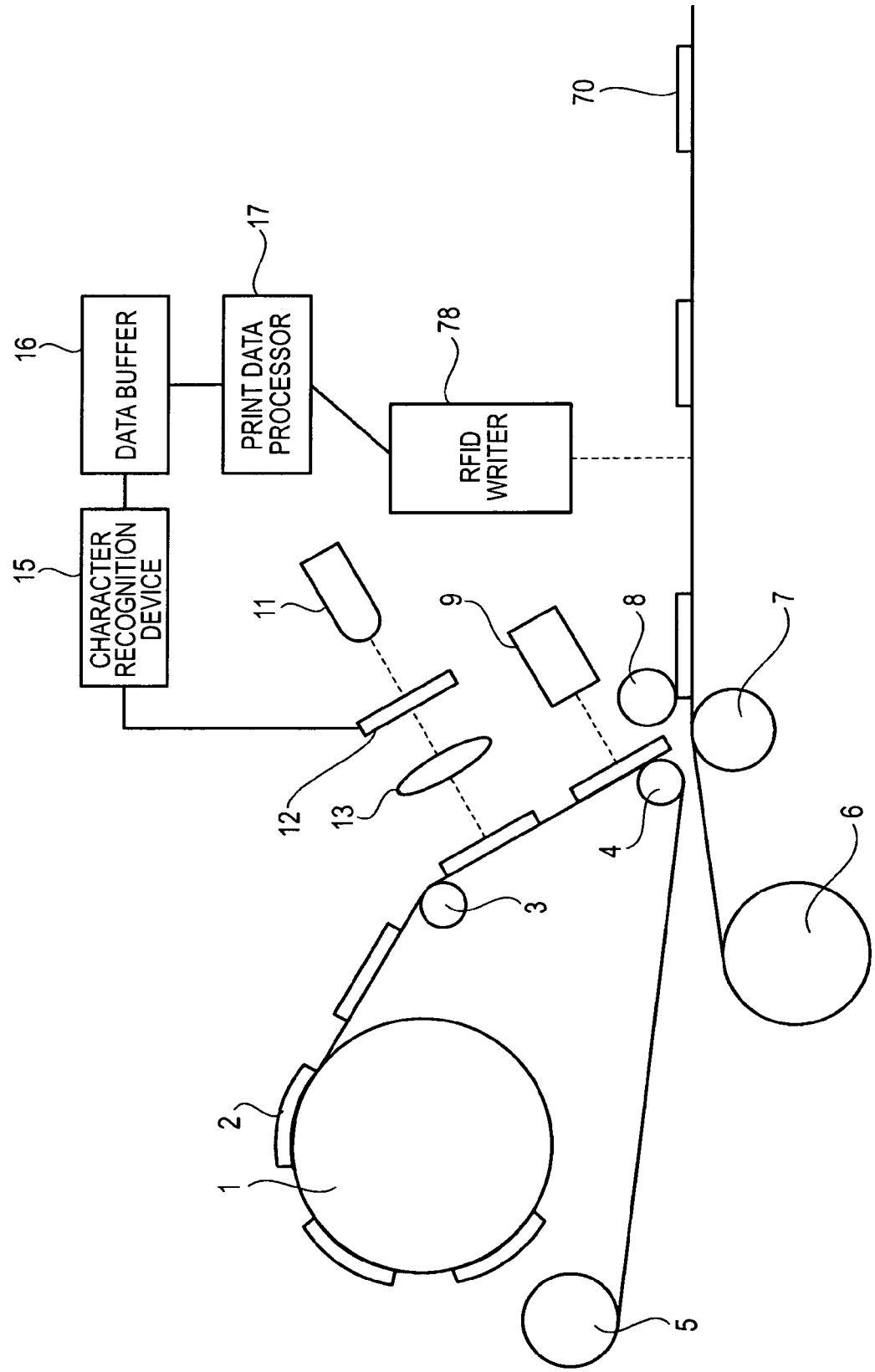
FIG. 7 is a schematic diagram showing a configuration example of a hologram-including medium producing apparatus according to a second embodiment of the present invention.

FIG. 7 is a schematic diagram showing a configuration example of a hologram-including medium producing apparatus according to the second embodiment of the present invention. As shown in FIG. 7, the hologram-including medium producing apparatus according to the second embodiment of the present invention is the same as that of the first embodiment in that it includes the special illumination LED light source 11, the imaging element 12, the character recognition device 15, the data buffer 16, and the print data processor 17. The hologram-including medium producing apparatus is different from that of the first embodiment in that it includes an RFID writer 78 instead of the printer 18. In addition to a configuration in which the printer 18 is replaced with the RFID writer 78, a configuration in which the RFID writer 78 is added to the printer 18 may be used. Moreover, from the reel-shaped carrier supply roll 6, instead of the label, an RF tag such as a non-contact IC card (Integrated Circuit card) which is supported on a lengthy separator sheet is continuously supplied. In this case, the non-contact IC card serving as the carrier is not limited to a roll form but may be supplied in a state of being supported on a sheet.

A hologram-including medium producing method according to the second embodiment of the present invention includes a step of reading identification information recorded on a hologram, a step of attaching the hologram and an RF tag to be integrated with each other to produce a hologram-including medium, a step of generating information correlated with the identification information read from the hologram, and a step of writing information correlated with the read identification information into the RF tag. Similarly to the first embodiment, in the step of reading the identification information recorded on the hologram, it is important to define a light source used for reading information from the hologram and an imaging angle from a predetermined position.

Figure 8:
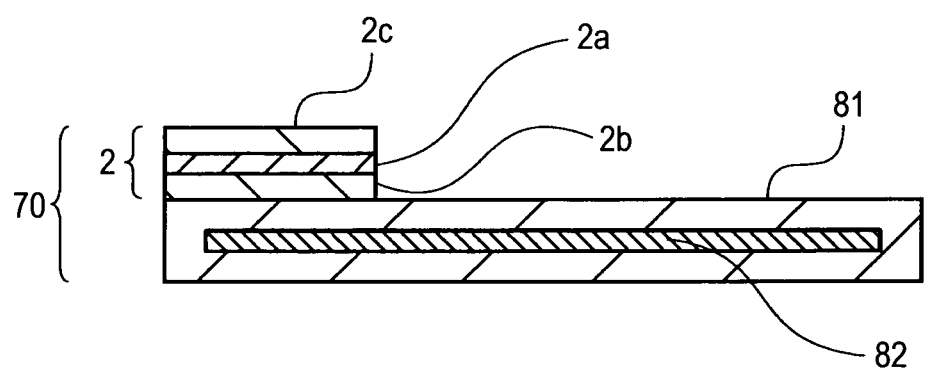
FIG. 8 is a schematic sectional diagram showing a configuration example of a hologram-including medium according to the second embodiment of the present invention.

FIG. 8 is a schematic sectional view showing a configuration example of a hologram-including medium 70 according to the second embodiment of the present invention. As shown in FIG. 8, the hologram-including medium according to the second embodiment of the present invention has a configuration in which a hologram 2 having identification information recorded as additional information is integrated with an RF tag 82 in which information correlated with the identification information read from the hologram 2 is written. In this example, the RF tag 82 is embedded in a cover material 81 (for example, resin), and the hologram 2 is attached onto the cover material 81. Depressions are formed, by milling or the like, at a position of the cover material 81 where the hologram 2 is to be attached so that the hologram-including medium has a flat surface when the hologram 2 is attached.

Similarly to the first embodiment, the information that is to be stored in the data buffer 16 and the information that is to be written into the RF tag 82 may only be necessary to be correlated with each other, and they may not be in a one-to-one correspondence. Similarly, new encryption codes may be generated from the information written into the RE tag 82 and the additional information reproduced from the hologram 2. For example, by allowing a user to read information recorded on the RE tag 82 of the hologram-including medium 70 using a personal computer having an RFID reader and refer to a database via a network such as the Internet or the like, the user is able to determine whether or not the hologram-including medium 70 is authentic using information that does not appear on the hologram-including medium.

<Modification of Second Embodiment>

The second embodiment of the present invention is not limited to the example described above but can be modified in various ways. Similarly to the modification of the first embodiment, a hologram-including medium may be produced by reading identification information recorded on an RE tag, generating information correlated with the read identification information, recording the generated information on a hologram, attaching the hologram and the RF tag to be integrated with each other. According to this configuration, it is also possible to authenticate the hologram-including medium the first time that it is read by an RFID reader and provide a sophisticated encrypted authentication system.

Figure 9:
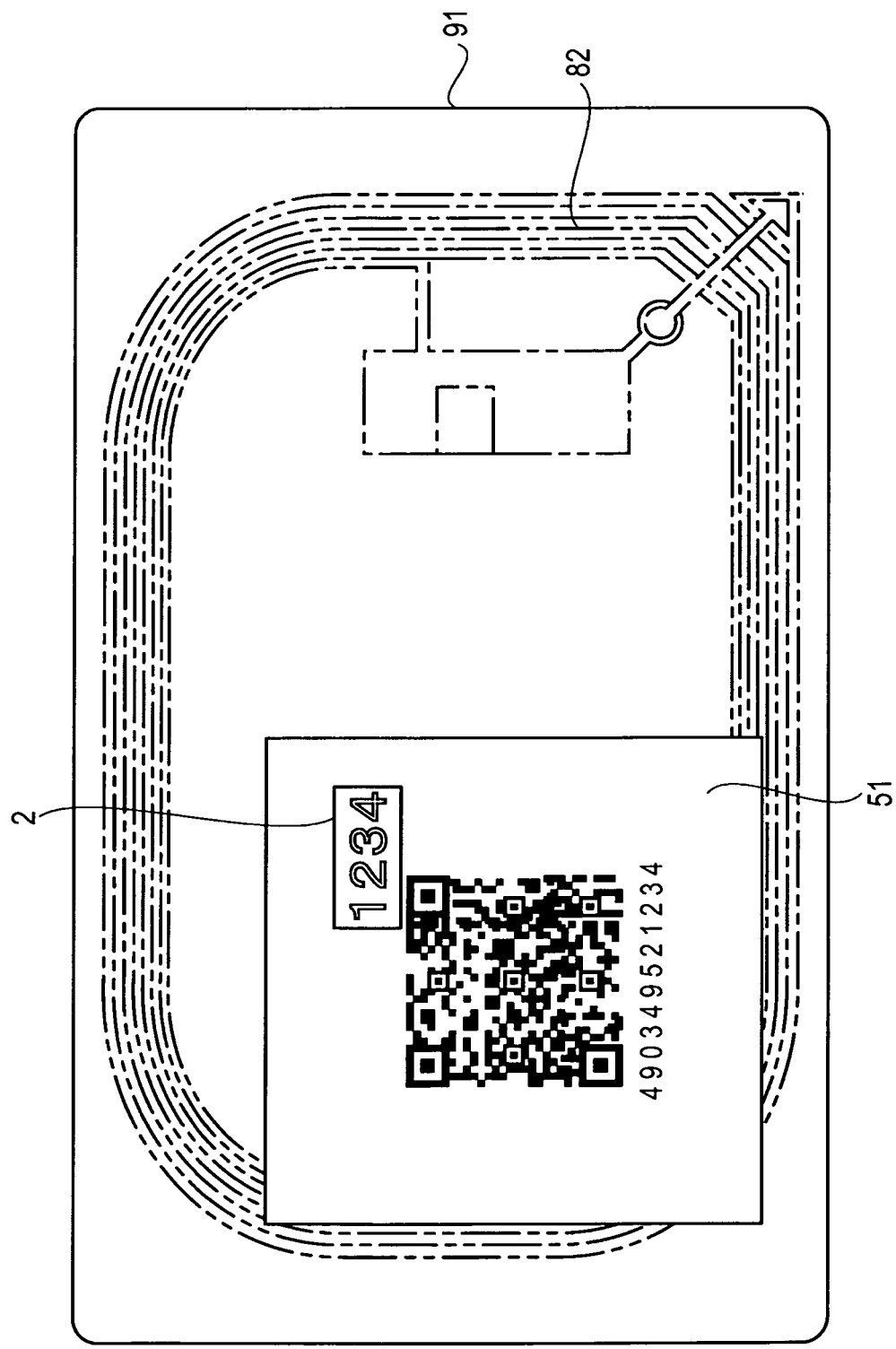
FIG. 9 shows an example of a hologram-including medium in which lengthy number data including a hologram identification information in the last four digits and the corresponding two-dimensional barcode thereof are printed on a label, which label is attached and integrated with a non-contact IC card.

Moreover, a form which is combined with the first embodiment may be used. FIG. 9 shows an example of a hologram-including medium in which lengthy number data including a hologram identification information in the last four digits and the corresponding two-dimensional barcode thereof are printed on a label 51, and to which the label 51 is attached and integrated with a non-contact IC card 91. In this example, the hologram-including medium can be used as a medium in which the identification information recorded on the hologram 2, the information printed on the two-dimensional barcode, and the information written into the RF tag 82 are combined with each other.

For example, when the hologram-including medium according to the second embodiment is used as an identification card or the like, the following usage is possible. A serial number of an issued hologram-including medium is recorded on the hologram 2, information such as an issuance number that is to be managed on the provider side of the hologram-including medium is recorded on the two-dimensional barcode, and personal information is recorded on the RF tag. When the hologram-including medium is configured in the above manner, since the RF tag 82 is embedded in the hologram-including medium, a plurality of hologram-including media can be read in a batch using an RFID reader. When the hologram-including medium having such a configuration is used as an admission ticket to an exhibition or the like, for example, the following usage is possible. Upon receiving the admission ticket, the additional information of the hologram and the lengthy number data including the hologram identification information printed on the label in the last four digits are cross-checked with the naked eye. Each participant acquires information on the barcode using a barcode reader. The host reads the collected hologram-including media in a batch using an RFID reader, thus easily obtaining statistics about the visitors.

Besides this, a paper having an RF tag embedded therein may be used as the carrier of the holograms 2. In this case, holograms and documents which were created at different places may be correlated with each other in the future. The material in which the RF tag is embedded is not limited to a document but may be a label board sheet. Moreover, when the RF tag is embedded in a part of a product or a package, it is possible to guarantee the authenticity of the product and manage the circulation of the product.

As described above, by making the additional information recorded on the hologram identical to a part or a whole of the printed data, it is possible to provide a higher level of authentication features without using other tools. In addition, it is possible to authenticate the information that is not printed the first time that it is read by an RFID reader and provide a sophisticated encrypted authentication system.

<3. Third Embodiment>

Next, a third embodiment of the hologram-including medium and the hologram-including medium producing apparatus according to the present invention will be described. In the third embodiment, a hologram is integrated with a label to produce a hologram-including medium, and identification information of the hologram read by predetermined reproduction illumination light is registered on a database so as to be correlated with information read from the label. An observer of the hologram-including medium is able to authenticate the hologram-including medium by checking, for example, with the naked eye, the identification information recorded on the hologram and verifying the identification information through the database together with the information read from the label using a barcode reader or the like. Therefore, according to the third embodiment of the present invention, it is possible to authenticate the hologram-including medium the first time that a plurality of kinds of information recorded on the hologram-including medium is verified through the database and provide a higher level of authentication features than that provided by a single hologram to the hologram-including medium.

Figure 10:
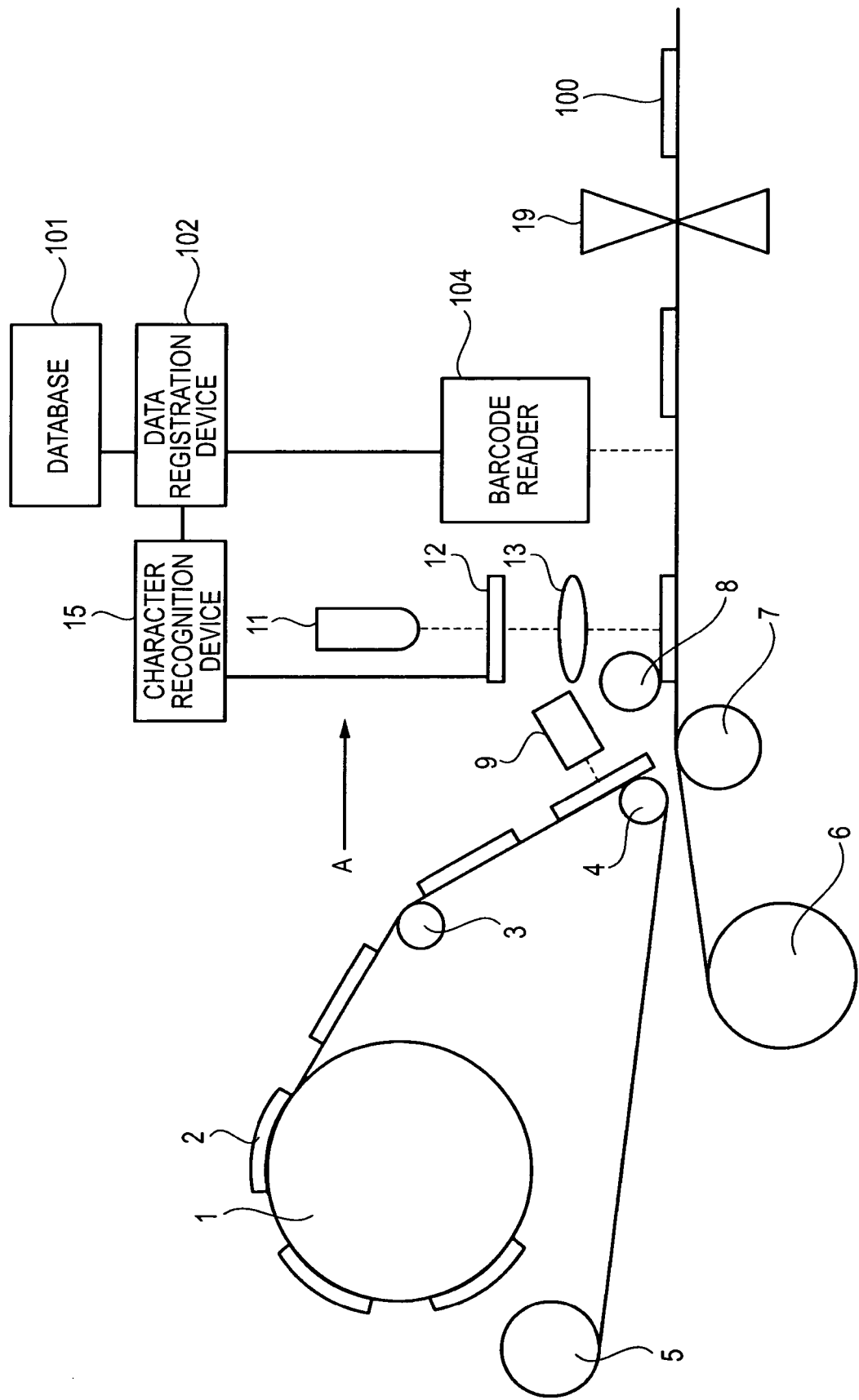
FIG. 10 is a schematic diagram showing a configuration example of a hologram-including medium producing apparatus according to a third embodiment of the present invention.

FIG. 10 is a schematic diagram showing a configuration example of a hologram-including medium producing apparatus according to the third embodiment of the present invention. As shown in FIG. 10, the hologram-including medium producing apparatus according to the third embodiment of the present invention is different from that of the first embodiment, in that it includes a data registration device 102 instead of the data buffer 16 and a barcode reader 104 instead of the printer 18 and additionally includes a database 101. Similarly to the first embodiment, from the carrier supply roll 6, a label board sheet serving as the carrier of the holograms 2 is supplied. On the label board sheet, identification information, for example, for identifying individual labels is recorded on a form of a two-dimensional barcode or the like. In this configuration example, after the holograms are integrated with the carrier, the identification information recorded on the hologram is read.

Figure 11:
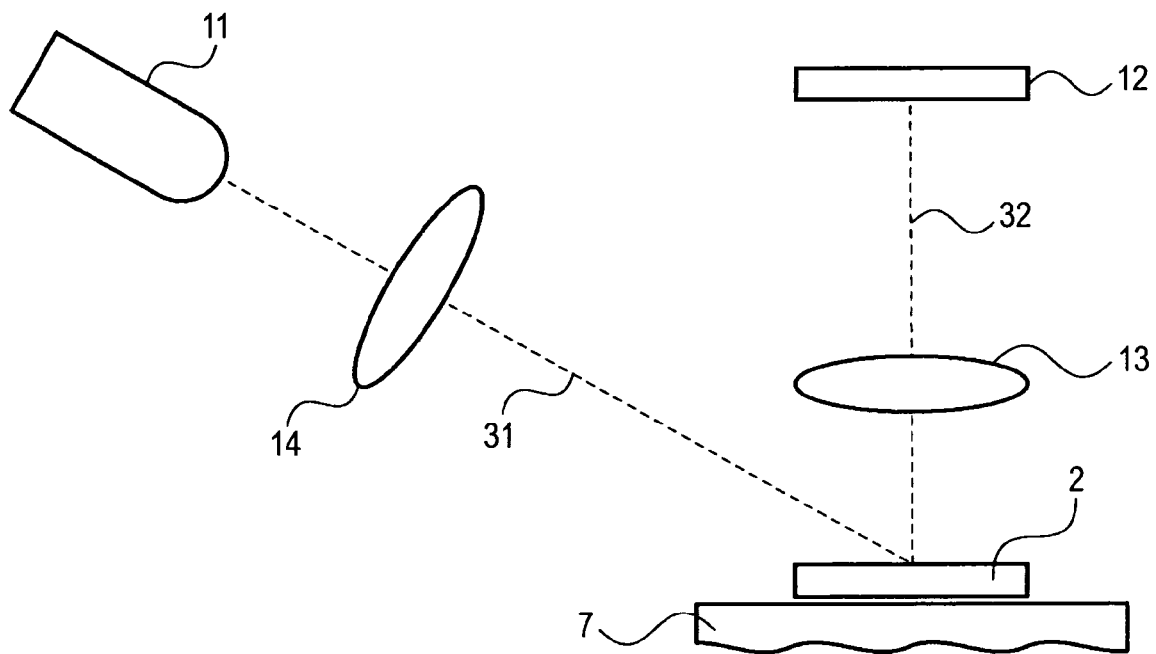
FIG. 11 is a view taken along the direction of an arrow A in FIG. 10.

FIG. 11 is a view taken along the direction of an arrow A in FIG. 10. As shown in FIG. 11, similarly to the first and second embodiments, the reproduction illumination light 31 irradiated via the collimator lens 14 from the special illumination LED light source 11 is irradiated towards the hologram 2 from a direction in which the identification information recorded on the hologram 2 is properly reproduced. That is, the special illumination LED light source 11, the collimator lens 14, the hologram 2, the imaging lens 13, and the imaging element 12 are arranged such that the reproduction illumination light 31 is irradiated from a direction in which the brightness of the identification information which is a reproduction image becomes highest, and the identification information is imaged from a direction suitable for observation.

A hologram-including medium producing method according to the third embodiment of the present invention includes a step of attaching a hologram and a label to be integrated with each other to produce a hologram-including medium, a step of reading identification information recorded on the hologram, a step of reading identification information recorded on the label, and a step of registering the items of identification information read from the hologram and the label on a database in a correlated manner. Similarly to the first and second embodiments, in the step of reading the identification information recorded on the hologram, it is important to define a light source used for reading information from the hologram and an imaging angle from a predetermined position.

According to the third embodiment of the present invention, since the identification information recorded on the hologram 2 and the identification information recorded on the label are registered on the database 101 in a correlated manner, the hologram and the carrier may be produced individually and may not be correlated with each other. That is, the items of identification information which were originally recorded on the hologram and the carrier may not be correlated with each other. This means that the hologram-including medium is very suitably used for production management and particularly for guaranteeing traceability.

Figure 12:
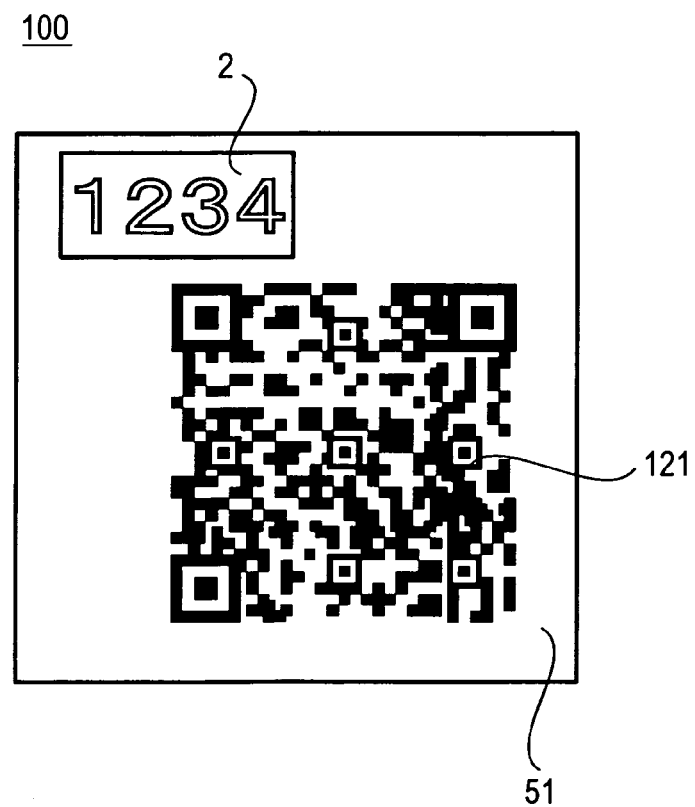
FIG. 12 shows an example of a hologram-including medium in which a hologram with identification information and a label with a two-dimensional barcode are integrated with each other.

FIG. 12 shows an example of a hologram-including medium 100 in which a hologram 2 with identification information and a label 51 with a two-dimensional barcode 121 are integrated with each other. The hologram-including medium 100 in which the hologram 2 and the carrier are integrated with each other can be authenticated by referring to the database 101. That is, the identification information recorded on the hologram 2 is checked, for example, with the naked eye, and verified through the database 101 together with the information read by the barcode reader.

<Modification of Third Embodiment>

The third embodiment of the present invention is not limited to the example described above but can be modified in various ways. For example, similarly to the first and second embodiments, encrypted information can be used for one or both of the items of identification information read from the hologram and the label, and the anti-counterfeiting features can be improved further. Besides this, the data registration device may have the function of an encryptor that generates encryption codes from the items of identification information read from the hologram and the label. That is, a mapping may be generated from the items of identification information read from the hologram and the label and registered on a database. Alternatively, the items of identification information read from the hologram and the label may be subjected to an arithmetic operation, and the result of the operation may be registered on the database. The newly generated encryption codes become difficult for a third party to guess from the hologram-including medium even when the third party has illegally obtained the hologram-including medium.

Moreover, for example, the number of items of identification information recorded on the label is not limited to one. A plurality of two-dimensional barcodes having other information recorded thereon may be printed, and may be combined with a sequence of numbers, characters, or the like, a symbol, a barcode, or the like. In the step of registering the items of identification information read from the hologram and the label on the database in a correlated manner, they are not necessarily in a one-to-one correspondence but may be in a multiple-to-multiple correspondence. When a plurality of items of identification information are recorded on the label, the barcode reader 104 may be substituted with an appropriate reading means corresponding to the form of the printed information or may be combined with other reading means.

The carrier is not limited to the label. The carrier may be a document, and the material of the carrier is not limited to a paper. As for the form of printing, in addition to the form of dots, pores or notches may be formed, and embossing or grooving may be used.

Moreover, for example, individual IDs of discs may be used as the identification information correlated to the identification information of the hologram. That is, when a unique identification information is recorded in advance on a Blu-ray Disc (registered trademark), a DVD (Digital Video Disc), a CD (Compact Disc), or the like, information read by a disc player may be correlated with the identification information of the hologram. By doing so, for example, whether or not a recording medium that is to be reproduced is authentic, namely whether or not it is a pirated version, can be verified through a database from a disc player connected to a network. Moreover, for example, an instruction may be sent to the disc player so as not to play back the disc determined to be a pirated version, or billing information may be exchanged between a database and a disc player that plays back a recording medium having a program or music recorded thereon.

<4. Fourth Embodiment>

Next, a fourth embodiment of the hologram-including medium and the hologram-including medium producing apparatus according to the present invention will be described. In the fourth embodiment, a hologram is integrated with an RF tag to produce a hologram-including medium, and identification information of the hologram read by predetermined reproduction illumination light is registered on a database so as to be correlated with information read from the RF tag. An observer of the hologram-including medium is able to authenticate the hologram-including medium by checking, for example, with the naked eye, the identification information recorded on the hologram and verifying the identification information through the database together with the identification information read by an RFID reader. Therefore, according to the fourth embodiment of the present invention, it is possible to authenticate the hologram-including medium the first time that a plurality of kinds of information recorded on the hologram-including medium is verified through the database and provide a higher level of authentication features than that provided by a single hologram to the hologram-including medium.

Figure 13:
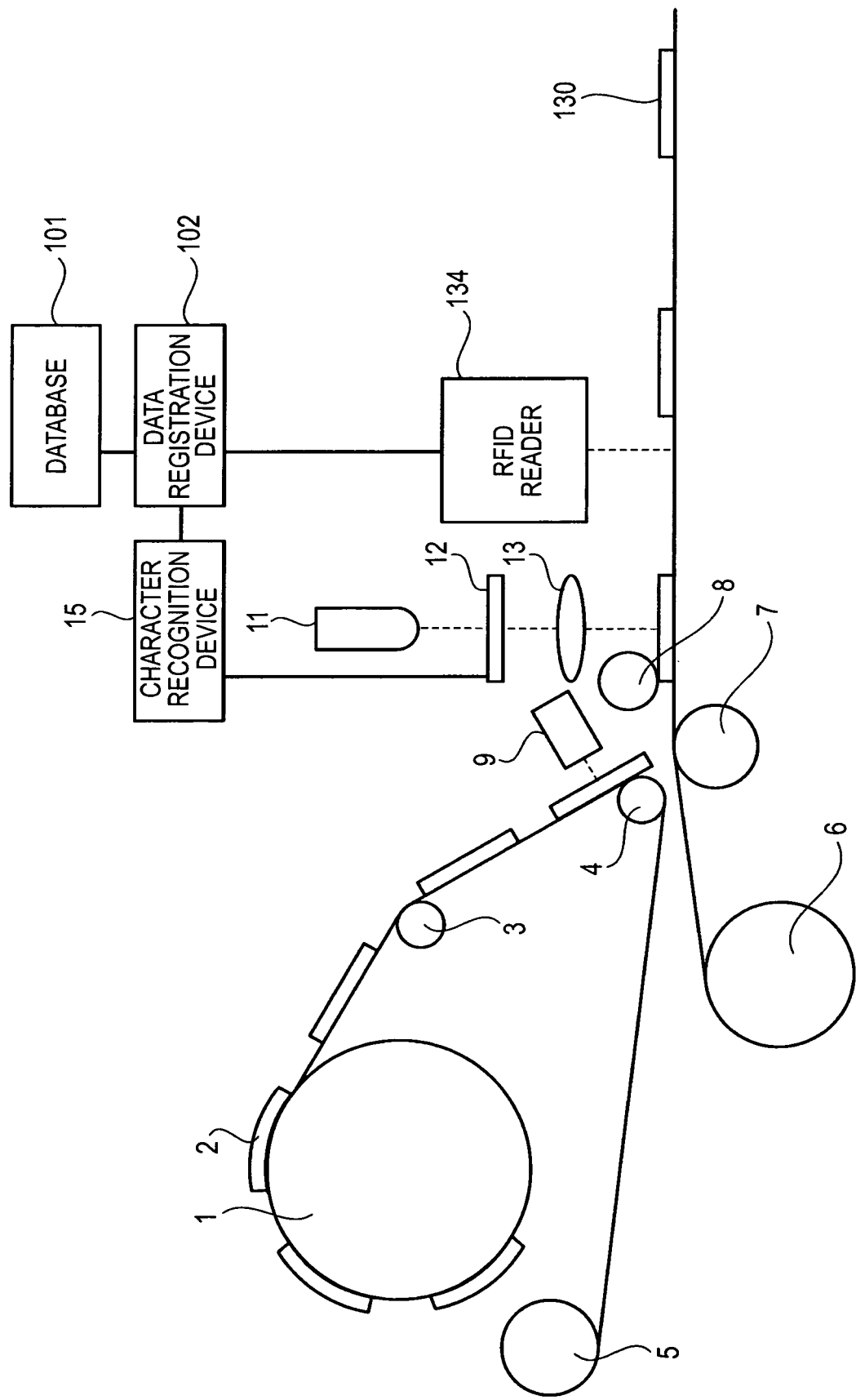
FIG. 13 is a schematic diagram showing a configuration example of a hologram-including medium producing apparatus according to a fourth embodiment of the present invention.

FIG. 13 is a schematic diagram showing a configuration example of a hologram-including medium producing apparatus according to the fourth embodiment of the present invention. As shown in FIG. 13, the hologram-including medium producing apparatus according to the fourth embodiment of the present invention is different from that of the third embodiment, in that it includes an RFID reader 134 instead of the barcode reader 104. In this configuration example, after the holograms are integrated with the carrier, the identification information recorded on the holograms are read.

A hologram-including medium producing method according to the fourth embodiment of the present invention includes a step of attaching a hologram and an RF tag to be integrated with each other to produce a hologram-including medium, a step of reading identification information recorded on the hologram, a step of reading identification information recorded on the RF tag, and a step of registering the items of identification information read from the hologram and the RF tag on a database in a correlated manner. Similarly to the first to third embodiments, in the step of reading the identification information recorded on the hologram, it is important to define a light source used for reading information from the hologram and an imaging angle from a predetermined position.

According to the fourth embodiment of the present invention, since the identification information recorded on the hologram 2 and the identification information recorded on the RF tag are registered on the database 101 in a correlated manner, the hologram and the carrier may be produced individually and may not be correlated with each other. That is, the items of identification information which were originally recorded on the hologram and the carrier may not be correlated with each other. Similarly to the third embodiment, this means that the hologram-including medium is very suitably used for production management and particularly for guaranteeing traceability.

A hologram-including medium 130 in which the hologram 2 and the carrier are integrated with each other can be authenticated by referring to the database 101. That is, the identification information recorded on the hologram 2 is checked, for example, with the naked eye, and verified through the database 101 together with the information read by the RFID reader.

<Modification of Fourth Embodiment>

The fourth embodiment of the present invention is not limited to the example described above but can be modified in various ways. For example, similarly to the first to third embodiments, encrypted information can be used for one or both of the items of identification information read from the hologram and the RF tag, and the anti-counterfeiting features can be improved further. Besides this, the data registration device may have the function of an encryptor that generates encryption codes from the items of identification information read from the hologram and the RF tag. That is, a mapping may be generated from the items of identification information read from the hologram and the RF tag and registered on a database. Alternatively, the items of identification information read from the hologram and the RF tag may be subjected to an arithmetic operation, and the result of the operation may be registered on the database. The newly generated encryption codes become difficult for a third party to guess from the hologram-including medium even when the third party has illegally obtained the hologram-including medium.

Similarly to the third embodiment, in the step of registering the items of identification information read from the hologram and the RF tag on the database in a correlated manner, they are not necessarily in a one-to-one correspondence but may be in a multiple-to-multiple correspondence.

<5. Fifth Embodiment>

Next, a fifth embodiment of the hologram-including medium and the hologram-including medium producing apparatus according to the present invention will be described. In the fifth embodiment, a hologram is integrated with an RF tag to produce a hologram-including medium, new information is generated from identification information of the hologram read by predetermined reproduction illumination light and information read from the RF tag, and these items of identification information are registered on a database in a correlated manner. In addition, the newly generated identification information is recorded on the RF tag. An observer of the hologram-including medium is able to authenticate the hologram-including medium by checking, for example, with the naked eye, the identification information recorded on the hologram, reading the newly generated identification information using an RFID reader, and verifying these items of identification information through the database. According to the fifth embodiment of the present invention, the information recorded on the RF tag is different from the information which was originally recorded on the RF tag. Thus, it is possible to authenticate the hologram-including medium the first time that a plurality of kinds of information recorded on the hologram-including medium is verified through the database and provide a higher level of authentication features than that provided by a single hologram to the hologram-including medium.

Figure 14:
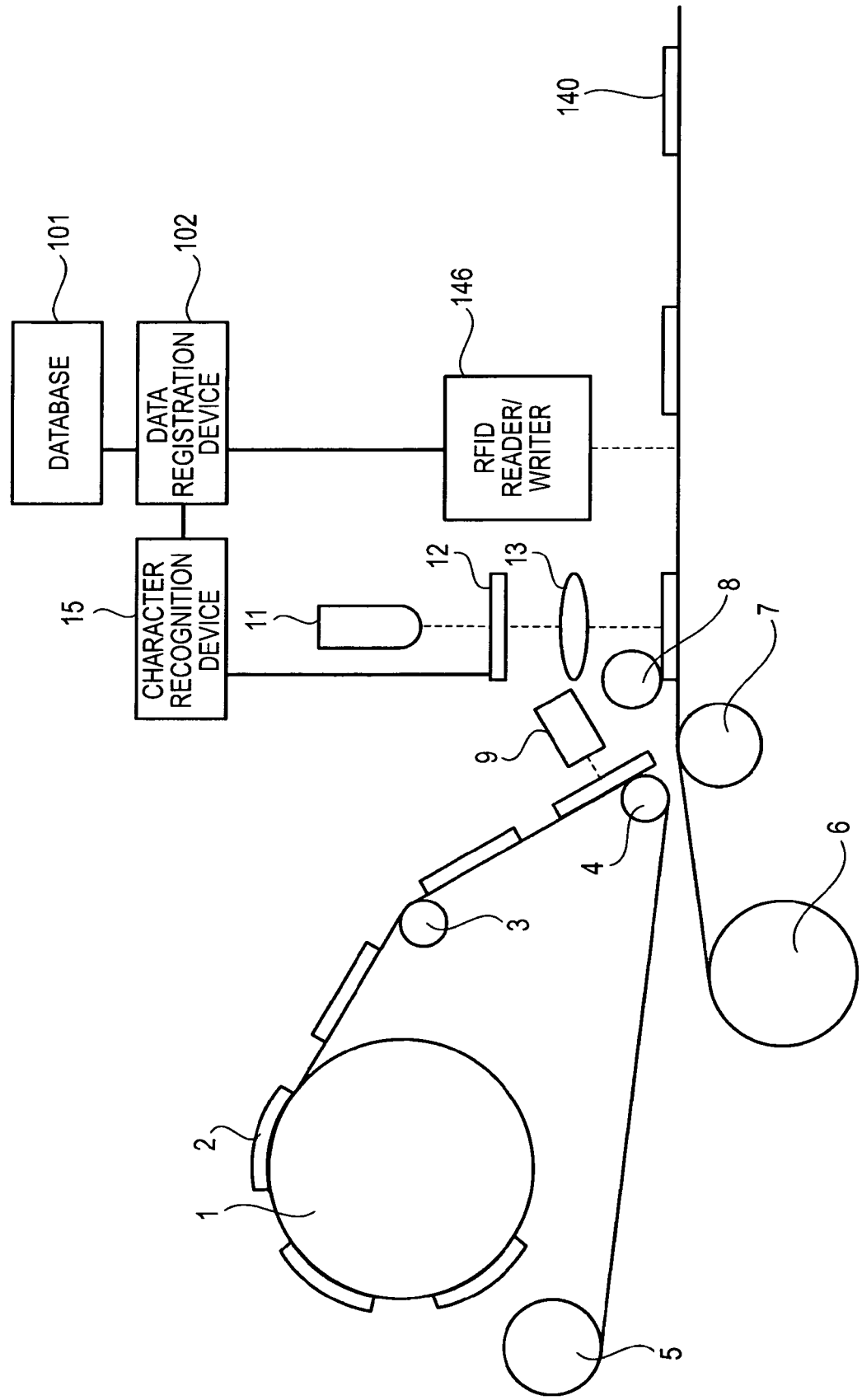
FIG. 14 is a schematic diagram showing a configuration example of a hologram-including medium producing apparatus according to a fifth embodiment of the present invention.

FIG. 14 is a schematic diagram showing a configuration example of a hologram-including medium producing apparatus according to the fifth embodiment of the present invention. As shown in FIG. 14, the hologram-including medium producing apparatus according to the fifth embodiment of the present invention is different from that of the fourth embodiment, in that it includes an RFID reader/writer 146 instead of the RFID reader 134.

A hologram-including medium producing method according to the fifth embodiment of the present invention includes a step of attaching a hologram and an RF tag to be integrated with each other to produce a hologram-including medium, a step of reading identification information recorded on the hologram, a step of reading information recorded on the RF tag, a step of generating information correlated with the items of information read from the hologram and the RF tag, a step of registering these items of information on a database in a correlated manner, and a step of writing the correlated information into the RF tag. Similarly to the first to fourth embodiments, in the step of reading the identification information recorded on the hologram, it is important to define a light source used for reading information from the hologram and an imaging angle from a predetermined position.

According to the fifth embodiment of the present invention, since the identification information recorded on the hologram 2, the information recorded on the RF tag, and the information newly generated from these items of information are registered on the database 101 in a correlated manner, the hologram and the carrier may be produced individually and may not be correlated with each other. That is, the items of identification information which were originally recorded on the hologram and the carrier may not be correlated with each other. Similarly to the third and fourth embodiments, this means that the hologram-including medium is very suitably used for production management and particularly for guaranteeing traceability.

In a hologram-including medium 140 in which the hologram and the carrier are integrated with each other, the information that is newly generated from the identification information recorded on the hologram 2 and the information recorded on the RF tag is rewritten or overwritten. Since these items of information are registered on the database 101 in a correlated manner, they can be authenticated by referring to the database 101. That is, the fifth embodiment provides the same advantages as the fourth embodiment, in that the identification information recorded on the hologram 2 is checked, for example, with the naked eye, and verified through the database 101 together with the information read by the RFID reader.

<Modification of Fifth Embodiment>

The information written into the RF tag is greatly different from the information which was originally recorded on the RF tag. Therefore, similarly to the modification of the third embodiment and the modification of the fourth embodiment, the data registration device may have the function of an encryptor that generates encryption codes from the items of information read from the hologram and the RF tag. By doing so, new advantages can be obtained. That is, when the encryption codes generated by the encryptor are overwritten and held in the RF tag, it becomes very difficult to guess the information registered on the database 101 from the hologram-including medium 140. A plurality of different encryption codes other than the encryption code that is to be written into the RF tag may be generated, correlated with each other, and registered on the database 101.

Moreover, the information newly generated from the identification information recorded on the hologram 2 and the information recorded on the RF tag may be recorded as additional information on a second hologram different from the hologram (hereinafter appropriately referred to as a first hologram) as well as being rewritten or overwritten into the RF tag. The second hologram may be produced in a step or place different from the step or place where the hologram and the RF tag are integrated with each other to produce the hologram-including medium. Thus, it becomes very difficult to guess the information added to the second hologram which is produced in a different place from the identification information of the first hologram.

Therefore, a hologram-including medium in which the second hologram is additionally combined with the hologram-including medium in which the first hologram and the RF tag are integrated with other will have very strong anti-counterfeiting features and authentication features. This is because the information read from the hologram-including medium and the information that is to be recorded on the hologram-including medium can be correlated in a multiple-to-multiple correspondence and registered on the database. The number of holograms is not limited to two but may be any number.

The fifth embodiment of the present invention is not limited to the example described above but can be modified in various ways. Since the information recorded on the RF tag can be rewritten in various stages, the hologram-including medium using the RF tag can be suitably used for a product which falls into the hands of many and unspecified persons, or which is produced through a number of steps.

The hologram-including medium 140 according to the fifth embodiment of the present invention can be applied to a craft product as well as a product made by mass production. For example, when the hologram-including medium is applied to a painting, an RF tag may be embedded in an expendable item such as a canvas sheet, and a hologram 2 having identification information recorded thereon may be attached to the rear surface of the canvas sheet in a form such that the hologram 2 is not easily separated. When the RF tag has a dimension of about 1 mm by 1 mm or less, the RF tag can be embedded in a part of the painting together with the paint. The artist generates an encryption code from information determined by him or her in regard to the completed painting and the identification information recorded on the hologram 2 and records the encryption code in the RF tag using an RFID writer. These items of information are correlated with each other and registered on the database 101. By doing so, whether or not the painting is authentic can be determined for the first time based on the unique information held by the artist. That is, since the information recorded on the RF tag is rewritable, by writing new encryption codes whenever the owner of the painting is changed, it is possible to facilitate reliable appraisal and a history of verification.

<6. Modification>

While specific embodiments of the present invention have been described, the present invention is not limited to the foregoing embodiments and various modifications can be made based on the technical spirit of the present invention. FIGS. 37 to 45 are schematic diagrams showing the embodiments of the present invention and the modifications of the embodiments.

The layer structure of the hologram is not limited to the structure shown in FIG. 4. The protective layer may have a plurality of layers and may be omitted, and various adhesives may be used. The hologram is not limited to the volume hologram, and various kinds of holograms such as an embossed hologram may be used. The supply sources of the hologram and the carrier may be different from each other.

The identification information recorded on the hologram as the additional information is not limited to an array of numbers, and various kinds of information may be used as long as they are unique. For example, various kinds of information such as a serial number, a manufacturer name, a lot number, or biometric information may be recorded. The recorded form is not limited to characters, symbols, figures, and a combination thereof, and image information other than the identification information such as a one-dimensional barcode or a two-dimensional barcode may be recorded. When identification information other than characters is recorded on the hologram, the hologram-including medium producing apparatus may include an image recognition means instead of the character recognition device 15. In addition, two or more items of additional information may be recorded.

The light source for illuminating the hologram is not limited to an LED, and light sources such as a Xenon lamp, a halogen lamp, a fluorescent lamp, or a light source guided via an opening or an optical fiber from an external light may be used. A representative example of the imaging element includes a CCD (Charge Coupled Device) and a CMOS (Complementary Metal-Oxide Semiconductor), but the present invention is not limited to this. The important thing is to define the light source for reading the hologram and the imaging angle from a predetermined position.

Integration of the hologram and the carrier is not limited to an attachment using an adhesive, but various methods such as heat sealing using a hot-melt material, an adhesive, a UV-curable resin, or a lamination film may be used.

Moreover, similarly to the modification of the third embodiment, as for the carrier, the recording medium may be combined with the hologram in addition to the RFID. For example, other machine-readable recording media such as a magnetic recording medium, an optical recording medium, an optomagnetic recording medium, a contact IC, or a non-contact IC may be used. A holographic memory may be combined since it can be read by a machine. Alternatively, a recording medium such as a flash memory which has unique ID information therein may be used or combined. A plurality of kinds of information may be recorded on these recording media. The medium which is integrated with the hologram is not limited to the recording media mentioned above. That is, the medium which is integrated with the hologram may only be necessary to have identification information, but the medium may not necessarily be combined with the recording medium.

The present invention can be applied to a non-contact IC card, an ID card, a bank card, a credit card, an employee ID card, a student ID card, a commuter ticket, a driver's license card, a passport, a visa, securities, a bank book, a documentary stamp, a stamp, a portable phone, a currency, and the like.

<7. Hologram with Additional Information>

Hereinafter, an image recording medium which was previously proposed by the present inventors will be described. The image recording medium is an image recording medium in which additional information can be observed within a predetermined range of viewing angles when illuminated from a predetermined angle.

<Holographic Stereogram Producing System>

Prior to a description of a replication apparatus of the image recording medium and a replication method, production of a hologram master to be replicated will be described. In general, it is possible to synthesize a hologram which reproduces a three-dimensional image using two-dimensional original images of an object viewed from different viewpoints. A holographic stereogram is produced, for example, by recording a number of original images obtained by sequentially imaging an object from different points of observation in one hologram recording medium as strip-shaped elementary holograms.

When strip-shaped elementary holograms are sequentially recorded, an HPO (Horizontal Parallax Only) holographic stereogram which has parallax only in the horizontal direction is produced. The HPO holographic stereogram takes a short time to print and can realize high image quality recording. On the other hand, there was a strong demand for providing vertical parallax as well as horizontal parallax to record images with a more natural three-dimensional effect. The embossed recording media which have been used for the purpose of preventing counterfeiting of credit cards are replaced with more sophisticated volume recording media since the embossed recording media are easy to counterfeit. The use of volume recording media enables recording of images with vertical parallax which is basically not expressed with the embossed recording media. Thus, it was desirable to include vertical parallax in the recording method so as to enhance the anti-counterfeiting features.

An FP (Full Parallax) holographic stereogram having parallax in both the horizontal and vertical directions has been produced by incorporating an optical system using a combination of spherical lenses. The inventors of the present application propose an image recording apparatus which can solve some problems of a known production method of the FP hologram. With the image recording apparatus, it is possible to obtain a high-quality full-parallax holographic stereogram having independent numbers of parallax in the vertical and horizontal directions using an optical system, a mechanism section, and a control section used for recording elementary holograms having horizontal parallax. In this way, a high-quality holographic stereogram in which elementary holograms are not easily visible can be produced at a high speed compared to dot-shaped full parallax holographic stereogram.

First, a configuration example of a holographic stereogram producing system that produces a holographic stereogram will be described. Hereinafter, an apparatus for recording a plurality of strip-shaped elementary holograms on one recording medium to produce a holographic stereogram with parallax information in the horizontal direction will be described.

Figure 15:
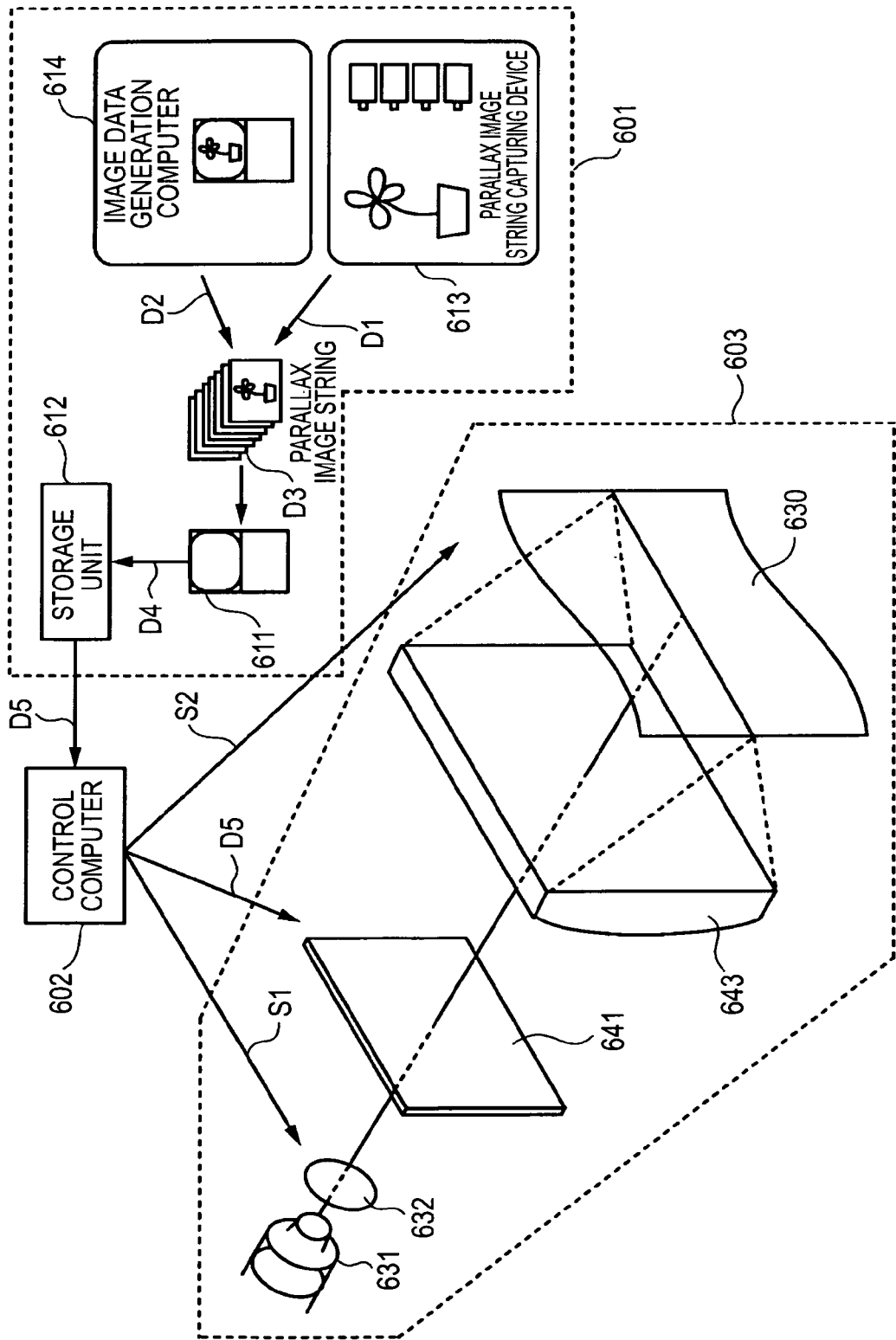
FIG. 15 is a schematic diagram showing a configuration example of a holographic stereogram producing system.

This holographic stereogram producing system is a so-called one-step holographic stereogram producing system in which a hologram recording medium having the interference fringes between an object beam and a reference beam recorded thereon is used as a holographic stereogram. As shown in FIG. 15, the holographic stereogram producing system includes a data processing section 601 that processes image data to be recorded, a control computer 602 that controls the system as a whole, and a holographic stereogram printer 603 that has an optical system for producing a holographic stereogram.

The data processing section 601 generates a parallax image string D3 based on a plurality of image data D1 which includes parallax information supplied from a parallax image string capturing device 613 having, for example, a multi-lens camera or moving camera. The data processing section 601 generates the parallax image string D3 based on other data such as a plurality of image data D2 which includes parallax information generated by an image data generation computer 614.

Here, the plurality of image data D1 which includes the parallax information supplied from the parallax image string capturing device 613 are image data for a plurality of images. Such image data are obtained by capturing images of an actual object from a plurality of different points of observation in the horizontal direction through simultaneous shooting with a multi-lens camera or continuous shooting with a moving camera.

Moreover, the image data generation computer 614 generates the plurality of image data D2 including the parallax information. For example, the image data D2 are image data such as a plurality of CAD (Computer Aided Design) images or CG (Computer Graphics) images created by sequentially providing parallax in the horizontal direction.

The data processing section 601 subjects the parallax image string D3 to predetermined image processing for holographic stereogram using an image processing computer 611 to obtain Image data D4. The image data D4 are stored in a storage unit 612 such as a memory or a hard disk.

When images are recorded on the hologram recording medium, the data processing section 601 sequentially reads data of each image from the image data D4 recorded on the storage unit 612 and transmits the image data D5 to the control computer 602.

On the other hand, the control computer 602 drives the holographic stereogram printer 603. The images based on the image data D5 supplied from the data processing section 601 are sequentially recorded on a hologram recording medium 630, which is set in the holographic stereogram printer 603, as strip-shaped elementary holograms.

At that time, the control computer 602 controls a shutter 632, a display unit 641, a recording medium feeding mechanism, and the like provided in the holographic stereogram printer 603. That is, the control computer 602 transmits a control signal S1 to the shutter 632 to control the opening and closing of the shutter 632. Further, the control computer 602 supplies the image data D5 to the display unit 641 to cause the display unit 641 to display the images based on the image data D5. In addition, the control computer 602 transmits a control signal S2 to the recording medium feeding mechanism to control the feeding operation of the hologram recording medium 630 by the recording medium feeding mechanism.

Figure 16:
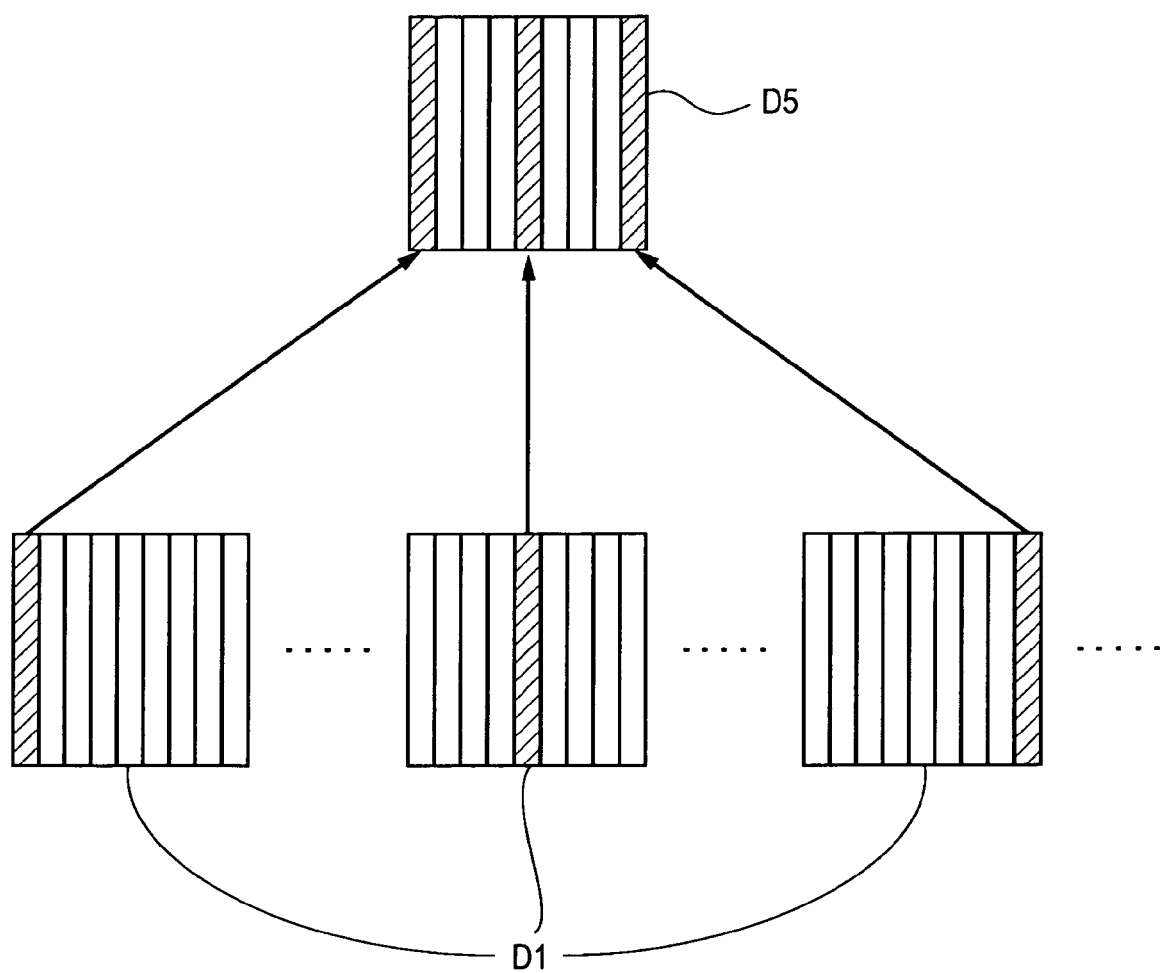
FIG. 16 is a schematic diagram used for description of an example of image processing during the production of a holographic stereogram.

As shown in FIG. 16, image processing includes dividing each of the plurality of image data D1 including parallax information in the direction of parallax, that is, in the horizontal (width) direction into slits and assembling the divided slices into the processed image D5. This image D5 is displayed on the display unit 641.

An optical system of the holographic stereogram printer 603 described above will be described in detail with reference to FIGS. 17A and 17B. FIG. 17A is a top view of a whole optical system of the holographic stereogram printer 603, and FIG. 17B is a side view of the whole optical system of the holographic stereogram printer 603.

<Holographic Stereogram Printer>

As shown in FIGS. 17A and 17B, the holographic stereogram printer 603 includes a laser beam source 631 that emits a laser beam having a predetermined wavelength, and the shutter 632, a mirror 638, and a semi-transparent mirror 633 which are located on the optical axis of a laser beam L1 emitted from the laser beam source 631. In this example, the laser beam source 631 employs a light source that emits a laser beam having a wavelength of about 532 nm, for example.

The shutter 632 is controlled by the control computer 602. The shutter 632 is closed when the hologram recording medium 630 is not to be exposed and opened when the hologram recording medium 630 is to be exposed. The semi-transparent mirror 633 serves to separate the laser beam L2 transmitted through the shutter 632 into the reference beam and the object beam. The beam L3 reflected by the semi-transparent mirror 633 is the reference beam. The beam L4 transmitted through the semi-transparent mirror 633 is the object beam.

In the optical system, the optical path of the reference beam reflected by the semi-transparent mirror 633 and incident on the hologram recording medium 630 has substantially the same length as the optical path of the object beam transmitted through the semi-transparent mirror 633 and incident on the hologram recording medium 630. In this way, the interference between the reference beam and the object beam is enhanced, and it is possible to produce a holographic stereogram offering a more vivid reproduced image.

On the optical axis of the beam L3 reflected by the semi-transparent mirror 633, a cylindrical lens 634, a collimator lens 635 that makes the reference beam parallel, and a reflective mirror 636 that reflects the parallel beam from the collimator lens 635 are arranged in that order as an optical system for the reference beam.

The beam reflected by the semi-transparent mirror 633 is first converted into divergent beam by the cylindrical lens 634. Then, the divergent beam is converted into the parallel beam by the collimator lens 635. After that, the parallel beam is reflected by the reflective mirror 636 and then is incident on the rear side of the hologram recording medium 630.

On the other hand, an optical system for the object beam is provided on the optical axis of the beam L4 transmitted through the semi-transparent mirror 633. As the optical system for the object beam, a reflective mirror 638 that reflects the beam transmitted through the semi-transparent mirror 633, a spatial filter 639 made up of a convex lens and a pin hole, and a collimator lens 640 that makes the object beam parallel are used. In addition, a display unit 641 for displaying an image to be recorded, a one-dimensional diffuser panel 642 for diffusing the light transmitted through the display unit 641 in the width direction of the elementary holograms are used. In addition, a cylindrical lens 643 that condenses the object beam transmitted through the one-dimensional diffuser panel 642 onto the hologram recording medium 630 and an optical functional panel 645 having a one-dimensional diffusing function are used.

The cylindrical lens 643 condenses the object beam in a first parallax direction (the short-axis direction of the elementary holograms or the horizontal direction during observation).

The optical functional panel 645 serves to diffuse the condensed object beam one-dimensionally in the longitudinal direction of the strip-shaped elementary holograms so as to cope with movement of viewpoint in the longitudinal direction. The optical functional panel 645 is a microstructure, and for example, a lenticular lens with a small pitch can be used as the optical functional panel 645.

The beam L4 transmitted through the semi-transparent mirror 633 is reflected by the reflective mirror 638 and is then converted into a divergent beam emitted from a point light source by the spatial filter 639. Then, the divergent beam is converted into a parallel beam by the collimator lens 640 and is then incident on the display unit 641. In this example, the spatial filter 639 is made up of an objective lens with a magnification of 20 times and a pin hole with a diameter of 20 μm. The collimator lens 640 has a focal distance of 100 mm.

The display unit 641 is a projection image display device formed of a liquid crystal display, for example. The display unit 641 is controlled by the control computer 602 so as to display the image based on the image data D5 sent from the control computer 602. In this example, a monochrome liquid crystal display panel whose pixels form a 480×1068 array and whose size is 16.8 mm×29.9 mm is used.

The light transmitted through the display unit 641 is converted into light which is modulated in accordance with the image displayed on the display unit 641. The modulated light is diffused by the one-dimensional diffuser panel 642. The one-dimensional diffuser panel 642 is only necessary to be located near the display unit 641 and may be located right before or after the display unit 641. In this example, the one-dimensional diffuser panel 642 is located right after the display unit 641.

Here, the one-dimensional diffuser panel 642 serves to slightly diffuse the light transmitted from the display unit 641 in the width direction of the elementary holograms, thus diffusing the light inside the elementary holograms. Thus, the image quality of the produced holographic stereogram is improved.

At that time, a diffuser panel moving means (not shown) is provided to the diffuser panel 642 so that the diffuser panel 642 is moved randomly each time the elementary holograms are formed, and the position thereof is changed for each elementary hologram. In this way, it is possible to reduce the noise localized to infinity when the hologram is observed.

As the diffuser panel moving means for moving the diffuser panel 642, a moving mechanism such as a stepping motor that moves the diffuser panel 642 by a predetermined distance using a mechanical method may be used. The movement direction of the diffuser panel 642 by this mechanism may be the width direction (the direction of arrow X in FIG. 17B) of the elementary hologram and may be a direction (the direction of arrow Y in FIG. 17A) perpendicular to the width direction. The movement direction may be a combination of the two directions and may be random. Moreover, a reciprocating movement is also possible.

By disposing the diffuser panel 642 in the described manner, the width portion of the elementary hologram can be uniformly exposed. Thus, the quality of the resulting hologram is improved. However, in order to realize uniform exposure, it is necessary to intensify the diffusing effect of the diffuser panel 642 to some extent. The object beam diffused by the diffuser panel 642 is spread on the hologram recording medium 630. Thus, a wider range of the area than the width of the elementary hologram is exposed.

Figure 18A:
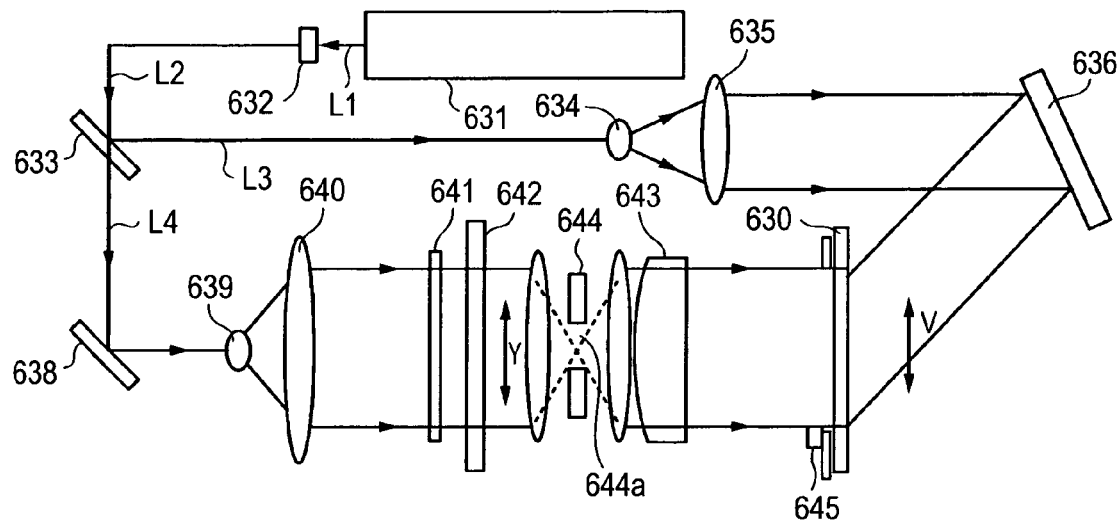
FIGS. 18A and 18B are schematic diagrams showing another example of an optical system of a holographic stereogram printer.
Figure 18B:
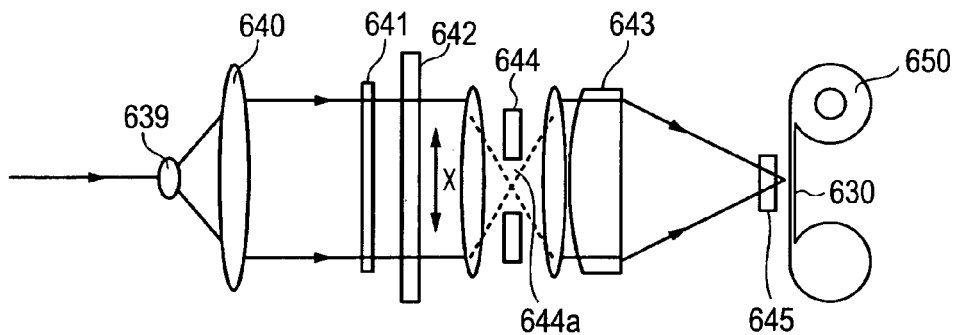

Therefore, a mask 644 is disposed on the optical path as shown in FIGS. 18A and 18B so as to project the image thereof onto the recording material, whereby an appropriate width portion of each elementary hologram is exposed. That is, due to the diffusion effected by the diffuser panel 642 and the screening of unnecessary light by the mask 644, it is possible to obtain a uniformly appropriate exposure width. As shown in FIGS. 18A and 18B, the mask may be provided between the diffuser panel 642 and the cylindrical lens 643 and may be provided near the hologram recording medium 630.

Specifically, the light transmitted from the display unit 641 is transmitted through the diffuser panel 642, where the light is diffused in the width direction of the elementary hologram. Thereafter, the diffused light is converged onto the hologram recording medium 630 by the cylindrical lens 643. At that time, due to the effect of the diffuser panel 642, the object beam is spread over a certain area without being condensed to one point.

Only a predetermined central area of the spread convergent light is transmitted through an opening 644a of the mask 644 and is incident on the hologram recording medium 630 as the object beam as shown in FIG. 18. The object beam is strip-shaped.

As described above, the optical functional panel 645 is disposed as a second diffuser panel, and the object beam is diffused one-dimensionally in the longitudinal direction of the strip-shaped elementary hologram and irradiated onto the hologram recording medium 630. Thus, it is possible to widen the viewing angle in the vertical direction (perpendicular direction) of a reflective hologram.

In a general holographic stereogram having parallax only in the horizontal direction, the optical functional panel 645 provides an optical functional angle substantially equivalent to the viewing angle in the vertical direction of a final holographic stereogram. On the other hand, in the recording medium, the one-dimensional diffusion angle is strictly narrowed so as to prevent an overlap with other items of identification information described later.

The holographic stereogram printer 603 includes a recording medium feeding mechanism 650 capable of intermittently feeding the hologram recording medium 630 by an amount corresponding to one elementary hologram under the control of the control computer 602. As will be described below, the recording medium feeding mechanism 650 is arranged to intermittently feed a film-shaped hologram recording medium in response to a control signal from the control computer 602. When the printer 603 produces a holographic stereogram, the printer 603 sequentially records the image based on each of the image data of the parallax image strings on the hologram recording medium 630 set to the recording medium feeding mechanism 650 as a strip-shaped elementary hologram.

<Example of Hologram Recording Medium>

Figure 19:
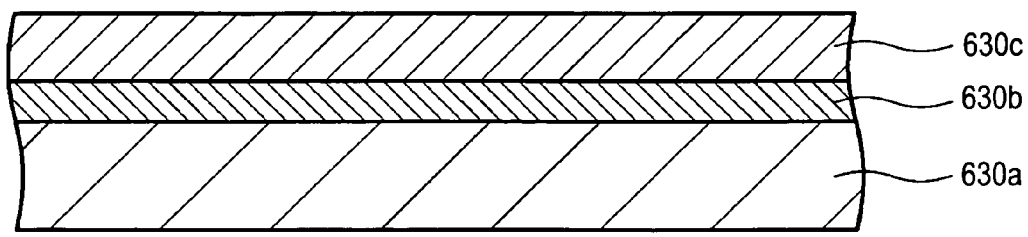
FIG. 19 is a sectional view showing an example of a hologram recording medium.

The hologram recording medium 630 used in the holographic stereogram producing system described above will be described in detail. As shown in FIG. 19, the hologram recording medium 630 is a so-called film-coated recording medium, in which a photopolymer layer 630b made from photo-polymerizable photopolymer is formed on a film base material 630a formed in a tape form, and a cover sheet 630c is coated on the photopolymer layer 630b.

Figure 20A:
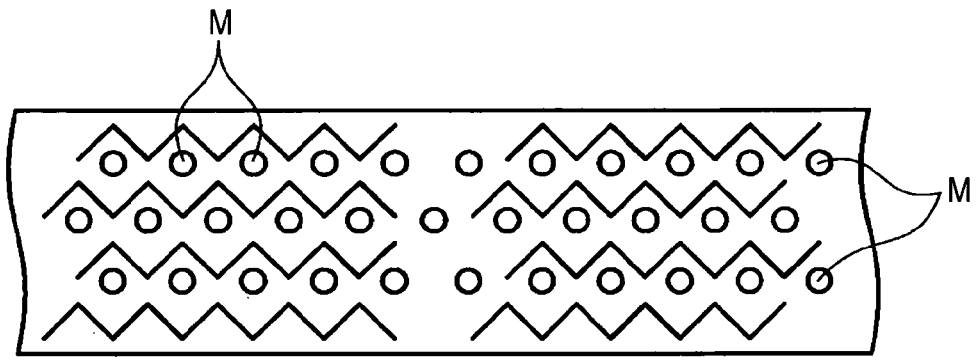
FIGS. 20A to 20C are schematic diagrams showing a photosensitizing process of a photo-polymerizable photopolymer.
Figure 20B:
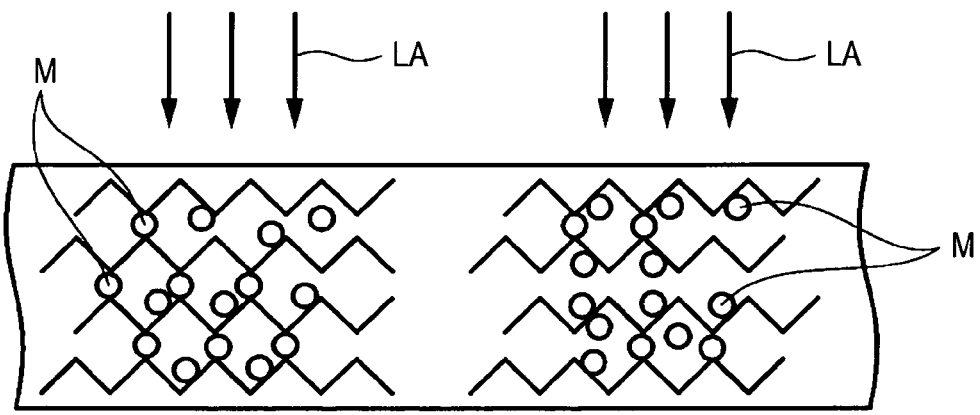
Figure 20C:
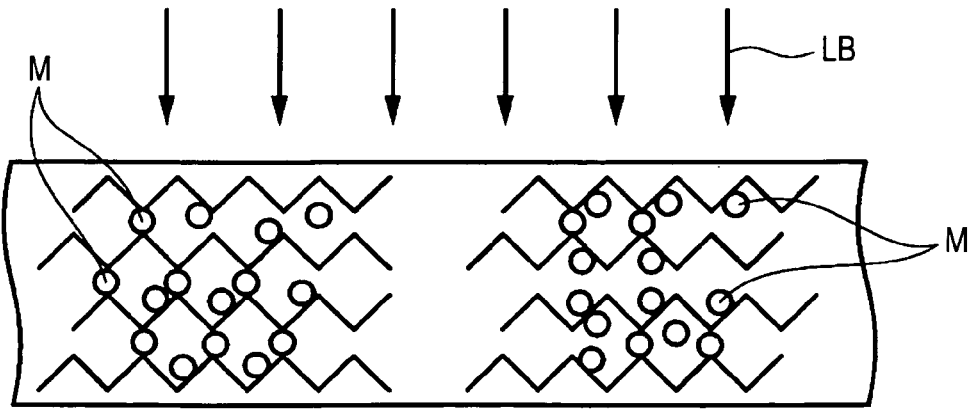

In the initial state of the photo-polymerizable photopolymer, monomers M are evenly distributed in a matrix polymer as shown in FIG. 20A. In contrast, as shown in FIG. 20B, when the photopolymer is irradiated with a beam LA with a power of about 10 to 400 mJ/cm$^2$, the monomers M polymerize in the portions exposed with the beam LA. As the polymerization progresses, the monomers M migrate from an area around the exposed portions, whereby the concentrations thereof are changed from one place to another and refractive index modulation occurs. Then, as shown in FIG. 20C, an ultraviolet or visible beam LB with a power of about 1000 mJ/cm$^2$ is irradiated over the entire surface to complete the polymerization of the monomers M. As described above, the refractive index of an photo-polymerizable photopolymer changes according to the incident beam. Thus, it is possible to record the interference fringes occurring due to the interference between the reference beam and the object beam as a change in refractive index.

In the hologram recording medium 630 using such a photo-polymerizable photopolymer, it is not necessary to perform any special development after the exposure. Therefore, it is possible to simplify the configuration of the holographic stereogram printer 603 using the hologram recording medium 630 in which the photo-polymerizable photopolymer is used in a photosensitive section.

<Recording Medium Feeding Mechanism>

Figure 21:
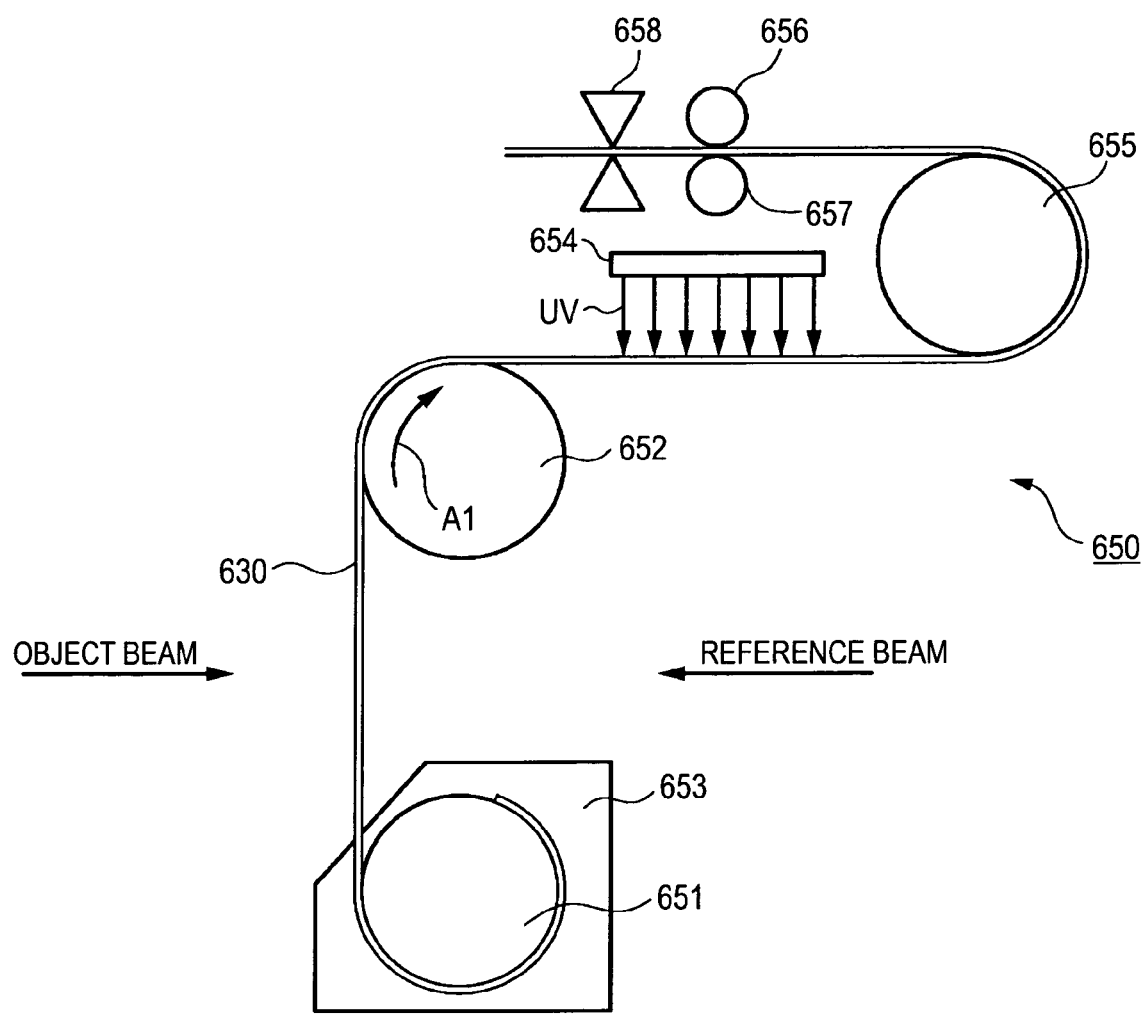
FIG. 21 is a schematic diagram showing a configuration example of a recording medium feeding mechanism.

Next, the recording medium feeding mechanism 650 will be described in detail. FIG. 21 is an expanded view showing the recording medium feeding mechanism 650 of the holographic stereogram printer 603.

As shown in FIG. 21, the recording medium feeding mechanism 650 includes a roller 651 and an intermittent feeding roller 652. The hologram recording medium 630 is stored in a film cartridge 653 in a state of being wound around the roller 651. The recording medium feeding mechanism 650 axially support the roller 651 located in the film cartridge 653 mounted at a predetermined position so as to be rotatable with a predetermined amount of torque. The hologram recording medium 630 pulled out of the film cartridge 653 is held by the roller 651 and the intermittent feeding roller 652. At that time, the recording medium feeding mechanism 650 holds the hologram recording medium 630 so that the main face of the hologram recording medium 630 is disposed between the roller 651 and the intermittent feeding roller 652 and held substantially perpendicular to the object beam. The roller 651 and the intermittent feeding roller 652 are pulled against each other by a torsion coil spring. Thus, a predetermined amount of tension is applied to the hologram recording medium 630 loaded between the roller 651 and the intermittent feeding roller 652.

The intermittent feeding roller 652 of the recording medium feeding mechanism 650 is connected to a stepping motor (not shown). The intermittent feeding roller 652 is rotatable in the direction indicated by the arrow A1 in FIG. 21 based on the rotation force transmitted from the stepping motor. This stepping motor serves to sequentially rotate the intermittent feeding roller 652 by a predetermined angle corresponding to one elementary hologram based on a control signal S2 supplied from the control computer 602 each time the exposure of one image is completed. In this way, the hologram recording medium 630 is fed by an amount corresponding to one elementary hologram every exposure of one image.

An ultraviolet lamp 654 is located along the travelling path of the hologram recording medium 630 at a later stage of the intermittent feeding roller 652. This ultraviolet lamp 654 is used for completing the polymerization of the monomers M of the exposed hologram recording medium 630 and serves to apply an ultraviolet beam UV with a predetermined power to the hologram recording medium 630 fed by the intermittent feeding roller 652.

A heat roller 655 that is axially supported to be rotatable, a pair of ejecting rollers 656 and 657, and a cutter 658 are arranged in that order at a later stage of the ultraviolet lamp 654 in the travelling path of the hologram recording medium 630.

The ejecting rollers 656 and 657 serve to feed the hologram recording medium 630 so that the side of the hologram recording medium 630 close to the cover sheet 630c is wound halfway around the peripheral surface of the heat roller 655 in a contacting state. The ejecting rollers 656 and 657 are connected to a stepping motor (not shown) and are rotated based on the rotation force transmitted from the stepping motor. The stepping motor rotates based on the control signal S2 supplied from the control computer 602. That is, the ejecting rollers 656 and 657 are sequentially rotated by a predetermined angle corresponding to one elementary hologram every exposure of one image is completed in synchronism with the rotation of the intermittent feeding roller 652. In this way, the hologram recording medium 630 is reliably fed in contact with the peripheral surface of the heat roller 655 without being loosened between the intermittent feeding roller 652 and the ejecting rollers 656 and 657.

The heat roller 655 includes a heating means such as a heater therein. This heating means serves to maintain the peripheral surface to be at a temperature of about 120° C. The heat roller 655 heats the photopolymer layer 630b of the fed hologram recording medium 630 with the cover sheet 630c disposed therebetween. By this heating, the degree of modulation of the refractive index of the photopolymer layer 630b is increased, and the recording image is fixed onto the hologram recording medium 630. Therefore, the outer diameter of the heat roller 655 is chosen so that the recording image is fixed during the period between the contact of the hologram recording medium 630 on the peripheral surface of the heat roller 655 and the release thereof.

Further, the cutter 658 includes a cutter driving mechanism (not shown). By driving the cutter driving mechanism, the hologram recording medium 630 being fed to the cutter 658 can be cut. This cutter driving mechanism drives the cutter 658. That is, after all the images based on the image data of the parallax image strings are recorded on the hologram recording medium 630, the cutter 658 is driven at a state where all the image-recorded portions of the hologram recording medium 630 are ejected. In this way, the portion where the image data are recorded is cut out of the other portions and ejected to the outside as one holographic stereogram.

<Operation of Holographic Stereogram Producing System>

Figure 22:
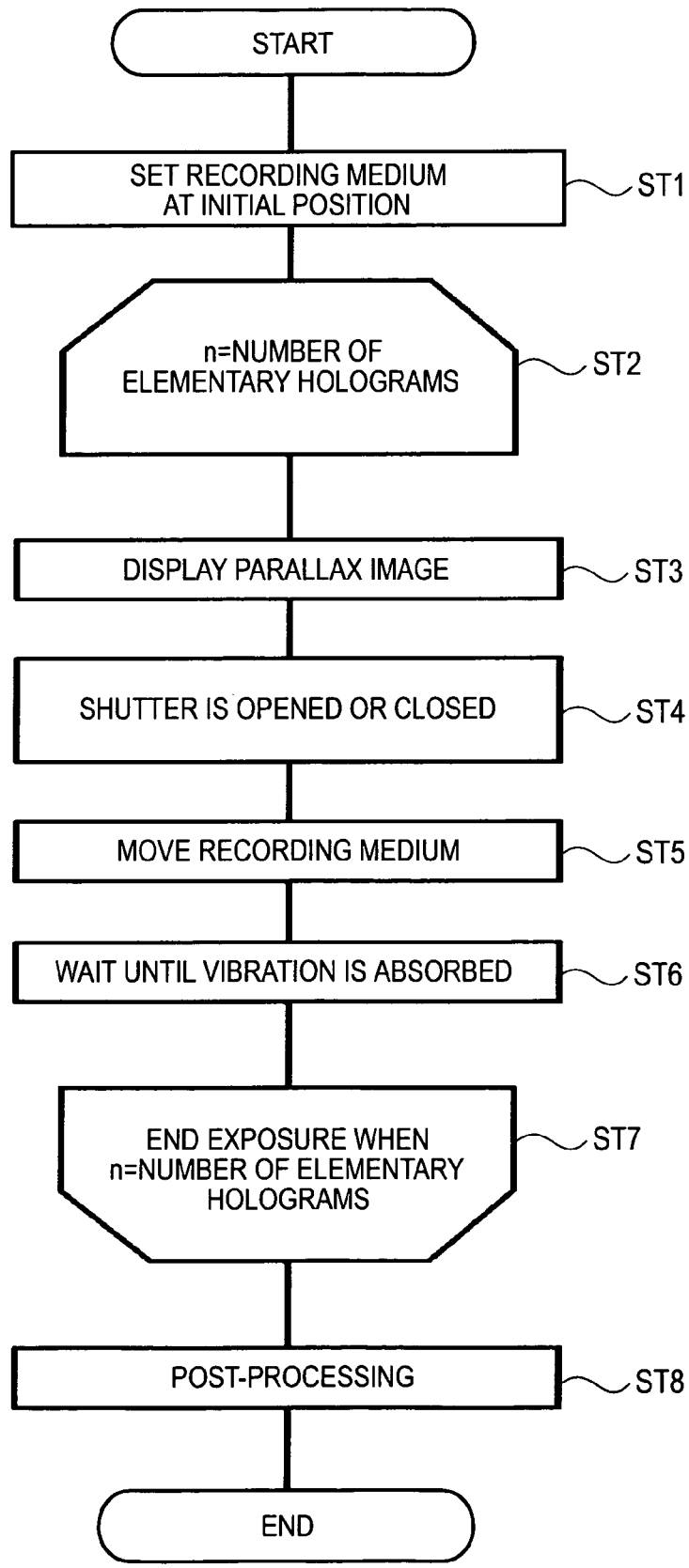
FIG. 22 is a flowchart of an example of an exposure process.

The operation of the holographic stereogram producing system having the above-described configuration when the holographic stereogram is produced under the control of the control computer 602 will be described with reference to the flowchart of FIG. 22.

In step ST1, the hologram recording medium 630 is placed at an initial position. Step ST2 is the starting step of a loop, and step ST7 is the ending step of the loop. Processing of one elementary hologram ends whenever a series of operations of steps ST3 to ST6 are executed. The steps ST3 to ST6 are repeated until processing of the entire number (n) of elementary holograms ends.

In step ST3, the control computer 602 drives the display unit 641 based on the image data D5 supplied from the data processing section 601 and displays the image on the display unit 641. In step ST4, the control computer 602 sends the control signal S1 to the shutter 632 so that the shutter 632 is open for a predetermined time to expose the hologram recording medium 630. At that time, among the laser beam L2 emitted from the laser beam source 631 and transmitted through the shutter 632, a beam L3 reflected by the semi-transparent mirror 633 is incident on the hologram recording medium 630 as the reference beam. At the same time, the beam L4 transmitted through the semi-transparent mirror 633 becomes a projection beam to which the image displayed on the display unit 641 is projected. This projection beam is incident on the hologram recording medium 630 as the object beam. In this way, one image displayed on the display unit 641 is recorded on the hologram recording medium 630 as a strip-shaped elementary hologram.

Then, when recording of one image ends, in step ST5, the control computer 602 sends the control signal S2 to the stepping motor that drives the intermittent feeding roller 652 and the stepping motor that drives the ejecting rollers 656 and 657. By driving the stepping motors, the hologram recording medium 630 is fed by an amount corresponding to one elementary hologram. After the hologram recording medium 630 is fed, the processing waits until vibration is absorbed (step ST6).

Subsequently, the flow returns to step ST3, and the control computer 602 drives the display unit 641 based on the next image data D5 supplied from the data processing section 601 and displays the next image on the display unit 641. Thereafter, the same operations (ST4, ST5, and ST6) as above are sequentially repeated, whereby the images based on the image data D5 supplied from the data processing section 601 are sequentially recorded on the hologram recording medium 630 as strip-shaped elementary holograms.

That is, in this holographic stereogram producing system, the images based on the image data recorded on the storage unit 612 are sequentially displayed on the display unit 641. At the same time, the shutter 632 is open for each image, and the images are sequentially recorded on the hologram recording medium 630 as strip-shaped elementary holograms. At that time, since the hologram recording medium 630 is fed by an amount corresponding to one elementary hologram for each image, the elementary holograms are continuously arranged in the horizontal (lateral) direction during the observation. As a result, images having the parallax information in the horizontal direction are recorded on the hologram recording medium 630 as a plurality of elementary holograms which are laterally continuous. In this way, a holographic stereogram with the horizontal parallax can be obtained.

While the processes up to the exposure have been described, the print process may be completed after post-processing (step ST8) is performed as necessary. When a photopolymer which is necessary for irradiation of ultraviolet rays and heating is used, the apparatus having a configuration as shown in FIG. 21 may be used. That is, the ultraviolet rays UV are irradiated from the ultraviolet lamp 654. In this way, the polymerization of the monomers M is completed. Subsequently, the hologram recording medium 630 is heated by the heat roller 655, whereby the recorded images are fixed.

Then, when all the portions where the images are recorded are ejected to the outside, the control computer 602 supplies the control signal S2 to the cutter driving mechanism to drive the cutter driving mechanism. In this way, the portions of the hologram recording medium 630 where the images are recorded are cut by the cutter 658 and ejected to the outside as one holographic stereogram.

Through the above processes, the holographic stereogram with the horizontal parallax is obtained.

<Configuration of Replication Apparatus>

Figure 23:
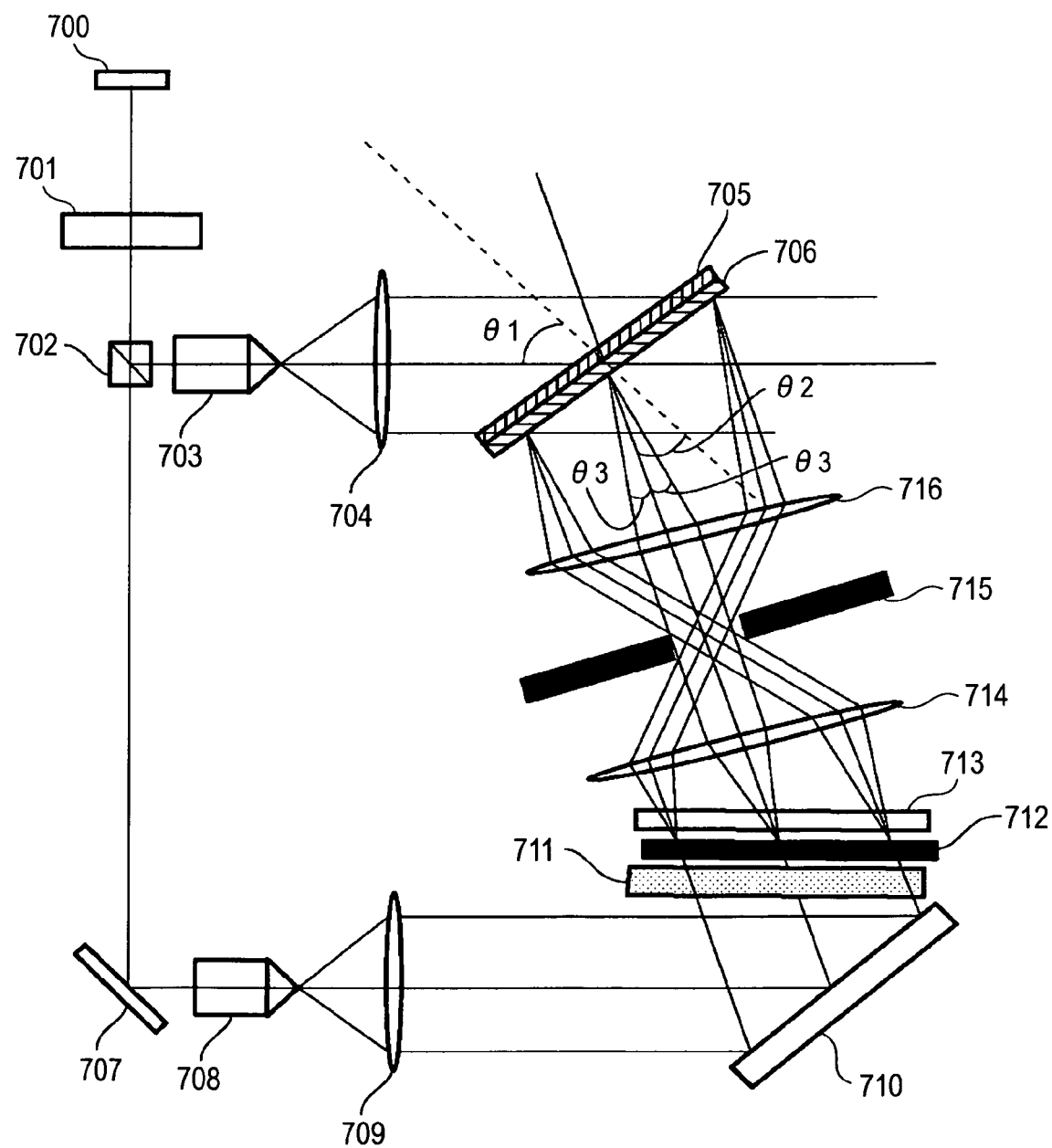
FIG. 23 is a schematic diagram showing a configuration of the first embodiment of a replication apparatus for an image recording medium which was proposed previously by the present inventors.

A first embodiment of the image recording medium is configured as shown in FIG. 23. A laser beam emitted from a laser beam source 700 passes through a half-wavelength plate 701 and is incident on a polarizing beam splitter 702. The half-wavelength plate 701 rotates a polarization plane of the laser beam by an angle of 90°. The laser beam (S-polarized beam) is reflected by the polarizing beam splitter 702, and the laser beam is spread by a spatial filter 703. The laser beam (that is, reference beam) from the spatial filter 703 is incident on a collimator lens 704. The laser beam which is converted into a parallel beam by the collimator lens 704 is irradiated onto a hologram recording medium 705 having a layer made from a photosensitive material and a hologram master 706.

The hologram master 706 is a holographic stereogram which is produced in the above-described manner and which has parallax in both the horizontal and vertical directions when observed. The hologram master 706 may be a holographic stereogram having parallax only in the horizontal direction. Further, the hologram master 706 may be a real-scene hologram which is produced by irradiating an object with a laser beam. The hologram recording medium 705 and the hologram master 706 are directly attached to each other, or closely attached to each other via a refractive index adjustment liquid (referred to as an index matching liquid). On the hologram recording medium 705, interference fringes formed by light diffracted by the hologram master 706 and the reference beam and interference fringes formed by additional information light and the reference beam are recorded.

The laser beam (P-polarized beam) passed through the polarizing beam splitter 702 is reflected by the mirror 707 and incident on a spatial filter 708. The laser beam spread by the spatial filter 708 is converted into a parallel beam by a collimator lens 709 and incident on the mirror 710.

The laser beam reflected by the mirror 710 passes through a diffuser panel 711 and is incident on a liquid crystal display panel 712 serving as a spatial light modulation element. The diffuser panel 711 widens the viewing angle of a replicated holographic stereogram by diffusing the laser beam from the mirror 710 in at least one of the width direction and the longitudinal direction of an elementary hologram. The laser beam diffused by the diffuser panel 711 is narrowed down by a diaphragm (mask) 715, and the viewing angle is widened only when observed from the front.

A liquid crystal driving section (for example, a microcomputer) which is not shown is connected to the liquid crystal display panel 712. An image of the additional information is displayed on the liquid crystal display panel 712 by the liquid crystal driving section. As the additional information, identification information such as a number (serial number) unique to each hologram is used. A polarizing plate 713 is provided on a light-emitting surface of the liquid crystal display panel 712. The polarization plane is rotated by the polarizing plate 713, and P-wave is converted into S-wave.

The additional information light generated by the liquid crystal display panel 712 and passed through the polarizing plate 713 is incident on the hologram master 706 via an imaging optical system which is made up of a projection lens 714, the diaphragm 715, and a projection lens 716. Interference fringes which are formed by light in which the light diffracted by the hologram master 706 and the additional information light passed through the hologram master 706 are superimposed and the incident laser beam are recorded on the hologram recording medium 705. As a result, it is possible to record the additional information in a hologram area of the hologram master 706. Optical elements arranged in the optical path extending from the mirror 710 to the hologram recording medium 705 are mounted at a predetermined position by a mounting member such as a rail.

<Viewing Angle>

The general relationship between recording on the hologram recording medium 705 and a viewing angle when reproducing the recorded hologram recording medium 705 will be described with reference to FIGS. 24A and 24B. As shown in FIG. 24A, during the recording, the reference beam 760 is incident on the hologram recording medium 705' at an incidence angle of $\theta 1$, and the object beam 761 is incident on the hologram recording medium 705' from the opposite side of the hologram recording medium 705' at an incidence angle of $\theta 2$. Interference fringes formed by the object beam 761 and the reference beam 760 are recorded on the hologram recording medium 705'.

As shown in FIG. 24B, when the hologram recording medium 705' on which the interference fringes are recorded in the above-described manner is irradiated with the illumination beam 770 at an incidence angle of $\theta 1$, the object beam (reproduction beam) 771 is emitted by the hologram recording medium 705' at an output angle of $\theta 2$. As a result, the object beam can be seen from a viewpoint in the extension direction of the object beam 771.

Figure 25:
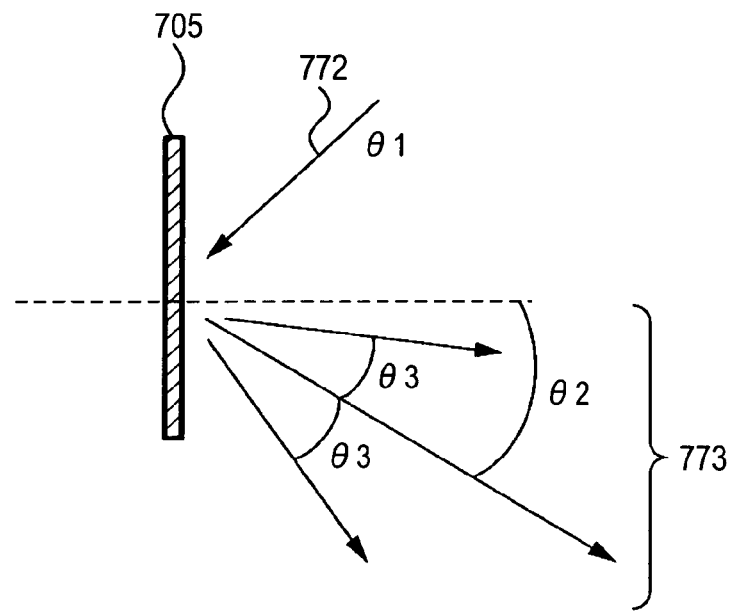
FIG. 25 is a schematic diagram used for description of a viewing angle in the first embodiment of the previously proposed image recording medium.

In the embodiment of the image recording medium, as shown in FIG. 23, the reference beam is incident on the hologram recording medium 705 at an incidence angle of $\theta 1$, the additional information light is incident on the hologram recording medium 705 at an incidence angle of $\theta 2$, and the additional information light has a diffusion angle of $\pm \theta 3$ due to the diffuser panel 711 and the diaphragm 715 disposed near the liquid crystal display panel 712. During the reproduction, as shown in FIG. 25, the reference beam 772 is incident on the replicated hologram medium 705 at an incidence angle of $\theta 1$. The additional information light 773 reproduced by the hologram recording medium 705 has a diffusion angle of $\pm \theta 3$ about the emission angle of $\theta 2$. In other words, the additional information can be seen only when the viewpoint is in an angle range of $\pm \theta 3$ about the emission angle of $\theta 2$. In this case, the magnitude of the diffusion angle $\pm \theta 3$ can be freely changed in accordance with the specification of the diffuser panel. When the additional information is reproduced with an intensity distribution such that the intensity increases or decreases gradually as it retreats from the center where the intensity is maximum, it is possible to realize a viewing method which is different from that of a switching hologram which is recorded by a two-step method.

In the embodiment of the image recording medium, the central angle of the viewpoint from which the additional information image can be seen when the replicated hologram recording medium 705 is reproduced can be set by the incidence angle $\theta 2$ of the optical axis of the additional information light with respect to the hologram recording medium 705. Further, the range of the viewpoints from which the additional information image can be seen during the reproduction can be set by controlling the spreading of the additional information light using the imaging optical system which is made up of the projection lenses 714 and 716 and the diaphragm 715.

Therefore, the hologram recording medium 705 replicated by the replication apparatus according to the embodiment of the image recording medium has the characteristics described below, and the hologram image and the additional information image can be observed independently from each other by moving the viewpoint. The viewpoint can be moved by moving the observer's eyes or moving the hologram recording medium.

When the hologram recording medium is illuminated from a predetermined angle, a hologram image which has continuous parallax at least in the horizontal direction when the viewpoint is moved in the left-right direction with respect to the normal line, and of which the viewing angle is controlled in the up-down direction is reproduced. In this case, the viewing angle in the up-down direction may not be controlled.

A refractive index modulation is recorded on a single layer of material so that another discontinuous image (additional information image) which is different from the hologram image is reproduced when the viewpoint is moved in at least one of the up-down direction and the left-right direction relatively with respect to the normal line of the hologram recording medium.

The hologram image is a hologram or a holographic stereogram on which an image is recorded. A hologram reproduced from a different angle in at least one of the up-down direction and the left-right direction may be a two-dimensional image that is positioned in an approximately constant plane in the depth direction. The two-dimensional image positioned in an approximately constant plane in the depth direction is the additional information image having identification information.

The depth at which the two-dimensional image is positioned can be freely set by image processing or by adjusting the position of the diffuser panel. By positioning the two-dimensional image at a depth different from that of the hologram or the holographic stereogram on which an image is recorded, an observer can easily differentiate and recognize the image and the two-dimensional image (identification information). Since the sharpness of an illumination light from a diffusion light source decreases as it goes greatly away from the surface, good visibility can be obtained by positioning the two-dimensional image at an appropriate depth (for example, about 2 mm from the surface).

In the embodiment of the image recording medium, it is possible to record an additional information image (such as a serial number or machine-readable barcode information) in a hologram area. Further, since the range of the viewpoint from which the additional information image can be seen can be defined, it is possible to prevent the additional information image from disturbing the observation of the original hologram image.

In the embodiment of the image recording medium, a hologram obtained by the one-step holographic stereogram recording method is used as a hologram on which an image is recorded. In the image recording medium, although a so-called real-scene hologram produced by irradiating a laser beam to a modeling object may also be used, the use of the one-step holographic stereogram is advantageous from the perspective of the authentication features. That is, when the elementary holograms of the one-step holographic stereogram have a strip shape having a width of 0.1 mm, strips having a width of 0.1 mm can be seen with a magnifying lens, and dark portions are seen between the adjacent strips. On the other hand, such strips are not seen in the two-dimensional image which is identification information. Such a configuration in which images are divided into areas, and the respective items of identification information are consecutive provides distinctive features, which serve as the point that identifies the recorded hologram.

<First Modification of Embodiment of Image Recording Medium>

Figure 26:
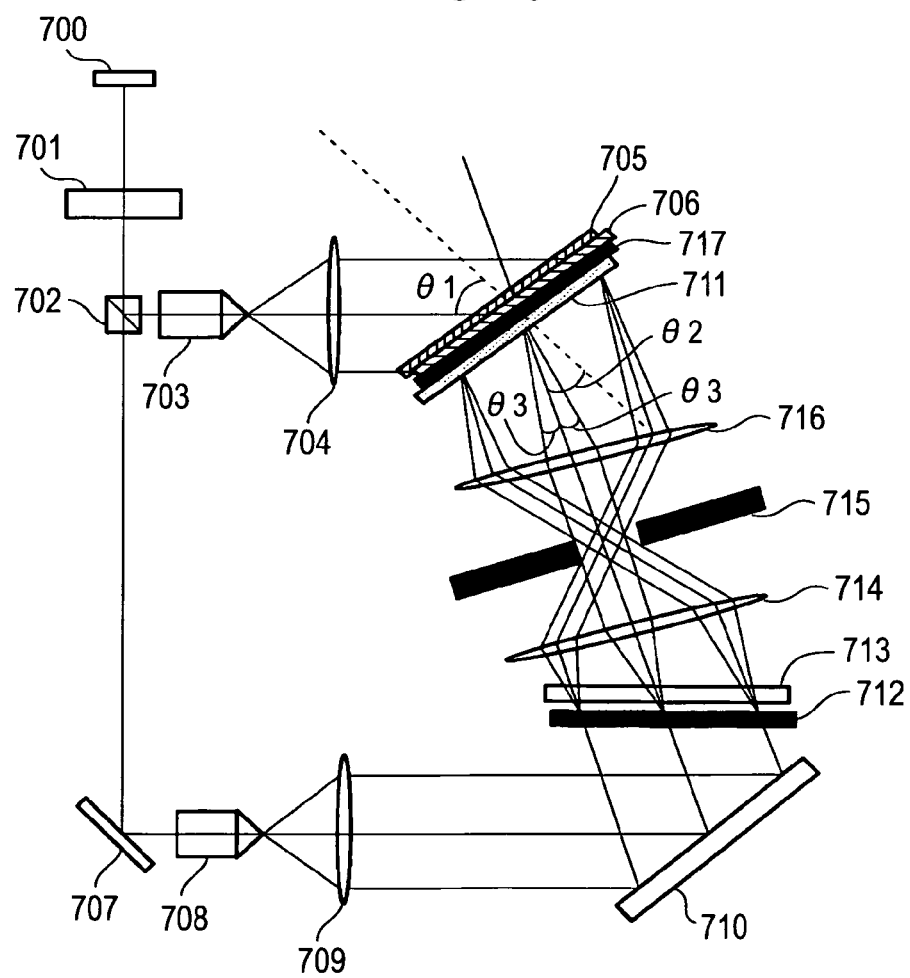
FIG. 26 is a schematic diagram showing a configuration of a first modification of the first embodiment of the previously proposed image recording medium.

As shown in FIG. 26, the diffuser panel 711 may be disposed, for example, on an incidence side of the light from the projection lens 716 if such a position provides an optically equivalent effect. In this case, the range of the viewing angle of the additional information light can be controlled by the diffusion angle of the diffuser panel. In addition, in the configuration of FIG. 26, a louver 717 is disposed between the diffuser panel 711 and the hologram master 706. By providing the louver 717, it is possible to prevent unnecessary light such as reflection light from entering the hologram master 706. The louver 717 has a configuration in which black planar absorption layers are disposed in a transparent plate at predetermined intervals. With the absorption layers of the louver 717, the additional information light and the diffusion components pass through the louver 717, while the replication parallel beam transmitted through the collimator lens 704 does not pass through the louver 717.

<Second Modification of Embodiment of Image Recording Medium>

As described above, when the additional information image of the liquid crystal display panel 712 is imaged on the entire plane near the hologram master 706 by an optical system of which the optical axis is not disposed on the normal line, it is necessary to tilt the display surface of the liquid crystal display panel 712 with respect to the plane of the hologram master 706. Since the liquid crystal display panel 712 is not designed for oblique incidence of light, there is a problem in that light utilization efficiency uniformity may decrease and scattering may increase.

Figure 27:
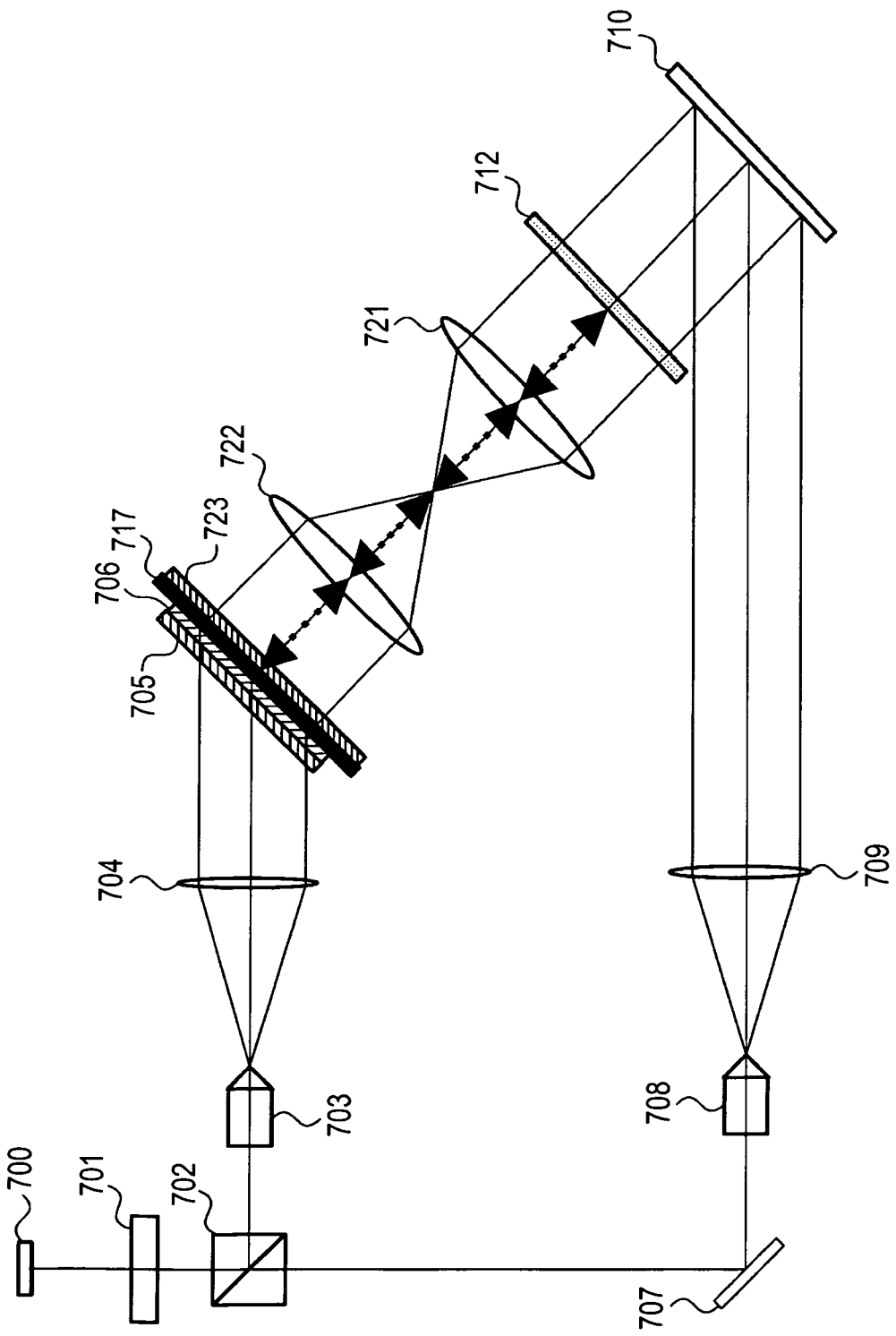
FIG. 27 is a schematic diagram showing a configuration of a second modification of the first embodiment of the previously proposed image recording medium.

An example of a replication apparatus shown in FIG. 27 can solve such a problem. Specifically, the display surface of the liquid crystal display panel 712 (including the polarizing plate 713) is disposed so as to be in parallel to the plane of the hologram master 706. As shown in FIG. 27, the additional information light passes through a projection lens 721, a projection lens 722, and a light deflection sheet 723 and the louver 717 and is incident on the hologram master 706.

Figure 28A:
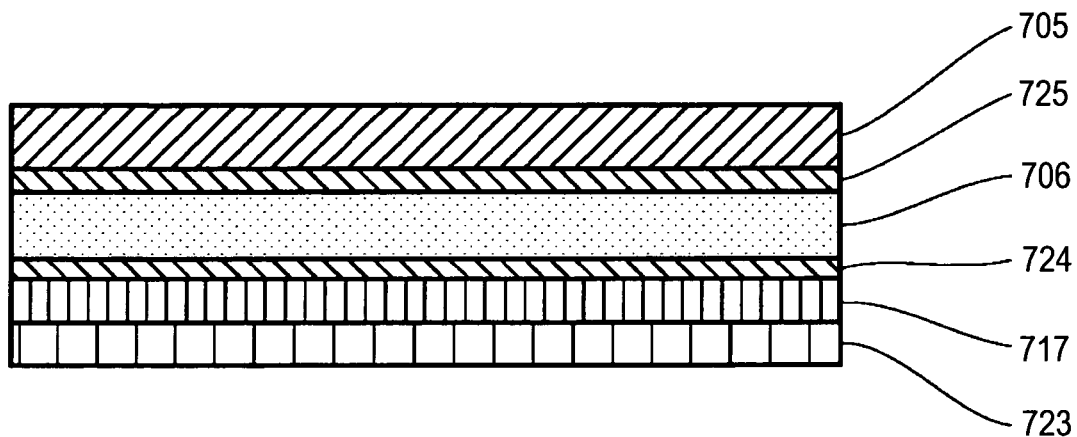
FIGS. 28A and 28B are schematic diagrams showing a part of the configuration of the second modification of the first embodiment of the previously proposed image recording medium.
Figure 28B:
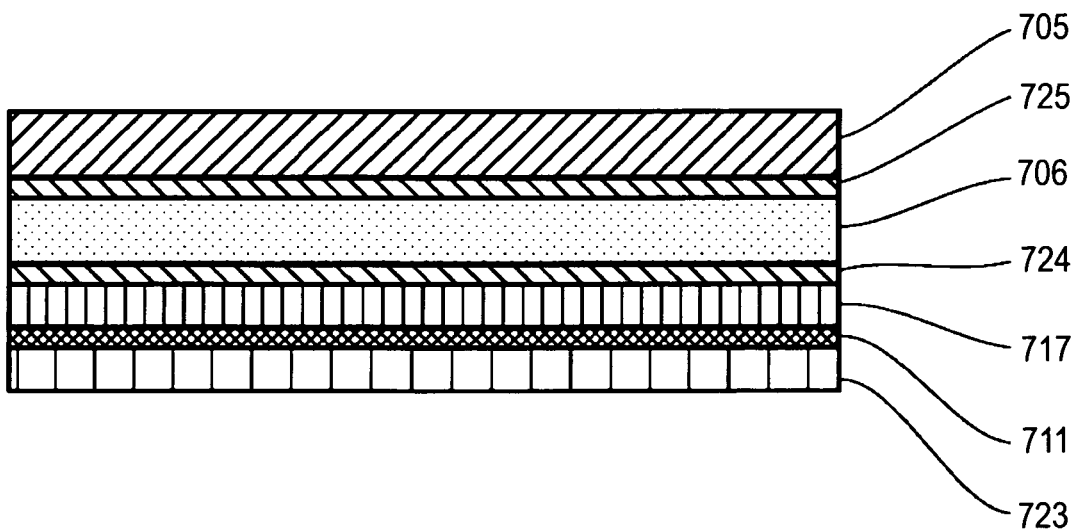

As shown in FIG. 28A, the louver 717 is coated on the hologram master 706 with a contact layer 724 disposed therebetween, and the hologram recording medium 705 is coated thereon with a contact layer 725 disposed therebetween. As the light deflection sheet 723, a holographic optical element, a diffractive optical element, a refractive angle control prism sheet, and the like can be used. The light deflection sheet 723 deflects the additional information light in a predetermined direction (incidence angle). As shown in FIG. 28B, the diffuser panel 711 may be disposed near the light deflection sheet 723 so as to widen the viewing angle appropriately. The light deflection sheet 723 is provided in order to eliminate a difference in optical distance and realize a state where light is easily focused on the entire surface.

<Control of Viewing Angle>

Although it is described that the viewing angle can be controlled so as to have an angle as designed, in order to produce holograms that are bright and easier to see, the viewing angle is preferably controlled so as to have an angle as below.

When an image is recorded on a hologram or holographic stereogram in a state where the incidence angle of the reference beam with respect to the normal line of the hologram plane is $\theta$, and the angle at which the two-dimensional image is reproduced with a maximum brightness in the vertical direction is $\phi$ with respect to the normal line of the hologram plane, the angle at which the hologram or holographic stereogram is reproduced at a maximum brightness is set to be approximately $(\theta+\phi)/2$.

Alternatively, when an image is recorded on a hologram or holographic stereogram in a state where the incidence angle of the reference beam with respect to the normal line of the hologram plane is $\theta$, and the angle at which the two-dimensional image is reproduced with a maximum brightness in the vertical direction is $\phi$ with respect to the normal line of the hologram plane, the angle at which the hologram or holographic stereogram is reproduced at a maximum brightness is set to be approximately $(\phi-\theta)/2$.

As an example of a case where one hologram image and one two-dimensional image are included, when the incidence angle of the reference beam is $\theta$ with respect to the normal line of the hologram plane, the angle at which the two-dimensional image is reproduced at a maximum brightness in the vertical direction is $-\theta/3\pm\theta/3$ with respect to the normal line of the hologram plane, and the angle at which the hologram or holographic stereogram having the images recorded thereon is reproduced at a maximum brightness is similarly $+\theta/3\pm\theta/3$ with respect to the normal line of the hologram plane, the incidence angle of the reference beam and the maximum brightness angles of the respective images are equally separated from each other, and images can be recorded efficiently. Similarly, the incidence angle of the reference beam may be $\theta$ with respect to the normal line of the hologram plane, the angle at which the two-dimensional image is reproduced at a maximum brightness in the vertical direction may be set to +θ/3±θ/3 with respect to the normal line of the hologram plane, and the angle at which the hologram or holographic stereogram having the images recorded thereon is reproduced at a maximum brightness may be similarly set to −θ/3±θ/3 with respect to the normal line of the hologram plane.

The reasons for setting the angles as above will be described with reference to FIGS. 29A to 29D, FIGS. 30A to 30C, and FIGS. 31A and 31B. FIG. 29A shows an example of recording information on a reflective hologram using dual parallel beams. The incidence angle of the reference beam from a direction 901 is set as θ=45°, and the incidence angle of the object beam from a direction 900 is set to 180°.

Figure 29B:
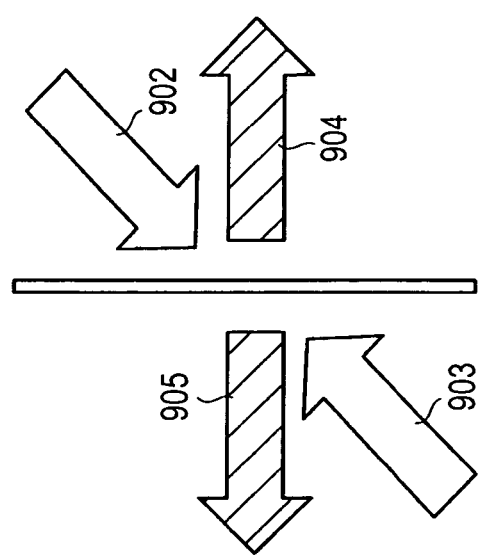
FIGS. 29A to 29D are schematic diagrams used for description of a viewing angle of a general hologram.
Figure 29C:
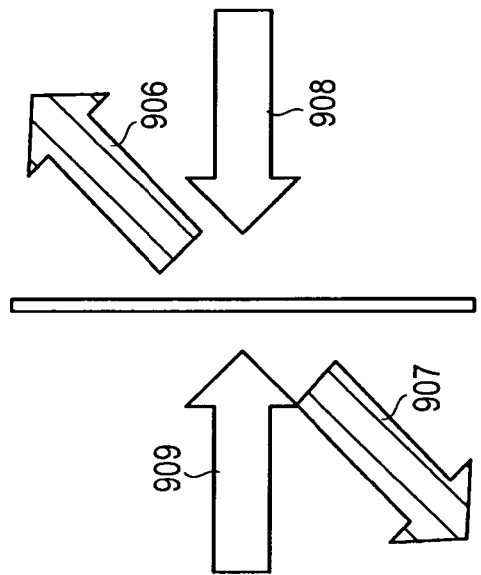
Figure 29A:
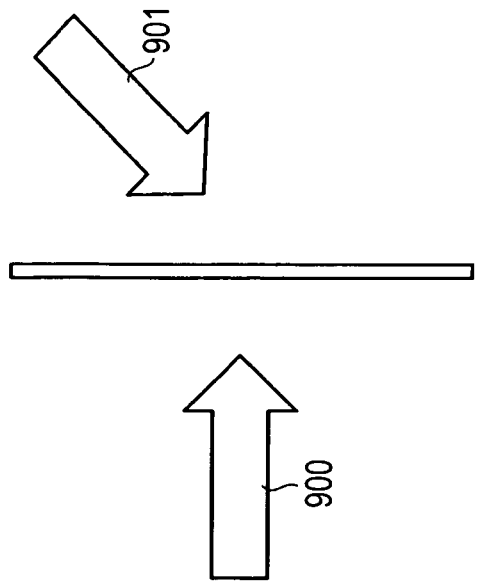

As shown in FIG. 29B, the recorded hologram is illuminated and reproduced. Similarly to the reference beam, when the illumination beam is irradiated to the hologram from a direction 902, a diffraction beam is emitted in a direction 904. When the illumination beam is irradiated from a direction 903 which is at an angle of 180° with respect to the direction 902, a diffraction beam is emitted in a direction 905. In this case, a pseudoscopic image (a three-dimensional image of which the depth information is reversed from that of a real object) is reproduced. As shown in FIG. 29C, when the illumination beam is irradiated from a direction 908, a diffraction beam is emitted in a direction 906 due to the Bragg diffraction conditions. When the illumination beam is irradiated from a direction 909, a diffraction beam is emitted in a direction 907, and a pseudoscopic image is reproduced.

Figure 29D:
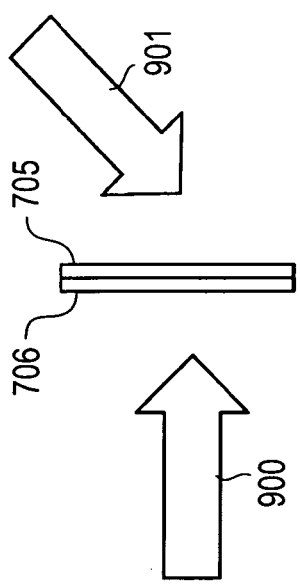

In the image recording medium, as shown in FIG. 29D, since the hologram master 706 is replicated in a state of being optically closely attached to the target medium (hologram recording medium) 705, it is necessary to make the reference beam incident from the direction 901. When a two-dimensional image is recorded from a direction 900, and an image is present on the hologram master 706, a diffraction of light occurs due to a hologram of the hologram master 706 as illustrated as a diffraction beam in FIG. 29C or 29D. Thus, there is a case where a laser beam for recording a two-dimensional identification image (additional information) is unable to reach the target medium 705. Even when the laser beam reaches the target medium 705, there is a problem in that the brightness of the two-dimensional image is changed by the image on the hologram master 706. Since the beam incident from the direction 900 is not a parallel beam but is actually a certain condensed beam, such an incident beam can be influenced by this effect. Thus, it is necessary to select an incidence angle where the incident beam is least affected.

Figure 30A:
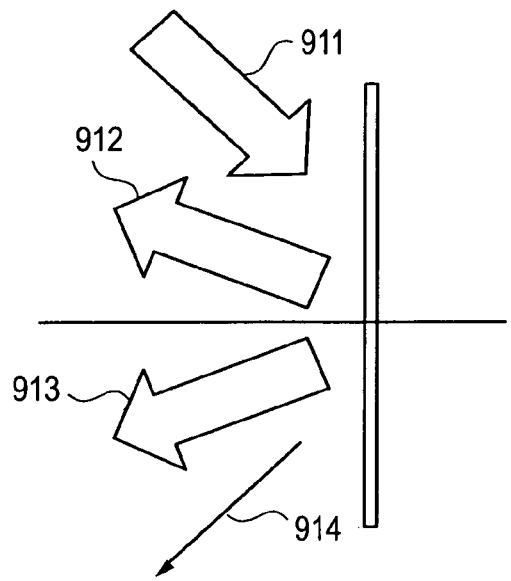
FIGS. 30A to 30C are schematic diagrams used for description of the control of the viewing angle of the previously proposed image recording medium.
Figure 30B:
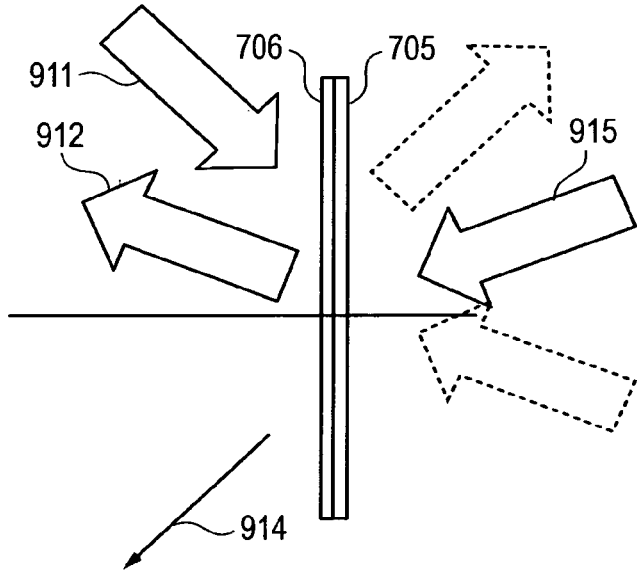
Figure 30C:
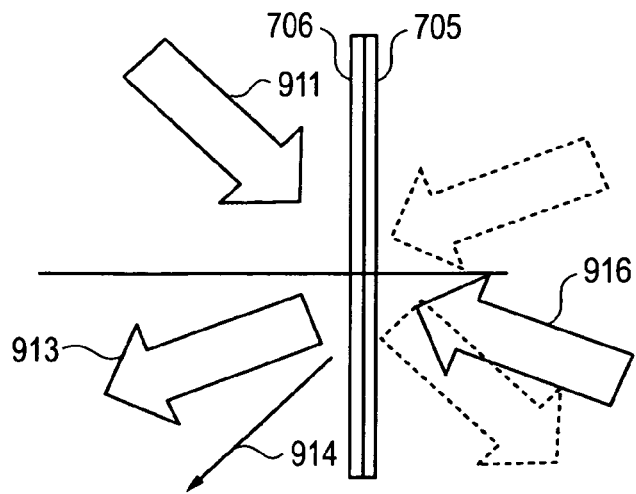

In the image recording medium, as shown in FIGS. 30A to 30C, the angles during the replication (recording) are chosen considering the above-mentioned facts. As shown in FIG. 30A, the reference beam is incident from an obliquely upward direction 911 at an angle of 45°. When an image is switched in two up-down directions, the image reproduction angle is set to an obliquely upward direction 912 at an angle of 15° and an obliquely downward direction 913 at an angle of 15°. In this case, the angle between the incidence direction of the reference beam and the upward switching direction is 30°, and the difference between the upper and lower image reproduction angles is also 30°, which is separated by an angle of 30° with respect to the direction 914 of the regular reflection of the reference beam. Thus, the reproduced image can be easily seen. The regular reflection angle is the mirror reflection angle of the reference beam. When a hologram is irradiated with a light source beam, the light source beam after the regular reflection may enter the eyes of an observer together with the hologram image. Thus, the observer may have difficulties in observing the hologram image.

When a first image reproduced at the angle of the obliquely upward direction 912 is used as the hologram master 706, the incidence angle of the additional information beam is set as denoted by 915 in FIG. 30B. Light beams in the directions denoted by broken lines are the returning diffraction beams generated by the Bragg diffraction. When a second image reproduced at the angle of the obliquely downward direction 913 is used as the hologram master 706, the incidence angle of the additional information beam is set as denoted by 916 in FIG. 30C. Light beams in the directions denoted by broken lines are the returning diffraction beams generated by the Bragg diffraction.

Figure 31B:
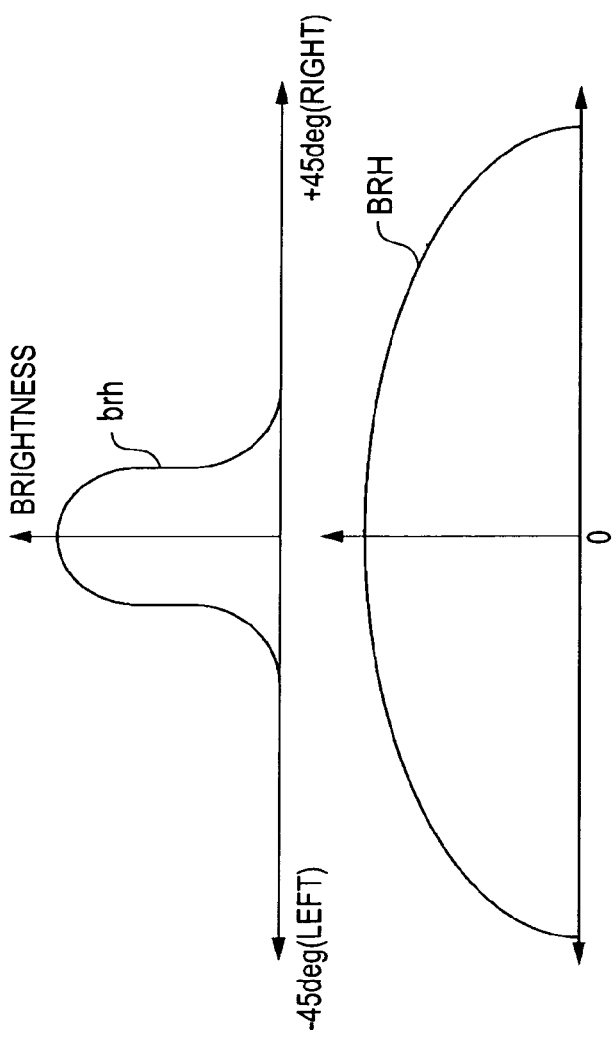
FIGS. 31A and 31B are schematic diagrams used for description of the control of the viewing angle of the previously proposed image recording medium.
Figure 31A:
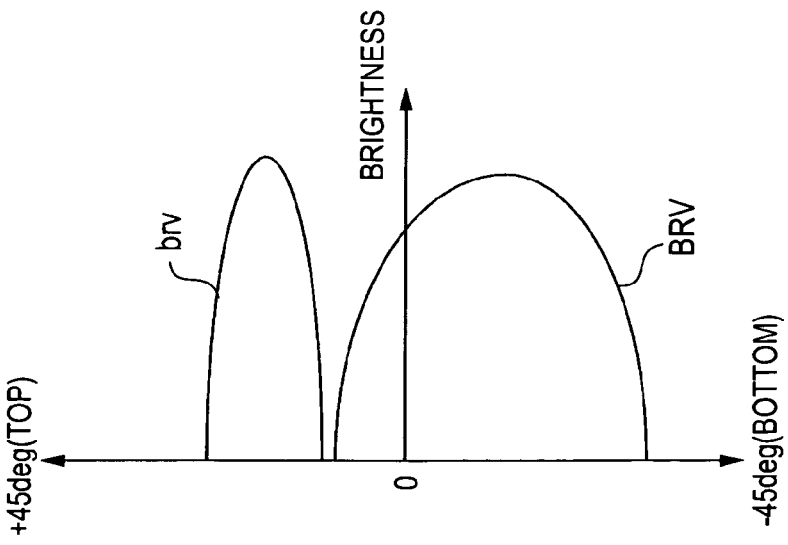

Therefore, on the replicated hologram recording medium 705, as shown in FIGS. 31A and 31B, the hologram image and the additional information image can be observed independently from each other by moving the viewpoint. FIG. 31A shows a case where the viewpoint is moved in the vertical direction, and FIG. 31B shows a case where the viewpoint is moved in the horizontal direction. The viewpoint can be moved by moving the observer's eyes or rotating the hologram recording medium. For example, the movement of the viewpoint in the vertical direction can be realized by moving the observer's eyes vertically within an angle range of ±45° with respect to the normal line of the hologram recording medium while maintaining the hologram recording medium at a fixed position. Alternatively, the same effect can be realized by rotating the hologram recording medium within an angle range of ±45° about the horizontal axis while fixing the position of the observer's eyes on the normal line. Moreover, the movement of the viewpoint in the horizontal direction can be realized by moving the observer's eyes laterally within an angle range of ±45° with respect to the normal line of the hologram recording medium while maintaining the hologram recording medium at a fixed position. Alternatively, the same effect can be realized by rotating the hologram recording medium within a predetermined angle range of ±45° about the vertical axis while fixing the position of the observer's eyes on the normal line.

In FIG. 31A, the curve BRV shows a change in brightness of the hologram image when the viewpoint is moved in the vertical direction, and the curve brv shows a change in brightness of the two-dimensional image when the viewpoint is moved in the vertical direction. In FIG. 31B, the curve BRH shows a change in brightness of the hologram image when the viewpoint is moved in the horizontal direction, and the curve brh shows a change in brightness of the two-dimensional image when the viewpoint is moved in the horizontal direction. As shown in FIGS. 31A and 31B, when the hologram recording medium is illuminated from a predetermined angle, a hologram image which has continuous parallax in the horizontal direction when the viewpoint is moved in the horizontal direction, and of which the viewing angle is controlled in the up-down direction is reproduced. When the viewpoint is moved in the up-down direction relatively with respect to the normal line of the hologram recording medium, another discontinuous image (two-dimensional image) which is different from the hologram image is reproduced. In the example described above, when the incidence angle of the reference beam is θ=45°, and the angle of the parallax hologram image is ϕ=−15°, the brightness in the vertical direction of the two-dimensional image increases at a viewpoint of (θ+ϕ)/2=(45−15)/2=15°. In the horizontal direction, the two-dimensional image can be observed in a range of viewing angles of 0°±15°.

When the incidence angle of the reference beam is θ=45°, and the angle of the parallax hologram image is ϕ=15°, the two-dimensional image can be easily seen at a viewpoint of (ϕ−θ)/2=(15−45)/2=−15°.

In addition, when the incidence angle of the reference beam is θ=45°, and the angle of the parallax hologram image is φ=0°, both good visibility and good producibility can be achieved by setting the viewpoint at (θ+φ)/2=(45−0)/2=22.5° or (φ−θ)/2=(0−45)/2=−22.5°.

The above-described settings of the angles regarding the image recording medium are typical examples. The settings can be changed in various ways depending on whether which one of the hologram image and the additional information will be seen primarily. The number of images switched in the vertical direction is not limited to two, and plural kinds of vertical parallax information may be included in the hologram master, and additional information may be recorded at an angle that does not overlap the angles of the vertical parallaxes.

For example, when the incidence angle of the reference beam is 45°, the angles of two parallax hologram images are +22.5° and 0°, and the two-dimensional image is recorded at an angle of −22.5°, a good hologram can be obtained. Similarly, when the incidence angle of the reference beam is 45°, the angles of two parallax hologram images are −22.5° and 0°, and the two-dimensional image is recorded at an angle of 22.5°, a good hologram can be obtained.

<Second Embodiment of Replication Apparatus>

Figure 32:
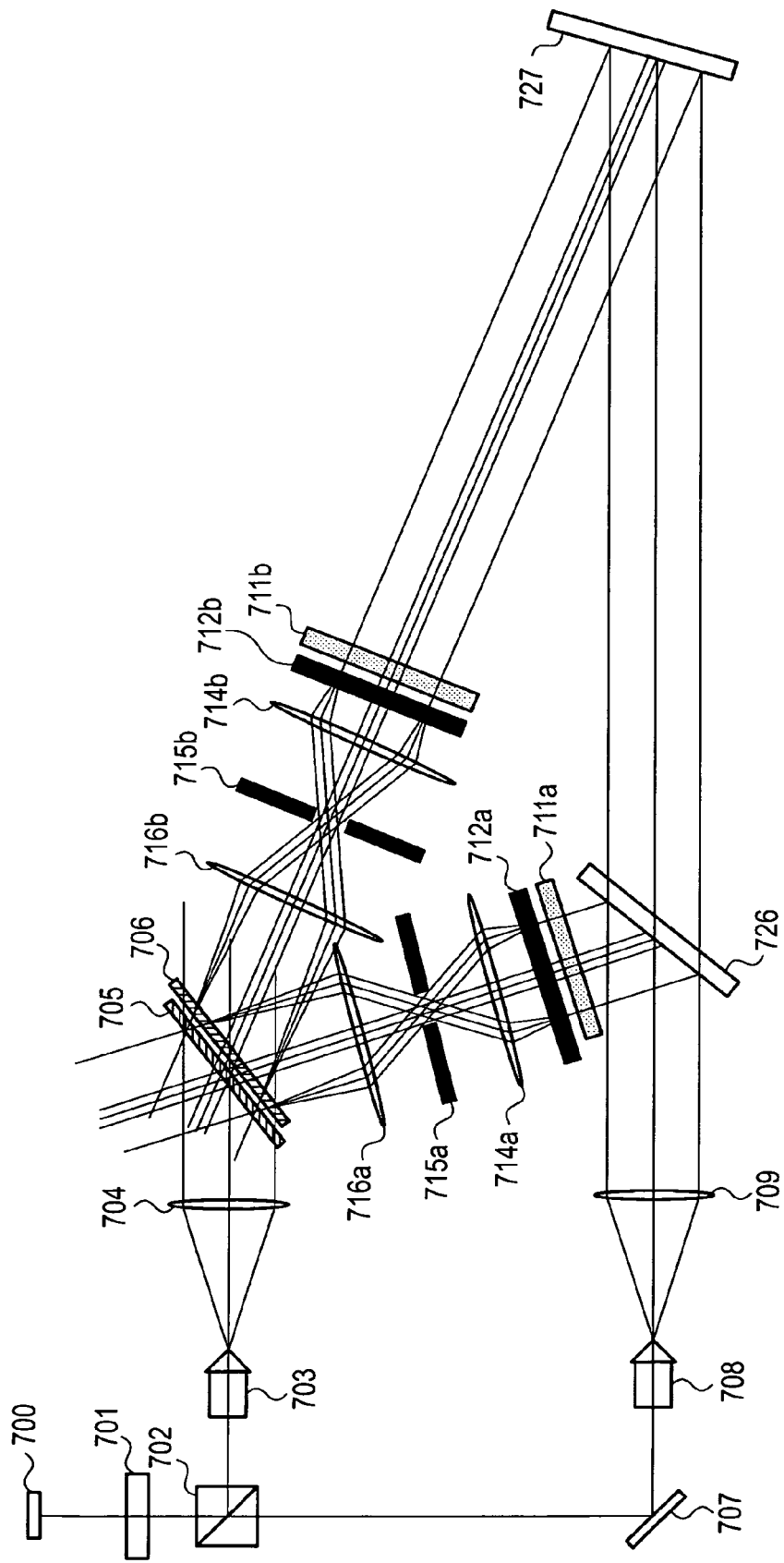
FIG. 32 is a schematic diagram showing a configuration of the second embodiment of a replication apparatus for the previously proposed image recording medium.

As shown in FIG. 32, the reference beam and the laser beam are branched by the polarizing beam splitter 702, and the reference beam passes through the spatial filter 703 and the collimator lens 704 and is incident on the hologram recording medium 705. The branched laser beam is reflected by the mirror 707 and is incident on the semi-transparent mirror 726 after passing through the spatial filter 708 and the collimator lens 709.

The laser beam reflected by the semi-transparent mirror 726 is a first branched laser beam. The laser beam transmitted through the semi-transparent mirror 726 is incident on the mirror 727. The laser beam reflected by the mirror 727 is a second branched laser beam. Similarly to the first embodiment, the first branched laser beam passes through a diffuser panel 711a and is incident on a liquid crystal display panel 712a (including a polarizing plate). The additional information image of the liquid crystal display panel 712a passes through an imaging optical system (including projection lens 714a and 716a and a diaphragm 715a) and the hologram master 706 and is imaged on the hologram recording medium 705.

On the other hand, the second branched laser beam passes through a diffuser panel 711b and is incident on a liquid crystal display panel 712b (including a polarizing plate). The additional information image of the liquid crystal display panel 712b passes through an imaging optical system (including projection lenses 714b and 716b and a diaphragm 715b) and the hologram master 706 and is imaged on the hologram recording medium 705. The incidence angle on the hologram recording medium 705, of the additional information light generated from the first branched laser beam is different from the incidence angle on the hologram recording medium 705, of the additional information light generated from the second branched laser beam. Therefore, the viewpoint from which the additional information image of the liquid crystal display panel 712a can be seen can be made different from the viewpoint from which the additional information image of the liquid crystal display panel 712b can be seen. Thus, two kinds of additional information images can be seen in accordance with two viewpoints.

The two branched laser beams are simultaneously irradiated on the hologram recording medium 705. However, the two branched laser beams may be time-sequentially irradiated on the hologram recording medium 705. Moreover, three or more numbers of branched laser beams may be used.

<Third Embodiment of Replication Apparatus>

In the above-described embodiment, the reference beam for contact printing is branched and used for recording plural kinds of additional information. However, as shown in FIG. 33, the additional information may be recorded using a laser beam different from the laser beam used for contact printing.

Figure 33:
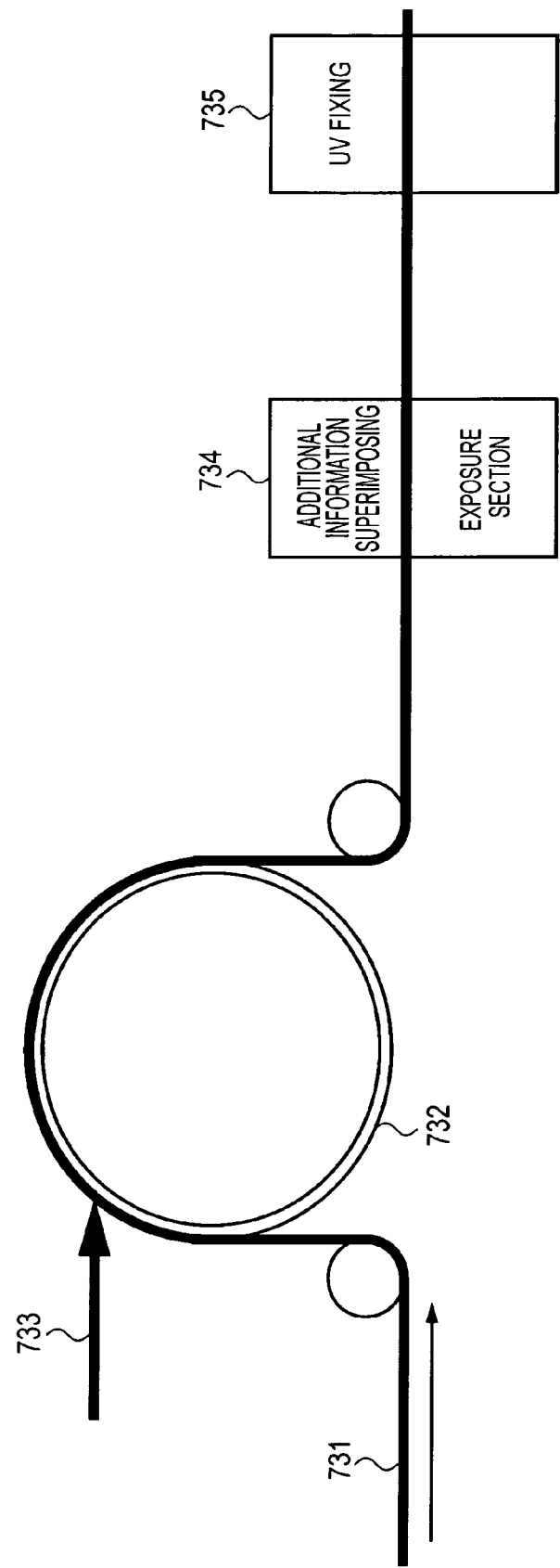
FIG. 33 is a schematic diagram showing a configuration of the third embodiment of a replication apparatus for the previously proposed image recording medium.

In the example shown in FIG. 33, contact printing is performed, and the additional information is recorded before the hologram is fixed by a UV fixing section 735. A hologram recording film 731 continuously fed from a roller (not shown) is wound around a roller. The hologram recording film 731 is a film in which a photosensitive material is coated on a transparent base film. A hologram master 732 is attached to the circumferential surface of the roller. The hologram master 732 is, for example, an image having continuous parallax in the horizontal direction. A replication laser beam 733 is irradiated in a state where the hologram master 732 and the hologram recording film 731 are closely attached to each other, whereby the hologram on the hologram master 732 is replicated on the hologram recording film 731.

The replication is performed by transferring the hologram recording film 731. The shutter of a replication laser 733 (not shown) is closed at the same time as the stopping of the transferring of the hologram recording film 731, and the replication laser 733 is irradiated. After the replication, the hologram recording film 731 is transferred to an additional information superimposing exposure section 734, and the additional information is recorded thereon. The same configuration as the above-described replication apparatus can be used as a configuration for recording the additional information. The replicated hologram recording film 731 on which the additional information is recorded is transferred from the additional information superimposing exposure section 734 towards the UV fixing section 735. A procedure where the additional information is first recorded, and the contact printing of a hologram and the fixing are performed is also possible.

<Fourth Embodiment of Replication Apparatus>

Figure 34:
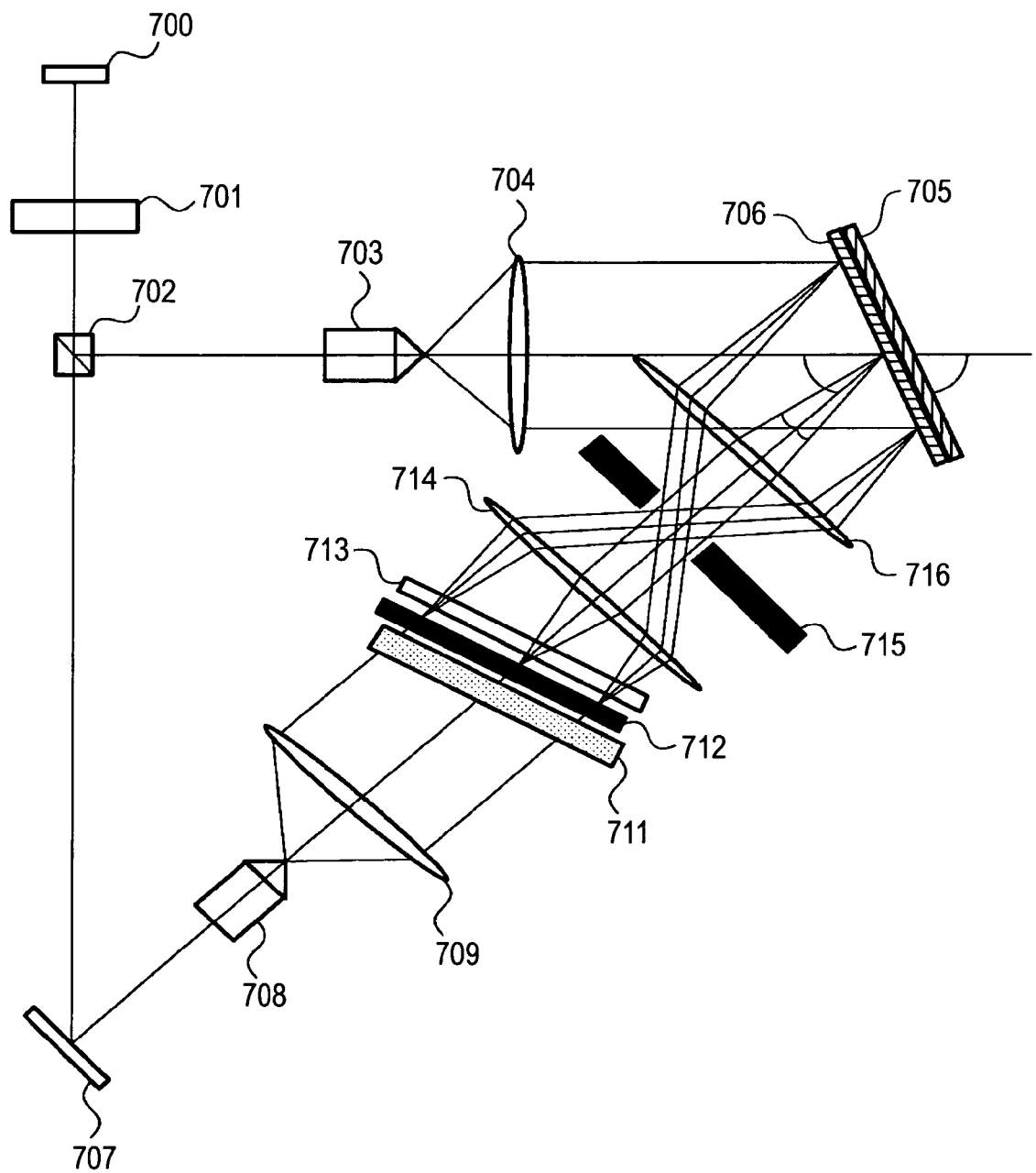
FIG. 34 is a schematic diagram showing a configuration of the fourth embodiment of a replication apparatus for the previously proposed image recording medium.

The embodiments described above are directed to examples where the hologram master is a reflective hologram. However, the present invention can be applied to a case where the hologram master is a transmissive hologram. As shown in FIG. 34, the hologram master 706 and the hologram recording medium 705 are closely attached to each other. The reference beam is separated by the polarizing beam splitter 702 and incident on the hologram master 706 after passing through the spatial filter 703 and the collimator lens 704.

The laser beam reflected by the mirror 707 is incident on the liquid crystal display panel 712 after passing through the spatial filter 708, the collimator lens 709, and the diffuser panel 711. The additional information light from the liquid crystal display panel 712 is incident on the hologram master 706 after passing through the polarizing plate 713 and a coupling optical system (including the projection lenses 714 and 716 and the diaphragm 715). The hologram on the hologram master 706 and the additional information image are superimposed and recorded on the hologram recording medium 705.

According to another embodiment of the image recording medium, the two-dimensional image (additional information) and the hologram image may be reproduced with different colors so that they can be easily differentiated. The results of a color separability test on 30 examinees under white light illumination showed that the colors were easily differentiated if the reproduction peak wavelengths are separated by an amount of 25 nm or more, for example.

Figure 35:
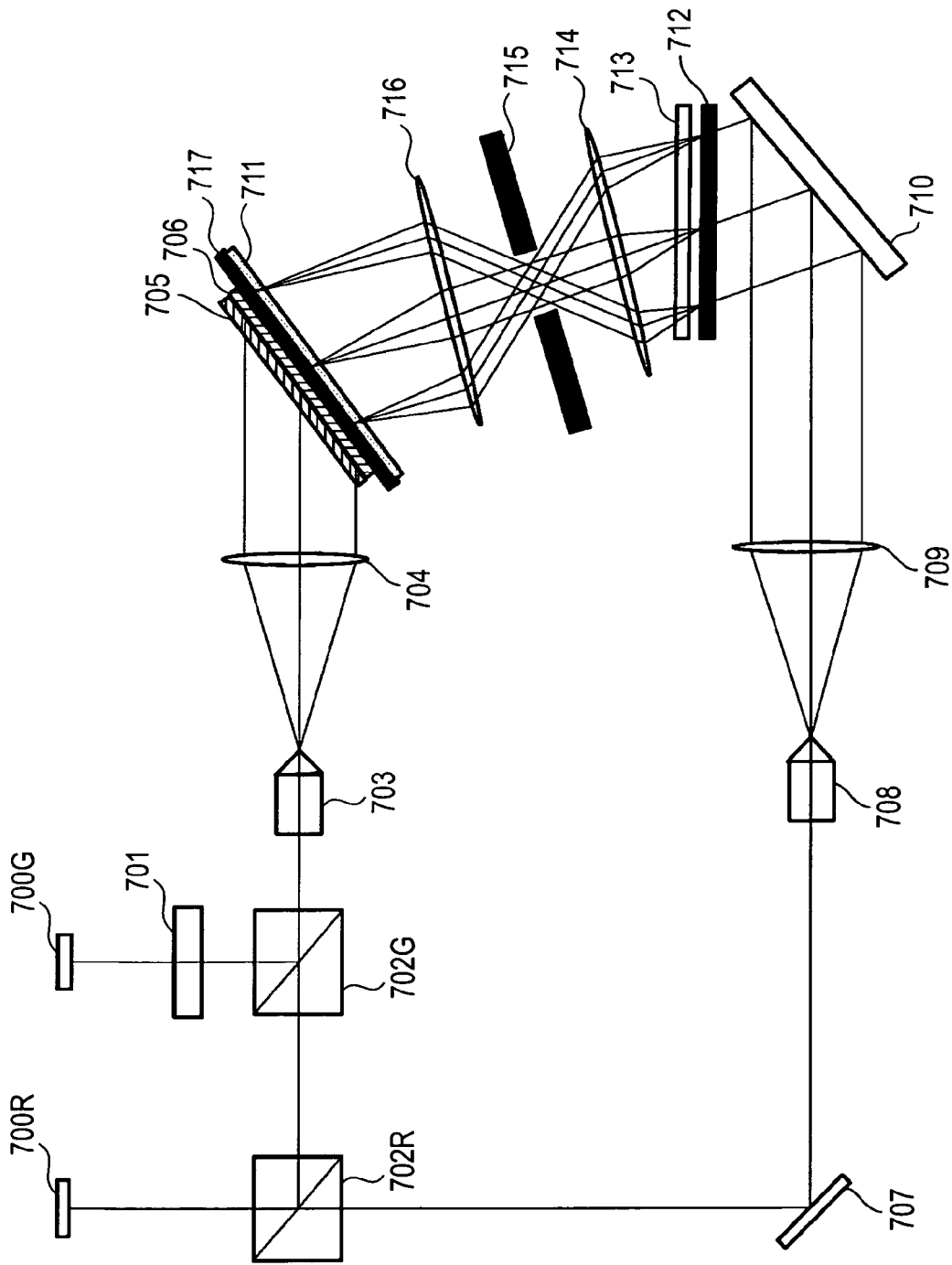
FIG. 35 is a schematic diagram showing a configuration of the fifth embodiment of a replication apparatus for the previously proposed image recording medium.

There may be a plurality of methods of changing the colors of the additional information and the image hologram. One example thereof is a multiple exposure method where the wavelengths of a recording laser beam are changed. As shown in FIG. 35, a red laser beam emitted from a red laser beam source 700R (for example, HeNe laser having a wavelength of 633 nm) for recording two-dimensional images is branched by a polarizing beam splitter 702R. A green laser beam source 700G (for example, semiconductor excited laser using 2nd-order harmonics having a wavelength of 532 nm) for image replication is provided.

A green laser beam is incident on a polarizing beam splitter 702G after passing through the half-wavelength plate 701. The red laser beam branched by the polarizing beam splitter 702R is also incident on the polarizing beam splitter 702G. The red laser beam and the green laser beam are combined by the polarizing beam splitter 702G and incident on the spatial filter 703. The laser beam from the spatial filter 703 is converted into a parallel beam after passing through the collimator lens 704, and the parallel beam is irradiated on a hologram recording medium 705 and a hologram master 706.

The red laser beam branched by the polarizing beam splitter 702R is reflected by the mirror 707 and incident on the spatial filter 708. A laser beam spread by the spatial filter 708 is incident on the mirror 710 after passing through the collimator lens 709. The laser beam reflected by the mirror 710 is incident on the liquid crystal display panel 712 serving as a spatial optical modulation element. A liquid crystal driving section (for example, a microcomputer) which is not shown is connected to the liquid crystal display panel 712. An image of the additional information is displayed on the liquid crystal display panel 712 by the liquid crystal driving section. The polarizing plate 713 is provided on a light-emitting surface of the liquid crystal display panel 712. The polarization plane is rotated by the polarizing plate 713, and P-wave is converted into S-wave.

In the configuration of FIG. 35, the diffuser panel 711 is disposed on the incidence side of the light from the projection lens 716. The additional information light transmitted through the polarizing plate 713 and generated by the liquid crystal display panel 712 is incident on the diffuser panel 711 after passing through an imaging optical system which includes the projection lens 714, the diaphragm 715, and the projection lens 716.

In the configuration of FIG. 35, the louver 717 is disposed between the diffuser panel 711 and the hologram master 706. By providing the louver 717, it is possible to prevent unnecessary light such as reflection light from entering the hologram master 706. The louver 717 has a configuration in which black planar absorption layers are disposed in a transparent plate at predetermined intervals. With the absorption layers of the louver 717, the additional information light and the diffusion components pass through the louver 717, while the replication parallel beam transmitted through the collimator lens 704 does not pass through the louver 717.

Interference fringes which are formed by light in which the light diffracted by the hologram master 706 and the additional information light passed through the hologram master 706 are superimposed and the incident laser beam are recorded on the hologram recording medium 705. As a result, it is possible to record the green replication image and the red two-dimensional image in a hologram area of the hologram master 706. The red image and the green image may be recorded at the same time and may be recorded time-sequentially. The same configuration as the embodiments described above can be used as an optical configuration for replication and recording the additional information.

Figure 36A:
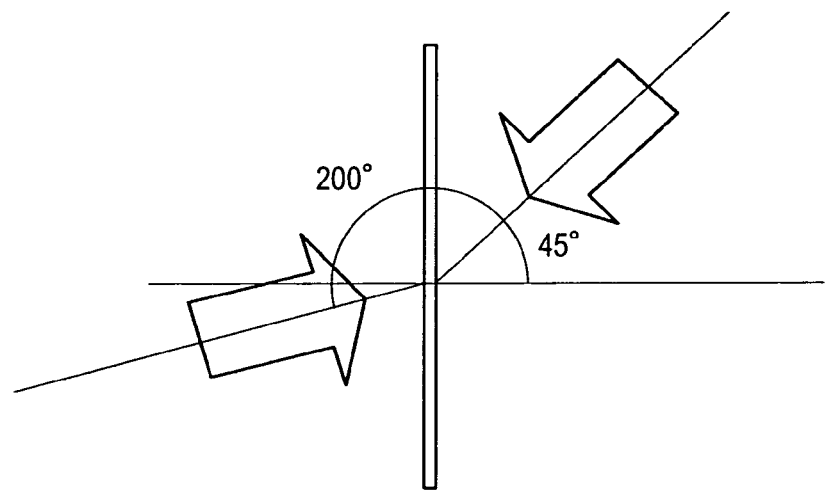
FIGS. 36A to 36C are schematic diagrams used for description of a modification of the fifth embodiment of a replication apparatus for the previously proposed image recording medium.

Another method of changing the colors of the additional information and the image hologram will be described with reference to FIGS. 36A to 36C. In this method, only an image replication laser is used rather than using an additional laser, and colors having wavelengths different from that of the original laser are produced and recognized as different colors. As shown in FIG. 36A, during the recording, a green laser having a wavelength of 532 nm, for example, is used, and the incidence angle of the reference beam is set to 45°, and the incidence angle of the object beam is set to 200°.

Figure 36B:
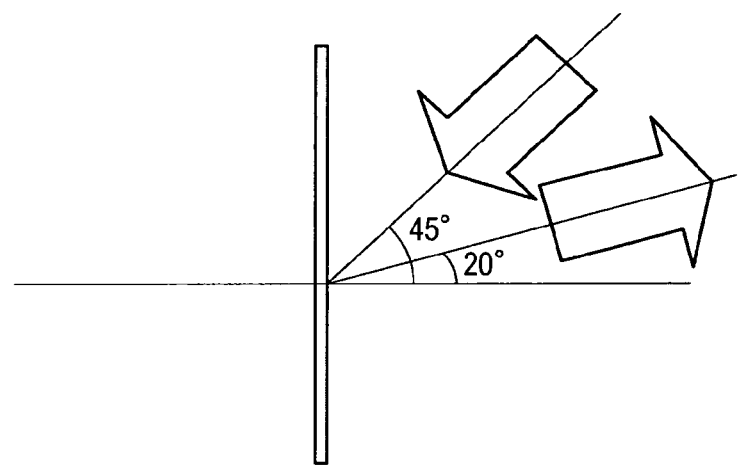
Figure 36C:
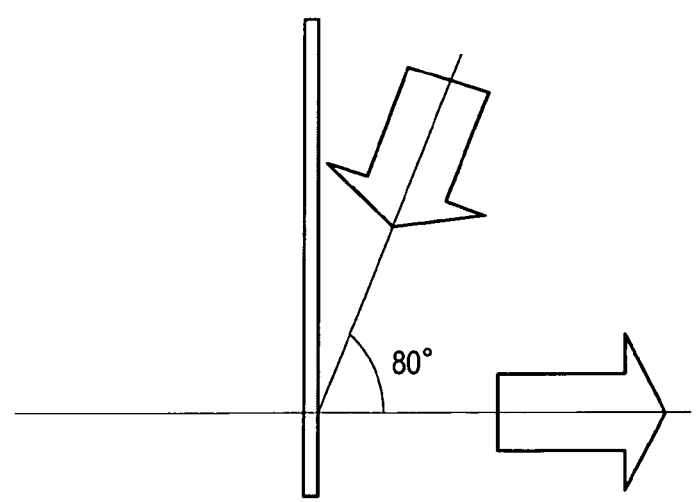
Figure 37:
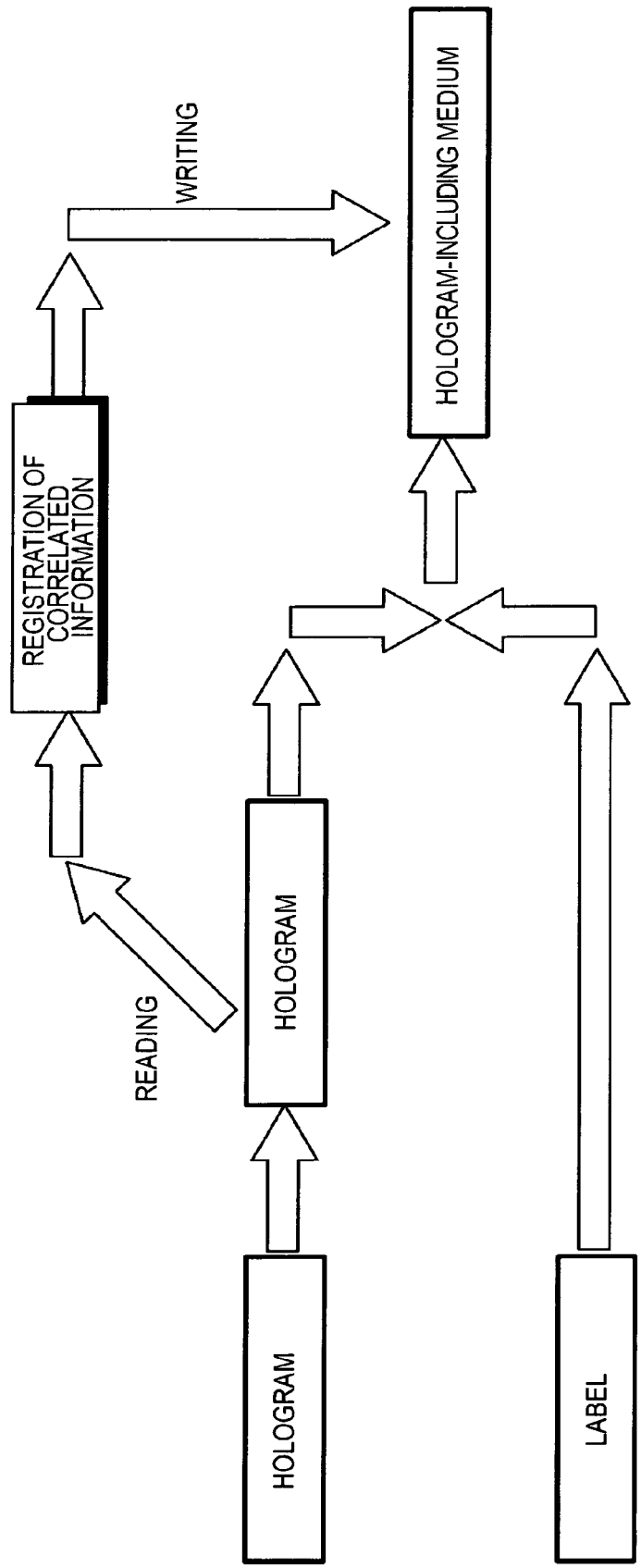
FIG. 37 is a schematic diagram of the first embodiment of the present invention.
Figure 38:
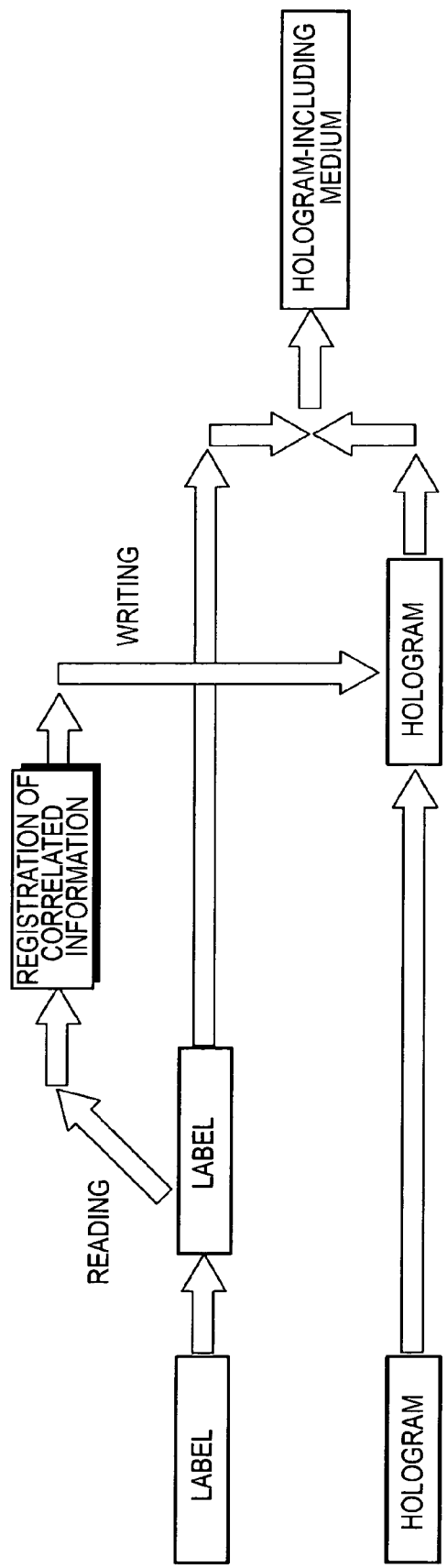
FIG. 38 is a schematic diagram of a modification of the first embodiment of the present invention.
Figure 39:
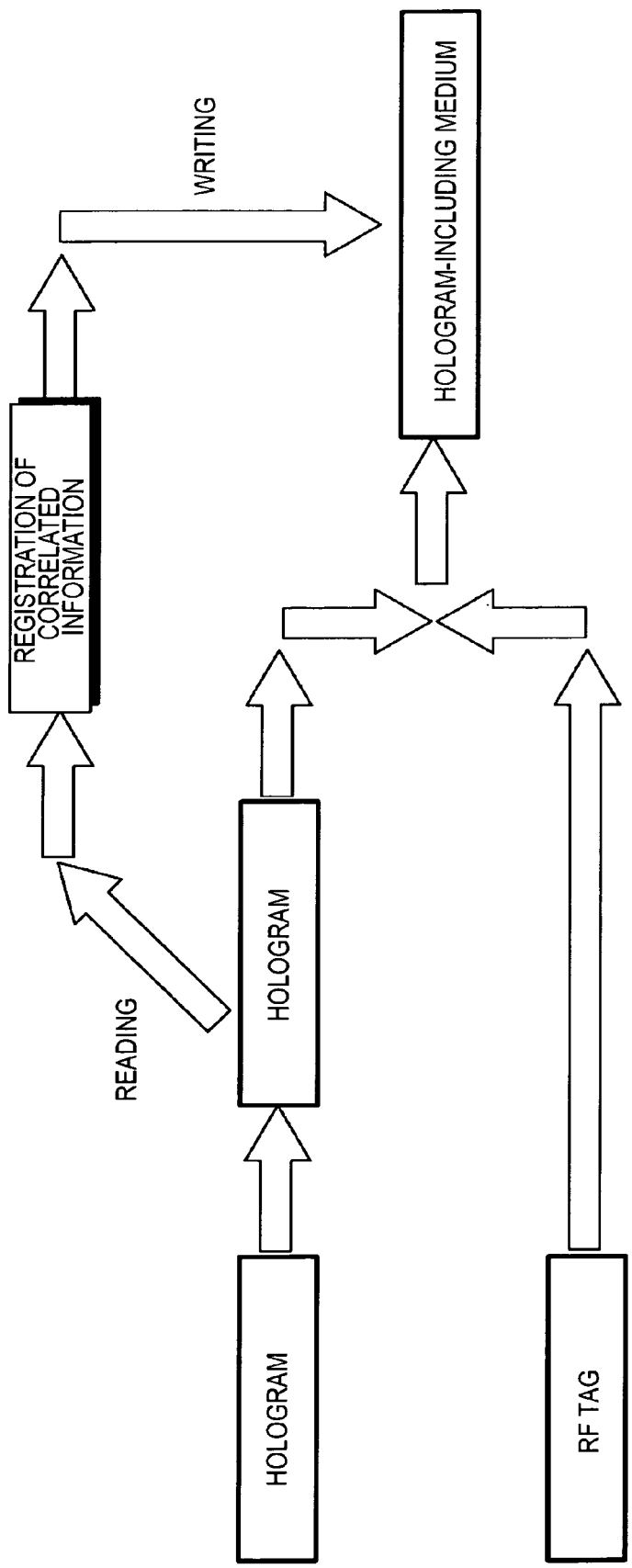
FIG. 39 is a schematic diagram of the second embodiment of the present invention.
Figure 40:
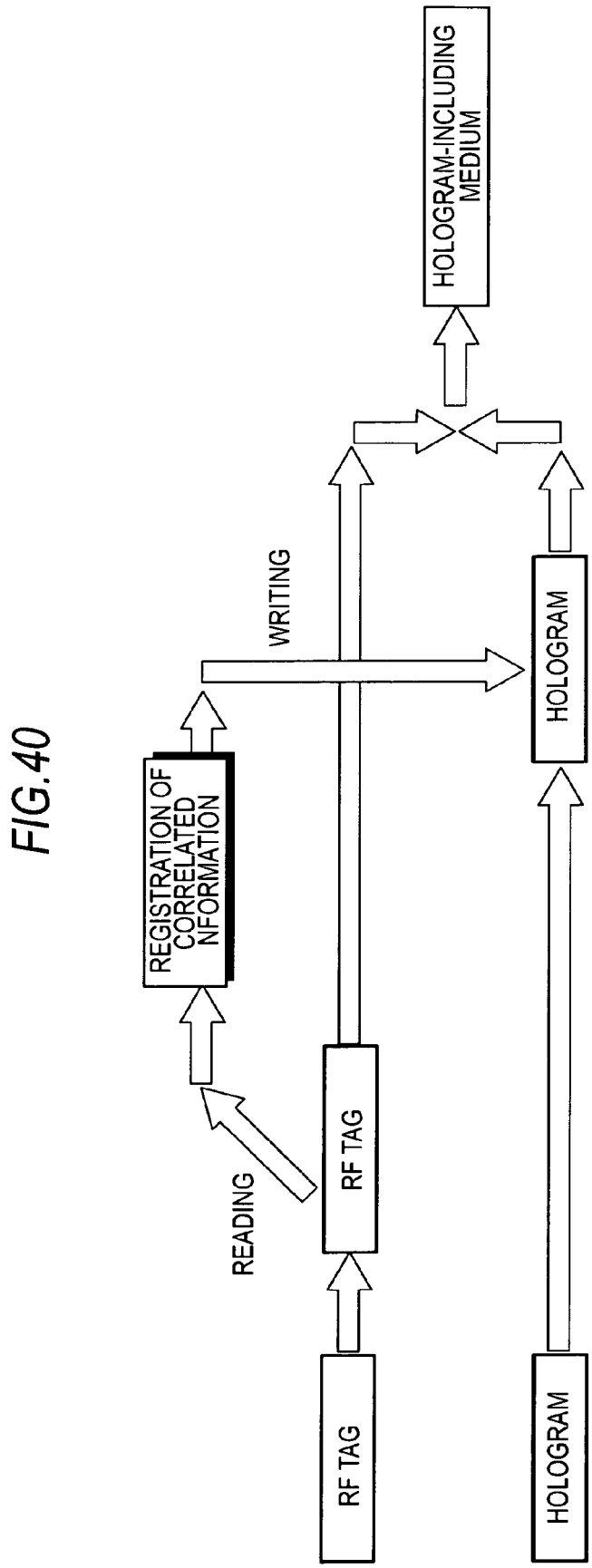
FIG. 40 is a schematic diagram of a modification of the second embodiment of the present invention.
Figure 41:
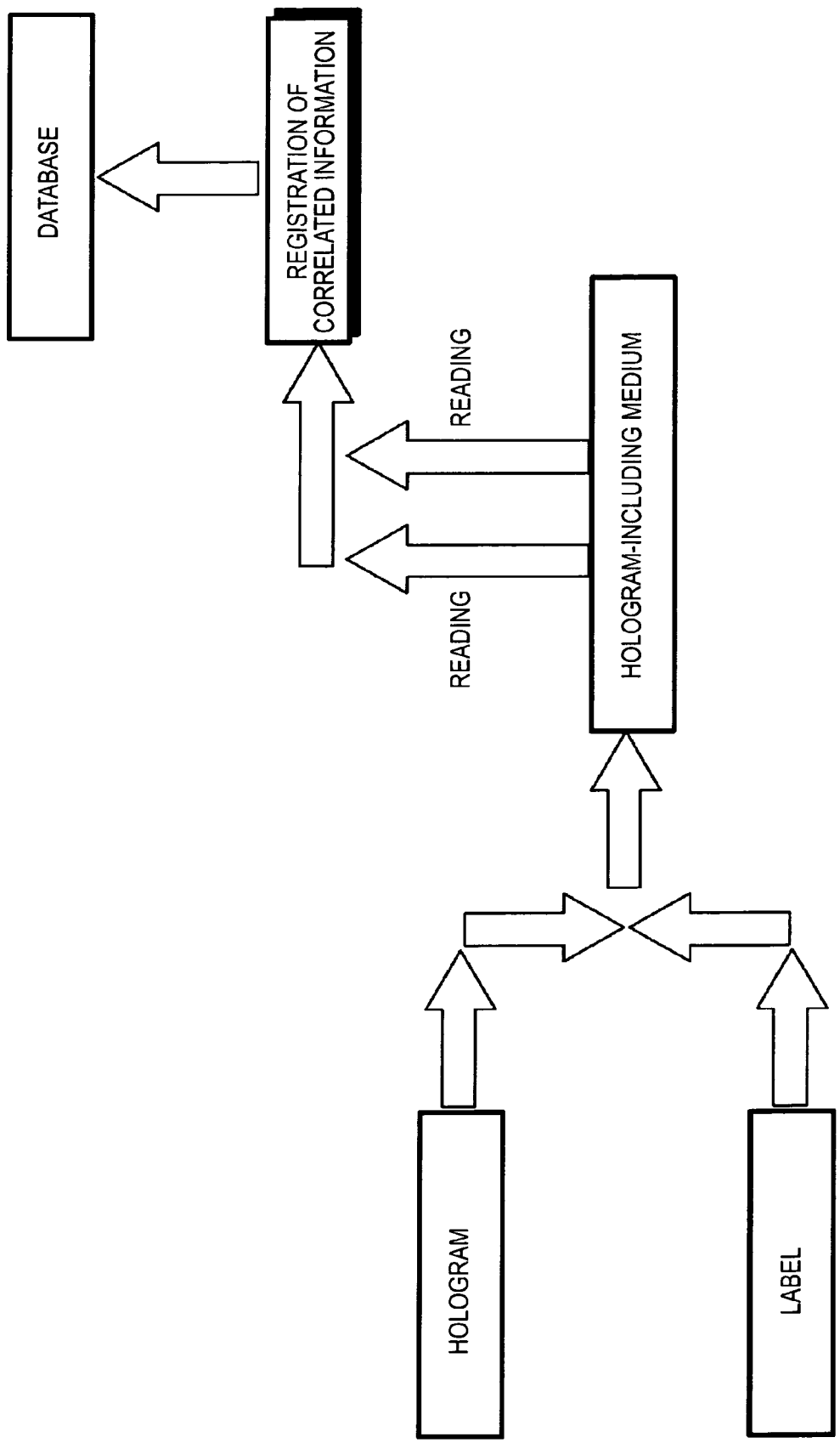
FIG. 41 is a schematic diagram of the third embodiment of the present invention.
Figure 42:
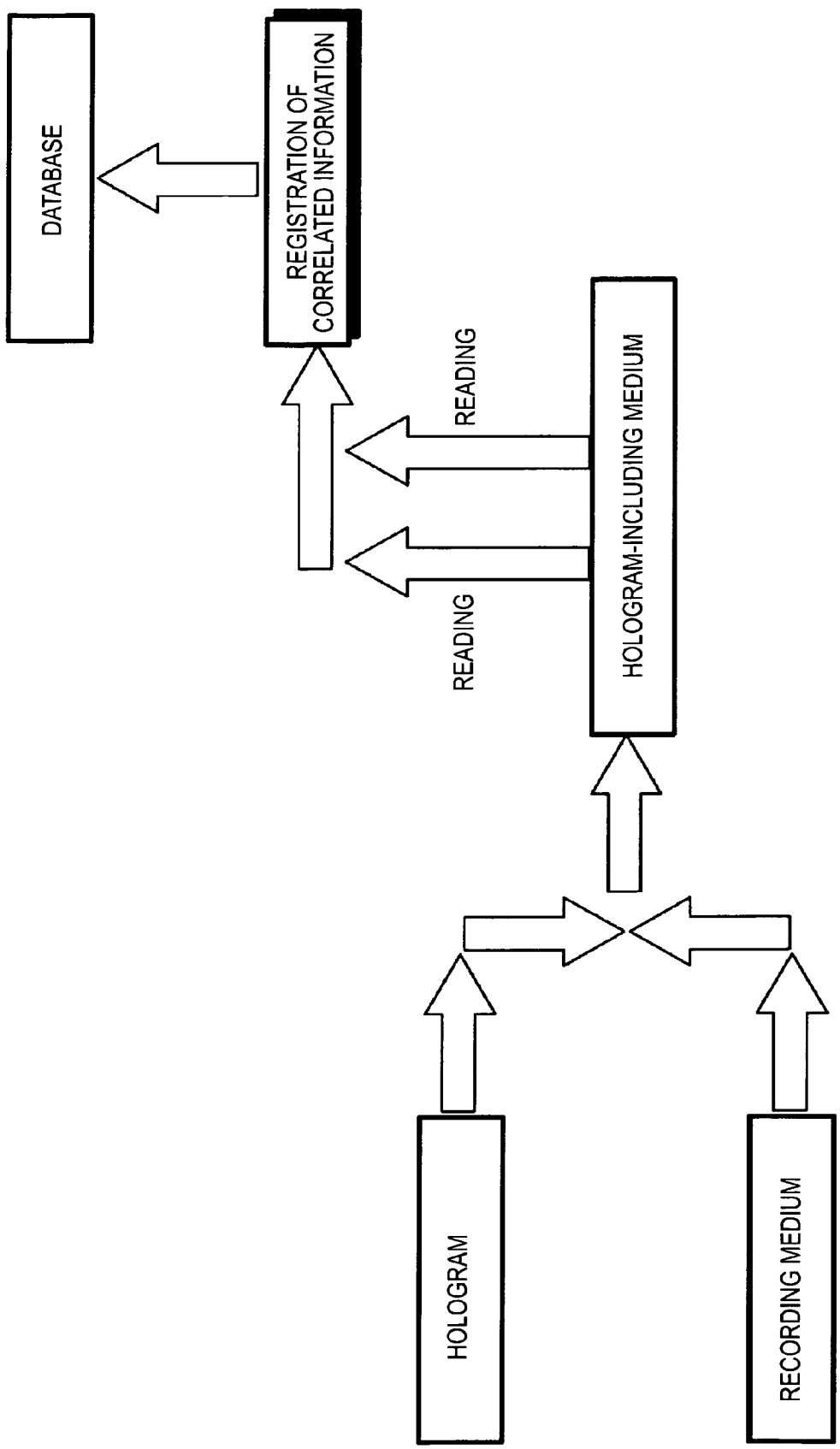
FIG. 42 is a schematic diagram of a modification of the third embodiment of the present invention.
Figure 43:
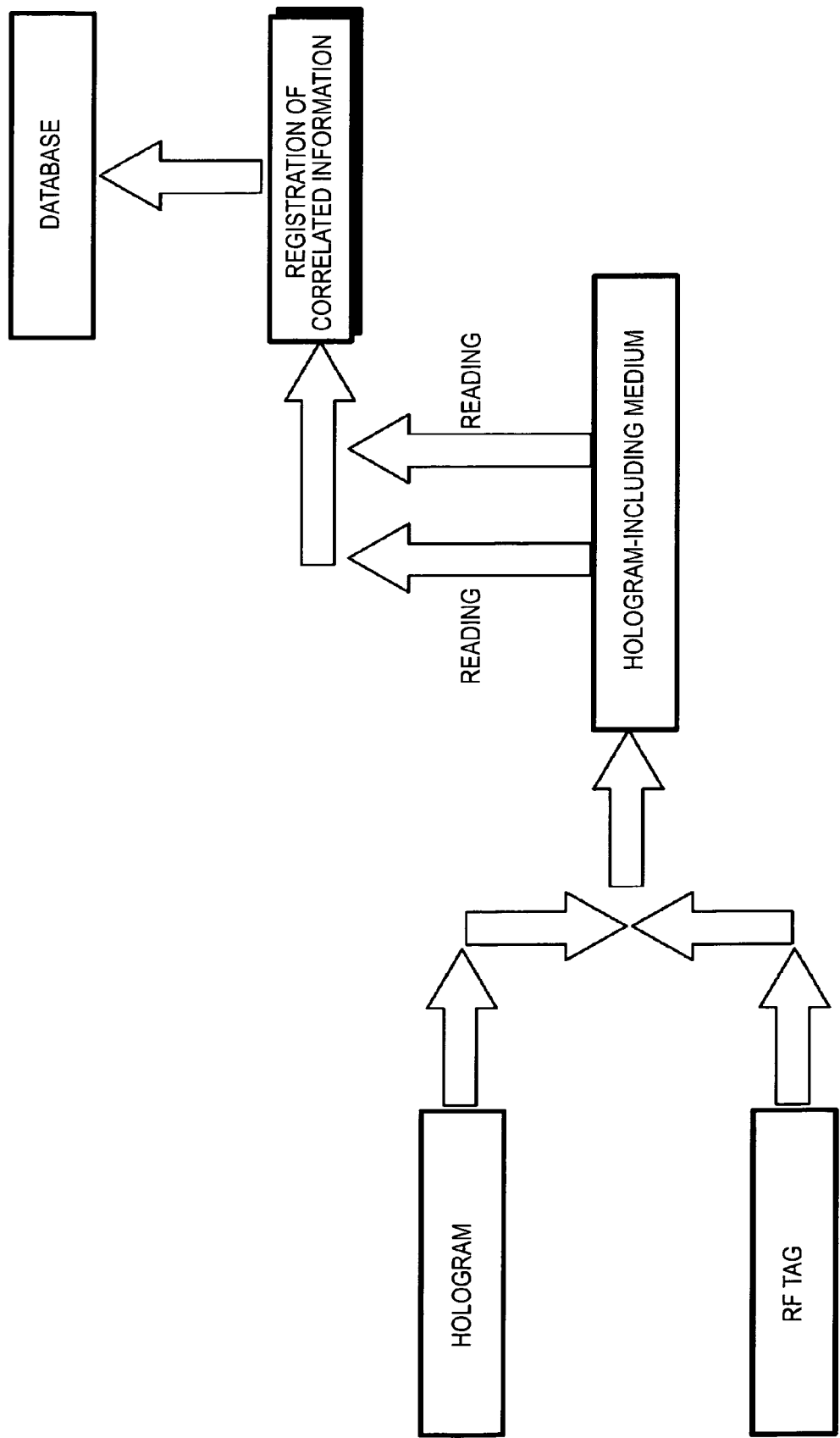
FIG. 43 is a schematic diagram of the fourth embodiment of the present invention.
Figure 44:
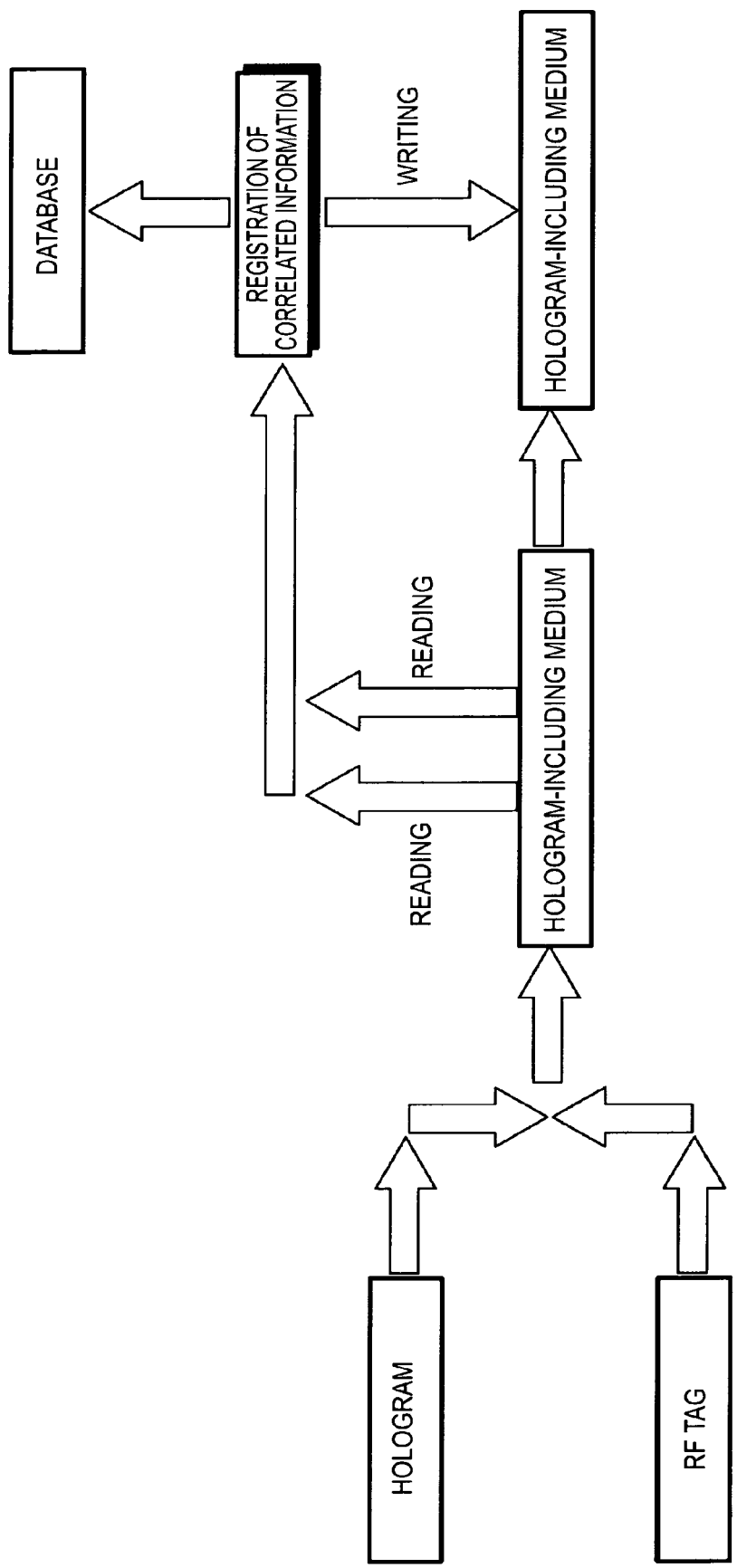
FIG. 44 is a schematic diagram of the fifth embodiment of the present invention.
Figure 45:
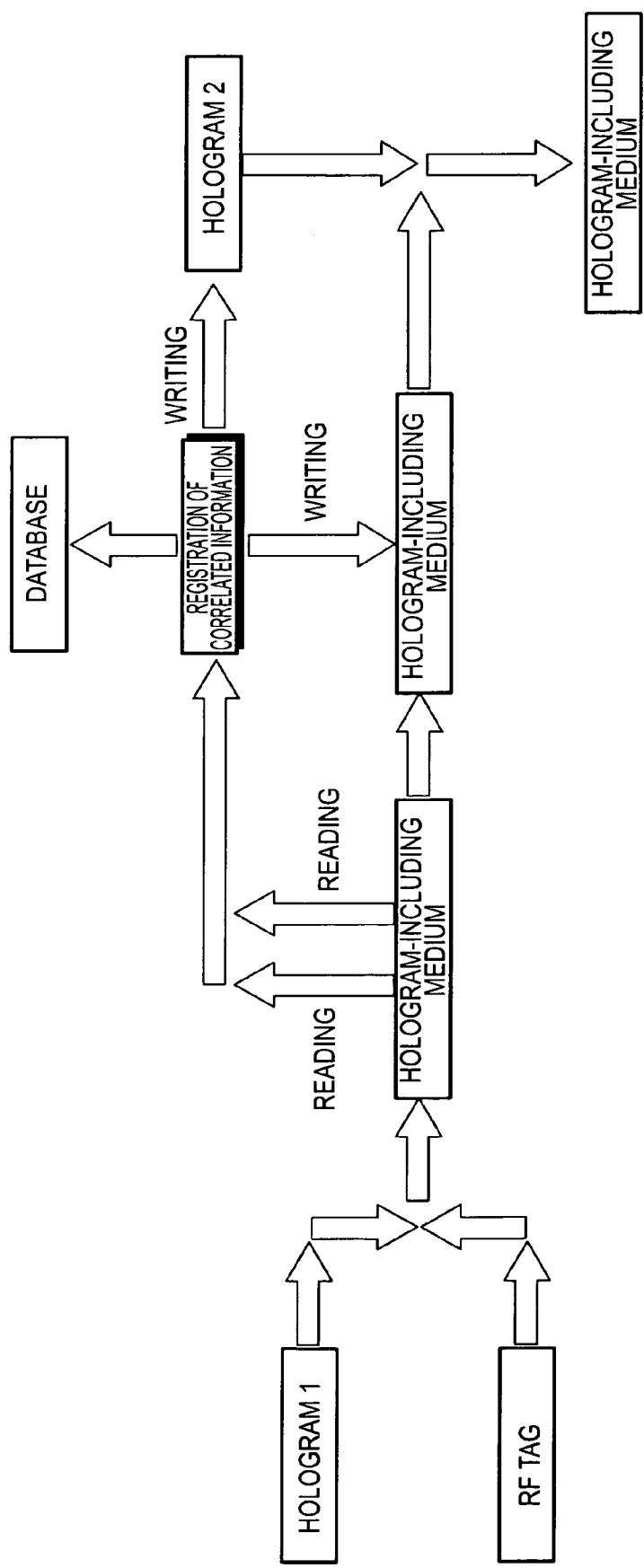
FIG. 45 is a schematic diagram of a modification of the fifth embodiment of the present invention.

As shown in FIG. 36B, during the reproduction, when the illumination light is incident at an incidence angle of 45°, the reproduced beam which is emitted at an angle of 20° appears green. On the other hand, as shown in FIG. 36C, when the illumination light is incident at an incidence angle of 80°, the reproduced beam which is emitted at an angle of 0° (the front) appears bluish with a wavelength of about 500 nm. Although actually such changes in the colors of the reproduced beams may depend on a change in thickness of a holographic recording material, the mobility of the material, and the like, the changes result from the shift of the reproduction wavelength under the Bragg diffraction conditions. By using this principle, the color of the replicated image can be made different from the color of the additional information image at an intended diffraction angle. Thus, the two kinds of information can be easily differentiated.

While specific embodiments of the image recording medium have been described, the present invention is not limited to these embodiments but may be modified in various ways. For example, image information other than identification information such as a serial number, a manufacturer name, a lot number, a one-dimensional barcode, or a two-dimensional barcode may be recorded as the additional information. Although the additional information was projected at a magnification of 1 using a spatial optical modulation element, the additional information may be projected at a magnification of larger or smaller than 1. Moreover, two or more kinds of additional information may be recorded. A film-shaped hologram recording medium may be used as the hologram recording media of other embodiments. In the above description, although the liquid crystal display panel was used as a spatial optical modulation element, other elements other than the liquid crystal display panel may be used.

The present application contains subject matter related to that disclosed in Japanese Priority Patent Application JP 2010-021674 filed in the Japan Patent Office on Feb. 2, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information determination method for authenticating a hologram-including medium, which is an integrated medium on which at least two items of identification information are recorded and in which one of the at least two items of identification information is holographic identification information which can be observed within a predetermined angle range when illuminated from a predetermined angle, the method comprising the steps of:

recording non-holographic identification information based on an observation of the holographic identification information on the integrated medium; and determining whether or not at least a part of the holographic identification information is identical to at least a part of the non-holographic identification information, wherein the integrated medium is configured to be coupled to a separate object to be secured, and wherein the integrated medium is a label.

2. The information determination method according to claim 1, wherein, in the hologram-including medium, one of the items of non-holographic identification information is an RF tag, the information determination method further comprising the step of:

authenticating the holographic identification information based on Radio Frequency Identification (RFID) information stored in the RF tag.

3. The information determination method according to claim 1, wherein the at least two items of identification information are correlated with each other.

4. The information determination method according to claim 3, wherein one of the items of non-holographic identification information includes an alphanumeric code.

5. The information determination method according to claim 3, wherein one of the items of non-holographic identification information is an RF tag, and wherein the holographic identification information is configured to be authenticated by Radio Frequency Identification (RFID) information stored in the RF tag.

6. The information determination method according to claim 3, wherein one of the items of non-holographic identification information is identification information of a recording medium.

7. The information determination method according to claim 1, wherein at least a portion of the holographic identification information is included in a hologram formed using differences in refractive indices in an interference film.

8. An information determination method for authenticating a hologram-including medium, which is an integrated medium on which at least two items of identification information are recorded and in which one of the at least two items of identification information is holographic identification information which can be observed within a predetermined angle range when illuminated from a predetermined angle, the integrated medium being configured to be coupled to an object to be secured, the method comprising the steps of:

irradiating a reproduction illumination light from a predetermined angle;

capturing an image reproduced from a hologram from a predetermined direction;

preparing a database in which information correlated with holographic identification information and non-holographic identification information based on an observation of the holographic identification information recorded on the integrated medium are registered; and verifying the information recorded on the hologram-including medium through the database, wherein the integrated medium is a label.

9. The information determination method according to claim 8, further comprising the step of:

determining whether or not at least a part of the holographic identification information is identical to at least a part of the non-holographic identification information.

10. The information determination method according to claim 8, wherein, in the hologram-including medium, one of the items of non-holographic identification information is an RF tag, the information determination method further comprising the step of:

authenticating the holographic identification information based on Radio Frequency Identification (RFID) information stored in the RF tag.

11. The information determination method according to claim 8, wherein at least a portion of the holographic identification information is included in a hologram formed using differences in refractive indices in an interference film.

12. The information determination method according to claim 8, wherein the first form of identification and the second form of identification are correlated with each other.

13. The information determination method according to claim 8, wherein at least a portion of the holographic identification information is identical to at least a portion of the second form of identification information.

14. The information determination method according to claim 8, wherein the holographic identification information includes a first alphanumeric code, the second form of identification information includes a second alphanumeric code, and at least a portion of the first alphanumeric code is identical to at least a portion of the second alphanumeric code.

15. The information determination method according to claim 8, wherein the second form of identification information is an RF tag, and wherein the holographic identification information is configured to be authenticated by Radio Frequency Identification (RFID) information stored in the RF tag.

* * * * *